US008644346B2

(12) United States Patent
Higa et al.

(10) Patent No.: US 8,644,346 B2
(45) Date of Patent: Feb. 4, 2014

(54) SIGNAL DEMULTIPLEXING DEVICE, SIGNAL DEMULTIPLEXING METHOD AND NON-TRANSITORY COMPUTER READABLE MEDIUM STORING A SIGNAL DEMULTIPLEXING PROGRAM

(75) Inventors: Kyota Higa, Tokyo (JP); Toshiyuki Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 13/516,571

(22) PCT Filed: Dec. 15, 2010

(86) PCT No.: PCT/JP2010/073066
§ 371 (c)(1), (2), (4) Date: Jun. 15, 2012

(87) PCT Pub. No.: WO2011/074702
PCT Pub. Date: Jun. 23, 2011

(65) Prior Publication Data
US 2012/0269203 A1 Oct. 25, 2012

(30) Foreign Application Priority Data
Dec. 18, 2009 (JP) ................................ 2009-287676

(51) Int. Cl.
*H04J 1/00* (2006.01)

(52) U.S. Cl.
USPC ........................................................ 370/480

(58) Field of Classification Search
None
See application file for complete search history.

(56) References Cited

U.S. PATENT DOCUMENTS

| | | | | |
|---|---|---|---|---|
| 4,920,535 A * | 4/1990 | Watanabe et al. | ............. | 370/512 |
| 7,315,817 B2 * | 1/2008 | Tasaki | ........................... | 704/229 |
| 8,488,679 B1 * | 7/2013 | Masterson et al. | ....... | 375/240.16 |

FOREIGN PATENT DOCUMENTS

| | | |
|---|---|---|
| JP | 200570643 A | 3/2005 |
| JP | 2005227512 A | 8/2005 |
| JP | 200734184 A | 2/2007 |
| JP | 200724432 A | 10/2007 |
| JP | 2008147920 A | 6/2008 |

OTHER PUBLICATIONS

International Search Report for PCT/JP2010/073066.
R. Mukai, H. Sawada, S. Araki, and S. Makino, "Blind Source Separation for Moving Speech Signals Using Blockwise ICA and Residual Crosstalk Subtraction," IEICE Trans. Fundamentals, vol. E87-A, No. 8, Aug. 2004.
Speech Enhancement, Springer, 2005, pp. 299-327.

* cited by examiner

*Primary Examiner* — Clemence Han
(74) *Attorney, Agent, or Firm* — Sughrue Mion, PLLC

(57) ABSTRACT

Provided is a signal demultiplexing system that can minimize losses in demultiplexing performance even if signals unsuited to demultiplexing are inputted. The provided signal demultiplexing device contains: an input signal analysis means for determining whether or not a plurality of input signals are suited to demultiplexing; a data memory means for storing data from frequency-domain input signals which result from transformation of the aforementioned input signals into frequency-domain signals; a selection control means for storing the frequency-domain input signals in the data memory means if the input signal analysis means has determined that the input signals are suited to the generation of a demultiplexing matrix for demultiplexing; and a demultiplexing matrix generation means for generating a demultiplexing matrix using frequency-domain input signals including the most recent and older frequency-domain input signals stored in the data memory means.

11 Claims, 35 Drawing Sheets

SIGNAL DEMULTIPLEXING DEVICE, SIGNAL DEMULTIPLEXING METHOD AND NON-TRANSITORY COMPUTER READABLE MEDIUM STORING A SIGNAL DEMULTIPLEXING PROGRAM

TECHNICAL FIELD

The present invention relates to a signal processing device, a signal processing method, and a non-transitory computer readable medium storing a signal processing program, and particularly relates to a signal demultiplexing device, a signal demultiplexing method, and a non-transitory computer readable medium storing a signal demultiplexing program which are used to demultiplex a mixed signal which includes mixture of plural signals.

BACKGROUND ART

A signal demultiplexing method based on ICA (Independent Component Analysis) is exemplified as one of methods to analyze input signals which are plural sounds collected via a plurality of microphones, and to demultiplex the input signals into each sound source signal. The signal demultiplexing method based on ICA optimizes a demultiplexing matrix under the condition that the sound sources are independent statistically each other, and carries out a filtering process to the input signals by use of the optimized demultiplexing matrix, and demultiplexes the input signals into each sound source signal. With regard to an art related to the signal demultiplexing method, an art disclosed in a non-patent literature 1 is exemplified.

The non-patent literature 1 discloses a signal demultiplexing method which can track an environmental change, such as a case that a sound source moves, through carrying out a learning process to the demultiplexing matrix by use of the input signals of plural frames which continue from the current frame to the past frames.

FIG. 29 is a block diagram showing an exemplified configuration of a signal processing device based on the method described in the non-patent literature 1. As shown in FIG. 29, the exemplified signal processing device includes a frequency transformation unit 100, a data memory unit 105, a demultiplexing matrix generation unit 102, a demultiplexed signal generation unit 103 and an inverse frequency transformation unit 104.

The exemplified signal processing device, which is shown in FIG. 29 and which is based on the method described in the non-patent literature 1, operates as shown in the following.

The frequency transformation unit 100 carries out a frequency transformation to the input signal in a frame unit which has a predetermined time length, and generates a frequency-domain input signal. The frequency transformation unit 100 outputs the generated frequency-domain input signal to the data memory unit 105 and the demultiplexed signal generation unit 103. DFT (Discrete Fourier Transform) is used in the frequency transformation. The data memory unit 105 stores the frequency-domain input signals of the plural frames. In the case that the frequency-domain input signal of the current frame is inputted, the data memory unit 105 deletes the frequency-domain input signal of the oldest frame, and stores the frequency-domain input signal of the current frame. As a result, the data memory unit 105 holds the frequency-domain input signals of the plural frames which continue from the current frame to the past frames. The demultiplexing matrix generation unit 102 reads the frequency-domain input signals of the plural frames which are held by the data memory unit 105. The demultiplexing matrix generation unit 102 carries out a learning and calculation process to the demultiplexing matrix by use of the frequency-domain input signals. The demultiplexing matrix generation unit 102 outputs the calculated demultiplexing matrix to the demultiplexed signal generation unit 103. The demultiplexed signal generation unit 103 generates frequency-domain demultiplexed signals on the basis of the frequency-domain input signals and the demultiplexing matrix. The demultiplexed signal generation unit 103 outputs the generated frequency-domain demultiplexed signal to the inverse frequency transformation unit 104. The inverse frequency transformation unit 104 transforms the frequency-domain demultiplexed signal to a demultiplexed signal through carrying out an inverse frequency transformation. IDFT (Inverse Discrete Fourier Transform) is used as the inverse frequency transformation.

Moreover, a patent literature 1 exemplifies a voice demultiplexing device to generate a demultiplexed signal, which is corresponding to each of plural sound sources, on the basis of plural mix-voice signals which are inputted sequentially through a plurality of voice input means and which include mixture of voice signals outputted by a plurality of sound sources.

The voice demultiplexing device described in the patent literature 1 includes an A/D (Analog/Digital) converter to convert the mix-voice signals, which are inputted through a plurality of microphones and which include mixture of the plural (n) sound source signals, to digital signals, a plurality of (n) DSPs (Digital Signal Processor) to input a plurality of (n) mix-voice signals which are digitalized, and to carry out signal processing to the mixed voice signals which are inputted, and a D/A (Digital/Analog) converter to convert a plurality of (n) demultiplexed signals, which are outputted sequentially by one DSP out of the plural DSPs and to which a sound source demultiplexing process has been carried out, to analog signals. The voice demultiplexing device operates as shown in the following.

Through carrying out the discrete Fourier transform to n time-domain input signals (frame signal) which are digitalized by the A/D converter and have a predetermined time length, n DSPs transform the n input signals to the frequency-domain mix-voice signals, and buffer the frequency-domain mix-voice signals. Moreover, in parallel to carrying out the transformation to the frequency-domain signal, each of n DSPs handles a signal per a frequency band which is generated through dividing the mix-voice signal into a plurality of signals per the frequency band, and carries out a learning and calculation process to a demultiplexing matrix W (f) according to the FDICA (Frequency-Domain ICA) method. Furthermore, in parallel to carrying out the transformation process into the frequency-domain signal and the learning process to the demultiplexing matrix, one DSP generates the demultiplexed signal corresponding to each of the sound sources on the basis of the buffered frequency-domain frame signal through carrying out a matrix calculation by use of the demultiplexing matrix W(f) which is updated through the learning process. Furthermore, each DSP carries out the inverse discrete Fourier transformation to each of the generated demultiplexed signals.

With regard to the learning process applied to the demultiplexing matrix W (f), an initial matrix for the first learning process, which uses a signal of the first frame, is predetermined. Then, the learning process, which uses a signal of the second frame or the frame following the second frame, uses the demultiplexing matrix W(f) updated by the learning process which uses the previous frame. The mixed-voice signal, to which the sound source demultiplexing process is carried out by use of the updated demultiplexing matrix, may be the same as or may be different from the signal which is used in the learning process for the demultiplexing matrix.

A patent literature 2 exemplifies a sound source demultiplexing system which, on the basis of a mixed signal which is generated through multiplying N acoustic signals different each other, and a N+1'th acoustic signal different from the N acoustic signals by weighting coefficients which are equal to 1 respectively, and adding the weighted N acoustic signals and the weighted N+1'th acoustic signal, demultiplexes the N acoustic signals and outputs the N acoustic signals which are demultiplexed. The sound source demultiplexing system described in the patent literature 2 includes an encoder and a decoder. The encoder includes a mixed signal generation means, a judgment means and an output means. The decoder includes a sorting means, a pseudo-mixed signal generation means and a demultiplexing means. The sound source demultiplexing system described in the patent literature 2 operates as shown in the following.

The mixed signal generation means of the encoder of the sound source demultiplexing system described in the patent literature 2 generates a first mixed signal through multiplying the N acoustic signals different each other, and the N+1'th acoustic signal different from the N acoustic signals by the weighting coefficients which are equal to 1 respectively and adding the weighted N acoustic signals and the weighted N+1'th acoustic signal. Moreover, the mixed signal generation means generates a mixed signal through assigning a predetermined value ($\alpha$), which is almost equal to 1, as the weighting coefficient to one acoustic signal selected in turn out of the N+1 acoustic signals, and assigning the weighting coefficients, which are equal to 1, to other N acoustic signals, and multiplying the N+1 acoustic signals by the weighting coefficients respectively, and adding the weighted N+1 acoustic signals. Then, the mixed signal generation means repeats the above-mentioned mixed signal generation process N times with changing one selected acoustic signal in turn, and generates N kinds of the mixed signals. Next, the judgment means carries out the independent component analysis to the first mixed signal and the N mixed signals, and judges whether it is possible to demultiplex the N acoustic signals. In the case that the judgment means judges that it is possible to demultiplex the N mixed signals, the encoder makes the output means output the first mixed signal and the predetermined value ($\alpha$).

The sorting means of the decoder of the sound source demultiplexing system described in the patent literature 2 carries out the Fourier transform to the first mixed signal which is outputted by the encoder, and obtains a time-dependent change of a spectrum. Moreover, the sorting means analyzes the time-dependent change by the auditory scene analysis and carries out classification into N+1 groups. Next, the pseudo-mixed signal generation means selects one group out of the N+1 groups which the sorting means classifies, and multiplies an amplitude of the spectrum, which belongs to the selected group, by the predetermined value ($\alpha$). After the multiplication, the pseudo-mixed signal generation means carries out the inverse Fourier transform to the spectrum which belongs to each group, and generates a pseudo-mixed signal. The pseudo-mixed signal generation means carries out the multiplication and the pseudo-mixed signal generation N times with changing the selected group in turn, and generates N kinds of the pseudo-mixed signals. Moreover, the demultiplexing means of the decoder demultiplexes the N acoustic signals out of the first mixed signal and N kinds of the pseudo-mixed signals.

In the case the judgment unit of the encoder judges that it is possible to demultiplex the N acoustic signals, that is, in the case that the demultiplexed signal is coincident with the input signal, a demultiplexing matrix is coincident with an inverse matrix of a matrix which is corresponding to the mixed signal generation process carried out by the mixed signal generation means and which includes $\alpha$ as a parameter. The demultiplexing means of the decoder calculates the demultiplexing matrix, which is the inverse matrix, on the basis of the predetermined value $\alpha$ which is transferred by the encoder, and demultiplexs the signal.

A patent literature 3 exemplifies a sound signal processing device to optimize a demultiplexing matrix by use of a mixed sound which includes mixture of a sound from a detection target sound source and a sound from a noise source, and demultiplexes the sound from the detection target sound source and the sound from the noise source on the basis of the mix sound by use of the optimized demultiplexing matrix.

The sound signal processing device described in the patent literature 3 includes a first and second framing unit, a first and second frequency analysis unit, a demultiplexing processing unit, a demultiplexing matrix optimization calculation unit, an utterance period judgment unit, a demultiplexing process on/off control unit, and an optimization calculation on/off control unit, and operates as shown in the following.

The first and second framing unit samples two channel voice signals, which the first and second framing unit inputs through a first and a second microphones, at a predetermined time interval to generate one frame, which includes predetermined number of the samples, on the basis of the time division multiplexing method, and outputs the frame to the first and second frequency analysis unit. The first and second frequency analysis unit carries out FFT (Fast Fourier Transform) to the voice signal, which is inputted in a unit of the frame, to generate an observation signal, and outputs the observation signal to the demultiplexing process on/off control unit.

In the case that the utterance period judgment unit, which will be described later, judges that it is within an utterance period, the demultiplexing process on/off control unit outputs the inputted observation signal to the demultiplexing processing unit. On the other hand, in the case that the utterance period judgment unit does not judge that it is within the utterance period, the demultiplexing process on/off control unit does not output the observation signal. The demultiplexing processing unit demultiplexes and extracts a demultiplexed signal from the observation signal by use of the demultiplexing matrix which is optimized by the demultiplexing matrix optimization calculation unit.

The utterance period judgment unit judges the utterance period on the basis of degree of a correlation of the input signal from the microphone, or degree of a correlation of the signal which is framed by the first and second framing unit, or on the basis of a power spectrum or a cross spectrum of the observation signal which is generated by the frequency analysis unit. In the case of the judgment on the basis of the degree of the correlation or the power spectrum, it is necessary that noise is included in both the input signals, and the uttered voice to be demultiplexed is included in any one of the input signals so that the utterance period judgment unit may judge the utterance period correctly. Moreover, in the case that the utterance period judgment unit carries out the judgment on the basis of the cross spectrum, it is necessary that the uttered voice to be demultiplexed is included in both the input signals.

The demultiplexing matrix optimization calculation unit optimizes the demultiplexing matrix on the basis of the demultiplexed signal which is outputted by the demultiplexing processing unit.

In the case that the utterance period judgment unit judges that it is within the utterance period, the optimization calculation on/off control unit makes the demultiplexing matrix optimization calculation unit carry out the optimization process, and in the case that the utterance period judgment unit does not judge that it is within the utterance period, the optimization calculation on/off control unit makes the demultiplexing matrix optimization calculation unit suspend the optimization process.

THE PRECEDING TECHNICAL LITERATURE

Patent Literature

[Patent literature 1] Japanese Patent Application Laid-Open No. 2007-034184

[Patent literature 2] Japanese Patent Application Laid-Open No. 2007-264432

[Patent literature 3] Japanese Patent Application Laid-Open No. 2005-227512

[Non-patent literature]

[Non-patent literature 1] R. Mukai, H. Sawada, S. Araki, S. Makino, "Blind Source Separation for Moving Speech Signals Using Blockwise ICA and Residual Crosstalk Subtraction," IEICE Trans. Fundamentals, vol. E87-A, no. 8, August 2004.

BRIEF SUMMARY OF THE INVENTION

Problem to be Solved by the Invention

Generally, a demultiplexing matrix, which demultiplexes input signals from mixed signals each of which includes mixture of plural input signals, is updated through learning on the basis of statistics of the input signals. In order to obtain the good demultiplexing matrix, a large number of input signals are needed so that effective statistics can be calculated.

In the case that an input signal unsuited to the demultiplexing, for example, a no-sound signal (signal carrying no sound) which is not effective in calculating the statistics, exists in a plurality of the frames which continue from the current frame to the past frames, it is impossible to calculate the correct statistics according to the method described in the patent literature 1. That is, the method described in the patent literature 1 has a problem that, in the case that the no-sound signal exists in a plurality of the frames which continue from the current frame to the past frame, it is impossible to calculate the correct demultiplexing matrix, and consequently demultiplexing performance becomes degraded.

Moreover, according to the method described in the patent literature 1, the learning process is carried out to the demultiplexing matrix so that the input signal, which includes mixture of the plural sound source signals, may be demultiplexed into each sound source signal. In this case, it is necessary that the input signal for calculating the statistics includes mixture of the signals from all the sound sources. Accordingly, in the case that the input signal, which does not include mixture of the signals from all the sound sources, exists within a plurality of the frames which continue from the current frame to the past frame, it is impossible to calculate the correct statistics, and consequently to calculate the correct demultiplexing matrix. That is, the method described in the patent literature 1 has a problem that, in the case that the input signal, which does not include mixture of the signals from all the sound sources, exists within a plurality of the frames which continue from the current frame to the past frame, the demultiplexing performance becomes degraded.

Moreover, according to the sound source demultiplexing method described in the patent literature 1, even if the input signal is unsuited to the demultiplexing, for example, even if the input signal includes the no-sound signal, the process of optimizing the demultiplexing matrix is continued. Accordingly, the method described in the patent literature 1 has a problem that, in the case that the input signal is unsuited to the demultiplexing, for example, in the case that the input signal includes the no-sound signal, it is impossible to calculate the correct demultiplexing matrix, and consequently the demultiplexing performance becomes degraded.

According to the sound source demultiplexing method described in the patent literature 2, the encoder judges whether the input signal can be demultiplexed, and outputs one mixed signal including mixture of only the input signals which can be demultiplexed surely, together with the parameter for determining the demultiplexing matrix. The decoder carries out demultiplexing the signal on the basis of the mixed signal, which can be demultiplexed surely, by use of the demultiplexing matrix which is determined by the parameter. Accordingly, the sound source demultiplexing method described in the patent literature 2 has a problem that, in the case that the input signal is unsuited to the demultiplexing, it is impossible to demultiplex the signal.

According to the method described in the patent literature 3, the process of optimizing the demultiplexing matrix is suspended while it is not judged to be within the utterance period. Accordingly, the sound source demultiplexing method described in the patent literature 2 has a problem that, in the case that the demultiplexing matrix does not converge at the optimized matrix, the process of optimizing the demultiplexing matrix is not carried out as far as it is not judged to be within the utterance period, and consequently a state that the demultiplexing performance is degraded continues. Moreover, according to the sound source demultiplexing method described in the patent literature 3, a case that the process of demultiplexing the signal can be carried out is limited to the case that the noise is included in both of two input signals and the voice is included in any one of two input signals, and the case that the voice is included in both of the input signals because of implementing the utterance period judging unit. Therefore, the sound source demultiplexing method described in the patent literature has a problem that it is impossible to carry out the process of demultiplexing the signal to any input signal.

Object of the Present Invention

An object of the present invention is to provide a signal demultilpexing system which can restrain the degradation in the demultiplexing performance even if the signal unsuited to the demultiplexing is inputted.

Means to Solve the Problem

A signal demultiplexing device, comprising: an input signal analysis means for determining whether or not a plurality of input signals are suited to demultiplexing; a data memory means for storing data of frequency-domain input signals which result from transformation of the plural input signals into frequency-domain signals; a selection control means for storing the frequency-domain input signals in the data memory means if the input signal analysis means has determined that a plurality of the input signals are suited to generation of a demultiplexing matrix for the demultiplexing, and which does not store the frequency-domain input signals in the data memory means if the input signal analysis means has not determined that a plurality of the input signals are suited to the generation of the demultiplexing matrix for the demultiplexing; and a demultiplexing matrix generation means for generating the demultiplexing matrix by use of the frequency-domain input signals including the latest and the past frequency-domain input signals stored in the data memory means.

A signal demultiplexing method, comprising: determining whether a plurality of input signals are suited to demultiplexing; storing frequency-domain input signals, which result from transformation of the plural input signals into frequency-domain signals, in a data memory means which stores the frequency-domain input signals, in the case that an input signal analysis means determines that a plurality of the input signals are suited to the demultiplexing; and generating a demultiplexing matrix by use of the frequency-domain input signals which the data memory means stores.

A non-transitory computer readable medium to store a program which makes a computer work as: an input signal analysis means for determining whether or not a plurality of input signals are suited to demultiplexing; a data memory means for storing frequency-domain input signals resulting from transformation of the plural input signals into frequency-domain signals; a selection control means for storing the frequency-domain input signals in the data memory means if the input signal analysis means has determined that a plurality of the input signals are suited to generation of a demultiplexing matrix for the demultiplexing, and which does not store the frequency-domain input signals in the data memory means if the input signal analysis means has determined that a plurality of the input signals are not suited to the generation of the demultiplexing matrix for the demultiplexing; and a demultiplexing matrix generation means for generating the demultiplexing matrix by use of the frequency-domain input signals stored in the data memory means.

Effect of the Invention

The present invention has an effect that it is possible to restrain degradation in the demultiplexing performance, even if a signal which is unsuited to demultiplexing is inputted.

BRIEF DESCRIPTION OF THE DRAWINGS

FIG. 1 is a block diagram showing a configuration according to a first exemplary embodiment.

FIG. 2 is a flowchart showing an operation according to the first exemplary embodiment.

FIG. 3 is a block diagram showing a configuration according to a second exemplary embodiment.

FIG. 4 is a block diagram showing a configuration of a data selection memory unit according to the second exemplary embodiment.

FIG. 5 is a flowchart showing an operation according to the second exemplary embodiment.

FIG. 8 is a flowchart showing an operation according to the third exemplary embodiment.

FIG. 9 is a block diagram showing a configuration according to a fourth exemplary embodiment.

FIG. 10 is a block diagram showing a configuration of a data selection memory unit according to the fourth exemplary embodiment.

FIG. 11 shows a method for storing a frequency-domain input signal.

FIG. 12 shows a method for storing the frequency-domain input signal.

FIG. 13 is a flowchart showing an operation according to the fourth exemplary embodiment.

FIG. 14 is a block diagram showing a configuration according to a fifth exemplary embodiment.

FIG. 15 is a block diagram showing a configuration of a data selection memory unit according to the fifth exemplary embodiment.

FIG. 16 is a flowchart showing an operation according to the fifth exemplary embodiment.

FIG. 17 is a block diagram showing a configuration according to a sixth exemplary embodiment.

FIG. 18 is a block diagram showing a configuration of a data selection memory unit according to the sixth exemplary embodiment.

FIG. 19 is a flowchart showing an operation according to the sixth exemplary embodiment.

FIG. 20 is a block diagram showing a configuration according to a seventh exemplary embodiment.

FIG. 21 is a block diagram showing a configuration of a data selection memory unit according to the seventh exemplary embodiment.

FIG. 22 is a flowchart showing an operation according to the seventh exemplary embodiment.

FIG. 23 is a block diagram showing a configuration according to an eighth exemplary embodiment.

FIG. 24 is a block diagram showing a configuration of a data selection memory unit according to the eighth exemplary embodiment.

FIG. 25 is a flowchart showing an operation according to the eighth exemplary embodiment.

FIG. 26 is a block diagram showing a configuration according to a ninth exemplary embodiment.

FIG. 27 is a block diagram showing a configuration of a data selection memory unit according to the ninth exemplary embodiment.

FIG. 28 is a flowchart showing an operation according to the ninth exemplary embodiment.

FIG. 29 is a block diagram exemplifying composition of processes described in a non-patent literature 1.

FIG. 30 shows operation timing in each processing unit according to the second exemplary embodiment.

FIG. 31 shows operation timing in each processing unit according to the second exemplary embodiment.

FIG. 32 shows operation timing in each processing unit according to the second exemplary embodiment.

FIG. 33 shows operation timing in each processing unit according to the fourth exemplary embodiment.

FIG. 34 shows operation timing in each processing unit according to the fourth exemplary embodiment.

FIG. 35 shows operation timing in each processing unit according to the fourth exemplary embodiment.

FIG. 36 is a block diagram showing a configuration according to a tenth exemplary embodiment.

DESCRIPTION OF THE CODES

Figure 1:
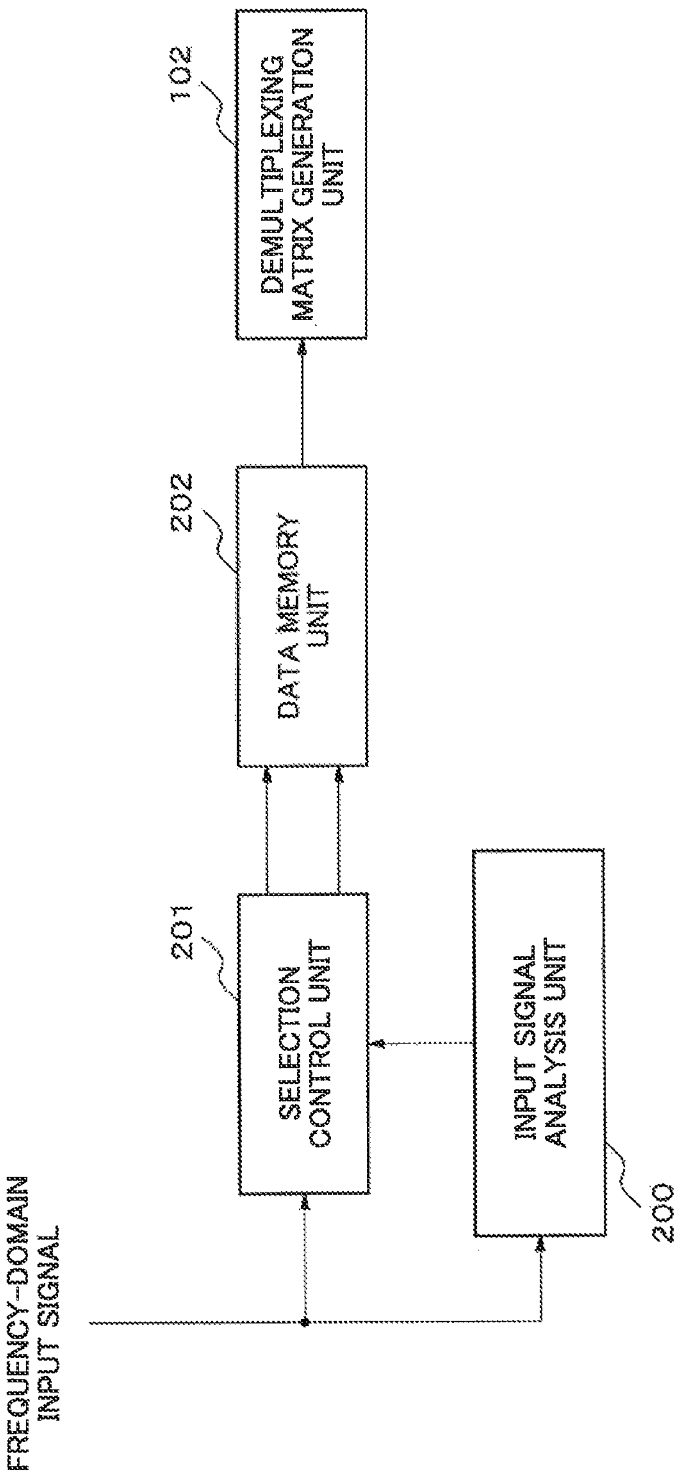
[FIG. 1]

1 Computer
2 Signal input unit
3 Demultiplexed signal output unit
4 Program memory unit
5, 202 and 301 Data memory unit
10 CPU
100 Frequency transformation unit
101, 302, 400, 600, 702, 802, 901 and 1002 Data selection memory unit
102 Demultiplexing matrix generation unit
103 and 401 Demultiplexed signal generation unit
104 Inverse frequency transformation unit
200, 500, 700, 800 and 1000 Input signal analysis unit
201, 300, 701, 801, 900 and 1001 Selection control unit

Exemplary Embodiment to Carry Out the Invention

[First Exemplary Embodiment]

Next, the present invention will be described in detail with reference to a drawing.

FIG. 1 shows a configuration according to a first exemplary embodiment of a signal demultiplexing device according to the present invention.

With reference to FIG. 1, the signal demultiplexing device according to the exemplary embodiment includes a demultiplexing matrix generation unit 102, an input signal analysis unit 200, a selection control unit 201 and a data memory unit 202.

From frequency-domain input signals which are read from the data memory unit 202, the demultiplexing matrix generation unit 102 generates a demultiplexing matrix which demultiplexes a frequency-domain input signal into a signal for each signal source. The demultiplexing matrix generation unit 102 generates the demultiplexing matrix, for example, through carrying out a learning process by use of the frequency-domain input signals on the basis of a predetermined initial value of the demultiplexing matrix. The input signal analysis unit 200 receives a frequency-domain input signal, and judges whether the frequency-domain input signal is suited to the learning process. The selection control unit 201 makes the data memory unit 202 store only the frequency-domain input signals which are judged by the input signal analysis unit 200 to be suited to the learning process. The demultiplexing matrix generation unit 102 carries out the learning process by use of the frequency-domain input signals which are stored in the data memory unit 202 to generate the demultiplexing matrix. Hereinafter, the more detailed will be described in the following.

A frequency-domain input signal is a set of a plurality of signals which are result from transformation of plural time-domain input signals (not shown in the figure), which the signal demultiplexing device inputs, into frequency-domain signals in a unit of a predetermined time length. Targets of the process according to the exemplary embodiment of the present invention are signals which have the predetermined time length. A unit of a signal for processing is called a frame. The input signal is a set of signals generated, for example, through sensing signals, which a plurality of the signal sources output, by use of a plurality of sensors. Each of the signals which are sensed by use of a plurality of the sensors includes mixture of the signals which a plurality of the signal sources output. However, each of the plural signal sources may not always output the signal. Moreover, each of the plural inputted signals may not always include the signals from all of the signal sources. Accordingly, the whole frequency-domain input signal may be null over a whole of frequency band in some cases.

The input signal analysis unit 200 judges with a predetermined method whether the input signal is suited to being used in the learning process in which the demultiplexing matrix generation unit 102 described later generates the demultiplexing matrix. The input signal analysis unit 200 notifies the selection control unit 201 of the judgment result. Hereinafter, that the input signal is suited to being used in the learning process for generating the demultiplexing matrix, or that the input signal is suited to generating the demultiplexing matrix means that it can be expected to improve accuracy in demultiplexing a signal by the demultiplexing matrix, in the case that the learning process is carried out to the demultiplexing matrix by use of the frequency-domain input signal which result from the transformation of the input signal into the frequency-domain signal. Conversely, that the input signal is not suited means that the accuracy in demultiplexing a signal by the demultiplexing matrix is degraded due to the learning process.

As a method to judge whether the input signal is suited to generating the demultiplexing matrix, a method to analyze whether the input signal is in a state of no-signal, such as a state that all the signals of the input signal have values of zero or almost zero respectively, for a predetermined period of time is exemplified. In the case that the demultiplexing matrix generation unit 102 generates the demultiplexing matrix using the input signal which is in the state of no-signal, the accuracy in demultiplexing a signal by the demultiplexing matrix is lowered. Therefore, it is preferable that the input signal analysis unit 200 judges that the input signal is not suited to generating the demultiplexing matrix, in the case that the input signal is in the state of no-signal. On the other hand, in the case that the input signal is in a state of not no-signal, it is preferable that the input signal analysis unit 200 judges that the input signal is suited to generating the demultiplexing matrix. The state that the input signal is not in the state of no-signal means, for example, a state that any signal of the input signal has value of non-zero for the predetermined period of time. As a method to judge whether a certain input signal is in the state of no-signal, it is preferable to judge that the input signal is in the state of no-signal in the case that each power of all the frequency-domain input signals, which result from the transformation of the input signals into the frequency-domain signals, is zero.

Moreover, in the case that the demultiplexing matrix generation unit 102 carries out the learning process using the input signal, which do not include the signal from any one signal source out of the plural signal sources, to generate the demultiplexing matrix, the accuracy in demultiplexing a signal by the demultiplexing matrix is lowered. Accordingly, it may be preferable that, in the case that each of the plural input signals does not include the signal from any one of the signal sources, the input signal analysis unit 200 may judge that the input signal is not suited to generating the demultiplexing matrix. When the accuracy in demultiplexing a signal by the demultiplexing matrix reaches high level, signals which are demultiplexed by the demultiplexed matrix are expected to be coincident with the signals which the signal sources generate respectively. For example, in the case that the demultiplexed signal, which is demultiplexed by the generated demultiplexing matrix, includes a signal (not shown in the figure) whose value is zero for a predetermined period of time, it is possible to judge that the signal from any one of the signal sources is not included in each input signal.

In the case that the input signal analysis unit 200 judges that the input signal is suited to generating the demultiplexing matrix, the selection control unit 201 makes the data memory unit 202 store the frequency-domain input signal. On the other hand, in the case that the input signal analysis unit 200 judges that the input signal is not suited to generating the demultiplexing matrix, the selection control unit 201 does not make the data memory unit 202 store the frequency-domain input signal. In the case that the data memory unit 202 has no area to store new data, the selection control unit 201, for example, deletes data, which has the longest elapse time since a time when stored, out of data of the frequency-domain input signals stored in the data memory unit 202, and then stores new data.

The data memory unit 202 stores the frequency-domain input signal in association with information which indicates the elapse time. Frame number is exemplified as the information indicating the elapse time. The frame number is, for example, number which is assigned to each frame in an ascending order.

The demultiplexing matrix generation unit 102 reads the frequency-domain input signals of the plural frames, which include the past frames, from the data memory unit 202. When reading the frequency-domain input signal, it may be preferable that the demultiplexing matrix generation unit 102 reads, for example, all the frequency-domain input signals stored in the data memory unit 202. It may be also preferable that the demultiplexing matrix generation unit 102 reads a part of the frequency-domain input signals which are selected by use of some means. The demultiplexing matrix generation unit 102 generates the demultiplexing matrix, which is used for demuliplexing the frequency-domain input signal into a frequency-domain demultiplexed signal for each signal source. As mentioned later, the demultiplexing matrix generates a vector whose element is a value of a frequency-domain demultiplexed signal in a specific frequency band for each signal source. The demultiplexing matrix generation unit 102 generates the demultiplexing matrix for each of the frequency bands. The frequency-domain demultiplexed signals in a frequency band are calculated through multiplying a vector, whose elements are the values of the plural signals of frequency-domain input signal in the corresponding frequency band, by the demultiplexing matrix. A demultiplexed signal for each signal source is generated through transforming the frequency-domain demultiplexed signals, which is determined over all frequency bands, into a time-domain signal. It is possible to generate the demultiplexing matrix, for example, through carrying out the learning process based on ICA (independent component analysis). The method of generating the demultiplexing matrix on the basis of ICA will be described later.

Next, an operation according to the exemplary embodiment will be described in detail with reference to a drawing.

Figure 2:
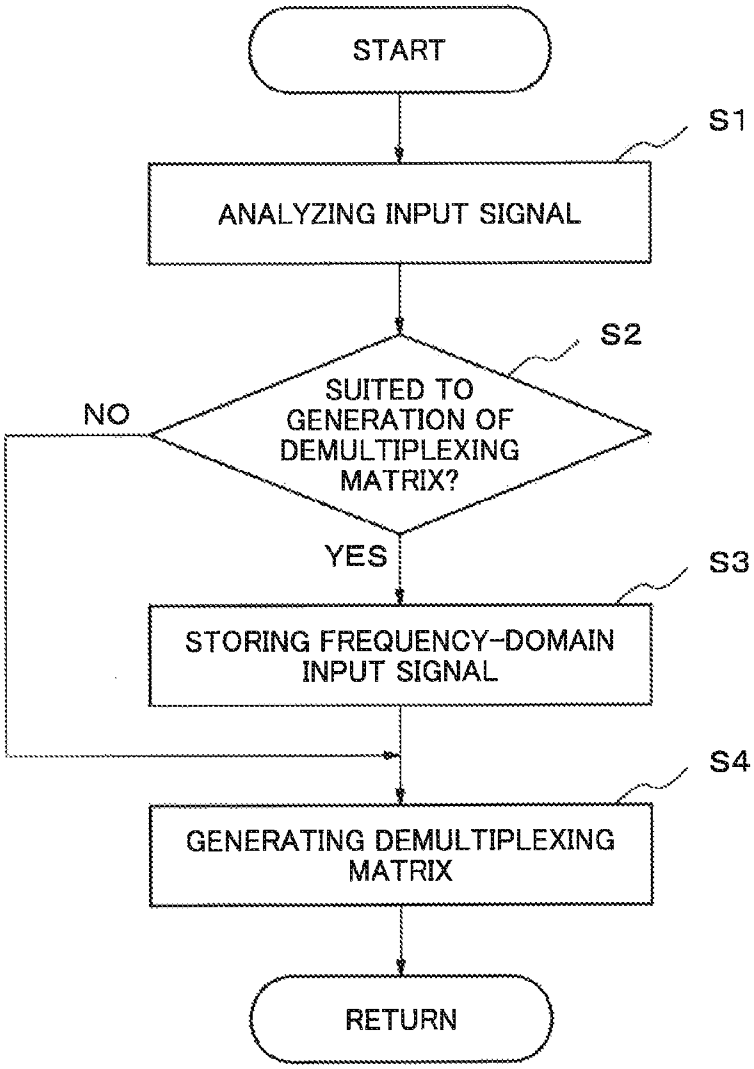
[FIG. 2]

FIG. 2 shows an operation of the signal demultiplexing device according to the exemplary embodiment.

With reference to FIG. 2, the input signal analysis unit 200 judges firstly whether the inputted frequency-domain input signal is suited to generating the demultiplexing matrix (Step S1). In the case that the frequency-domain input signal is suited to generating the demultiplexing matrix (Yes in Step S2) as a result of the judgment in Step S1, the selection control unit 201 makes the data memory unit 202 store the frequency-domain input signal (Step S3), and the operation proceeds to Step S4. In the case that the frequency-domain input signal is not suited to generating the demultiplexing matrix (No in Step S2), the operation proceeds to Step S4.

Next, the demultiplexing matrix generation unit 102 reads a part of or a whole of the frequency-domain demultiplexed signals stored in the data memory unit 202. The demultiplexing matrix generation unit 102 generates the demultiplexing matrix by use of the read frequency-domain demultiplexed signal (Step S4).

The signal demultiplexing device according to the exemplary embodiment repeats the operation, which starts from "start" indicated in the flowchart and ends at "return" indicated in the flowchart, for each frame. Here, in the case of another exemplary embodiment described later, an operation, which starts from "start" indicated in a flowchart showing an operation according to another exemplary embodiment and ends at "return" indicated in the flowchart, is repeated for each frame similarly to the present exemplary embodiment.

According to the exemplary embodiment, an effect that degradation of demultiplexing performance is restrained is obtained, even if the signal, which is not suited to the demultiplexing, is inputted.

The reason is that the signal demultiplexing device according to the exemplary embodiment generates the demultiplexing matrix by use of the frequency-domain input signals of the plural frames which the data memory unit 202 stores and which include the current frame and the past frames and which are suited to generating the demultiplexing matrix. The signal demultiplexing device according to the exemplary embodiment judges whether the input signal is suited to generating the demultiplexing matrix. Then, the signal demultiplexing device according to the exemplary embodiment makes the data memory unit 202 store only the input signal which is suited to generating the demultiplexing matrix.

[Second Exemplary Embodiment]

Next, a second exemplary embodiment of the present invention will be described in detail with reference to a drawing.

Figure 3:
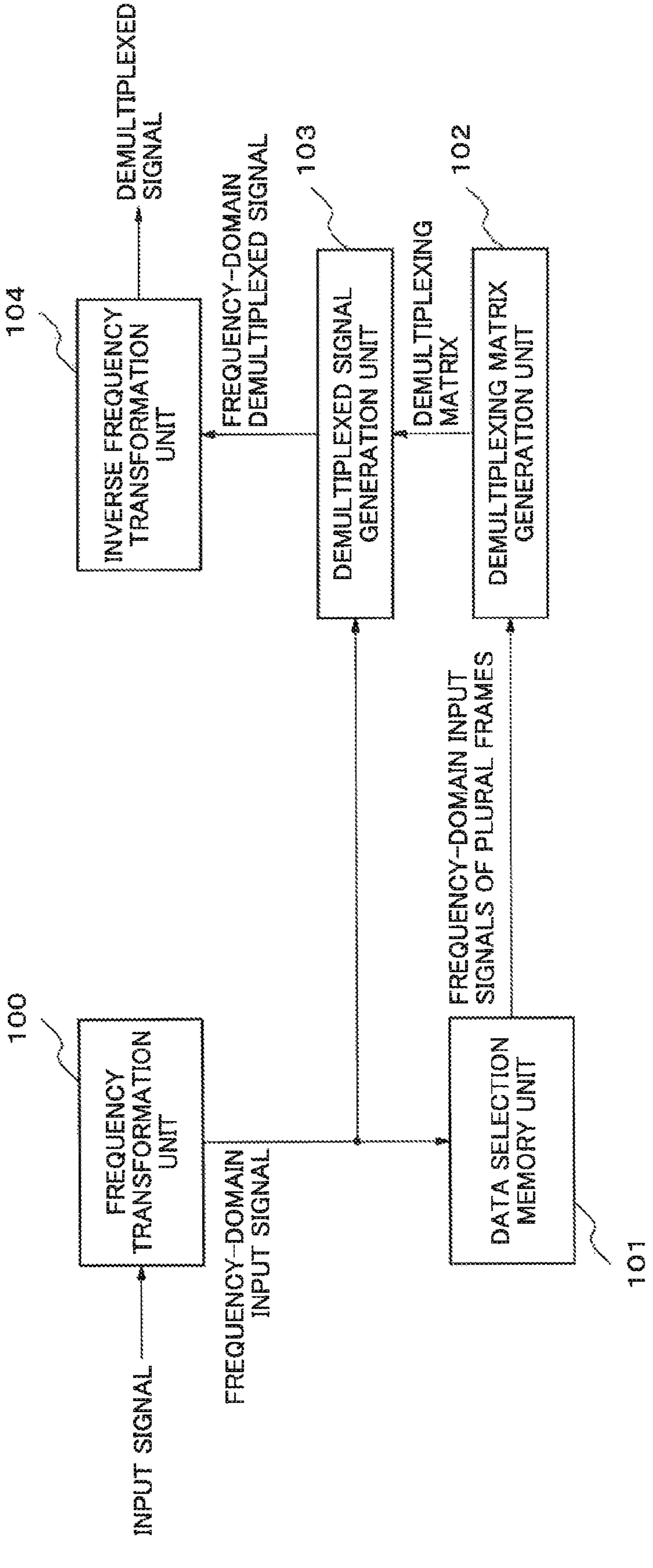
[FIG. 3]

FIG. 3 shows a configuration according to the exemplary embodiment.

With reference to FIG. 3, the signal demultiplexing device according to the exemplary embodiment includes a frequency transformation unit 100, a data selection memory unit 101, the demultiplexing matrix generation unit 102, a demultiplexed signal generation unit 103 and an inverse frequency transformation unit 104.

The frequency transformation unit 100 generates a frequency-domain input signal through carrying out frequency transformation to an input signal by the frame which has a predetermined time length, and outputs the frequency-domain input signal to the data selection memory unit 101 and the demultiplexed signal generation unit 103. The frequency transformation unit 100 can carry out the frequency transformation, for example, by use of DFT. Here, it may be preferable that a transformation block length for the frequency transformation is the same as the frame length or longer than the frame length. In the case that the transformation block length is longer than the frame length, the frequency transformation unit 100, for example, can carry out the frequency transformation to data whose transformation block length is two times longer than the frame length. In this case, it is preferable that the frequency transformation unit 100 carries out the frequency transformation to data existing in the transformation block which includes the current frame and the frame previous to the current frame by one frame.

Here, under an assumption that the input signals are obtained through observing sounds, which a plurality of sound sources generate, by use of a plurality of sensors, description will be provided in the following.

The data selection memory unit 101 stores only the frequency-domain input signals of the frames which are suited to generating the demultiplexing matrix, out of the inputted frequency-domain input signals. Moreover, the data selection memory unit 101 sends the stored frequency-domain input signals of the plural frames to the demultiplexing matrix generation unit 102 which generates the demultiplexing matrix.

Next, a configuration of the data selection memory unit 101 according to the exemplary embodiment will be described in detail with reference to a drawing.

Figure 4:
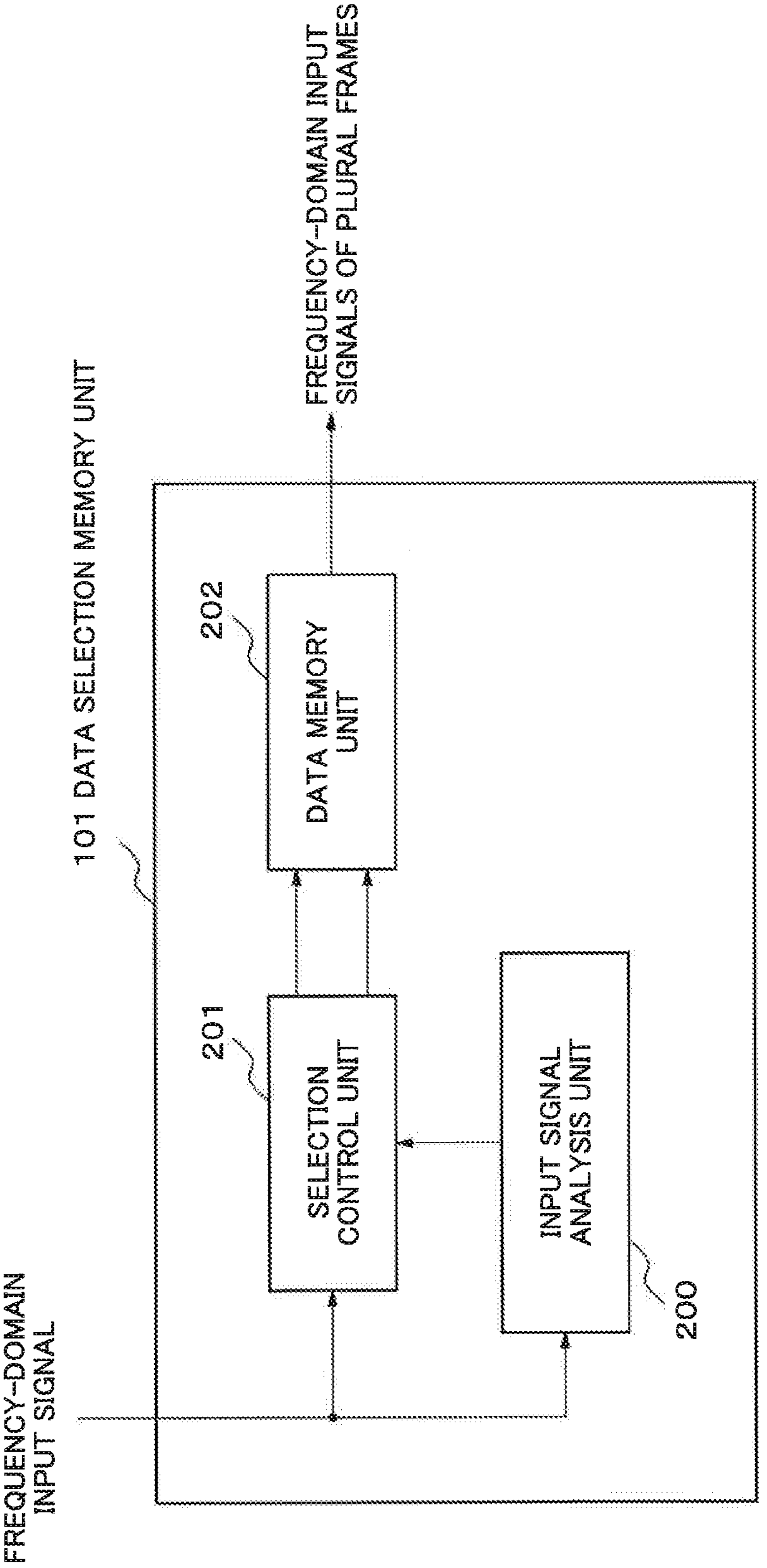
[FIG. 4]

FIG. 4 shows the configuration of the data selection memory unit 101 of the signal demultiplexing device according to the exemplary embodiment.

With reference to FIG. 4, the data selection memory unit 101 includes the input signal analysis unit 200, the selection control unit 201 and the data memory unit 202.

The input signal analysis unit 200 judges whether the input signal is suited to generating the demultiplexing matrix and notifies the selection control unit 201 of the judgment result. As described later, through judging whether the input signal is in a state of no-sound, the input signal analysis unit 200 judges whether the input signal is suited to generating the demultiplexing matrix, according to the exemplary embodiment. Moreover, according to the exemplary embodiment, the input signal analysis unit 200 judges whether the input signal is in the state of no-sound through analyzing the frequency-domain input signal. Furthermore, the input signal analysis unit 200 notifies the selection control unit 201 of the judgment result through sending a value called an analysis value. However, to send the analysis value is an exemplified method for the notification of the judgment result. The method for the notification of the judgment result is not limited to sending the analysis value. Furthermore, the method for the judgment and the notification, which is described in all the exemplary embodiments including the present exemplary embodiment, is only an example, and the range of the present invention is not limited to the description of the exemplary embodiment.

The input signal analysis unit 200 analyzes the frequency-domain input signal, and judges whether the input signal is in the state of no-sound. The input signal analysis unit 200 indicates the result of judgment whether the input signal is in the state of no-sound as the analysis value, and outputs the analysis value to the selection control unit 201. It is preferable that the input signal analysis unit 200 analyzes the frequency-domain input signal, for example, through measuring each power of the frequency-domain input signal. Moreover, it is preferable that the input signal analysis unit 200 judges that the input signal is in the state of no-sound in the case that all the power values are smaller than threshold levels respectively, and judges that the input signal is in a state of sound existence in other cases. It is preferable, for example, that the input signal analysis unit 200 sets the analysis value to 0 in the case of the judgment that the input signal is in the state of no-sound, and sets the analysis value to 1 in the case of the judgment that the input signal is in the state of sound existence.

In the case that the input signal is in the state of sound existence, the selection control unit 201 outputs the frequency-domain input signal to the data memory unit 202, and in the case that the input signal is in the state of no-signal, the selection control unit 201 does not output the frequency-domain input signal. In the case that the input signal analysis unit 200 sets the analysis value as mentioned above, it is preferable that the selection control unit 201 outputs the frequency-domain input signal to the data memory unit 202 when the analysis value is 1. Moreover, when the analysis value is 0, it is preferable that the selection control unit 201 does not output the frequency-domain input signal. In the case that the selection control unit 201 outputs the frequency-domain input signal, the selection control unit 201 outputs update information, which makes the data memory unit 202 store the frequency-domain input signal, to the data memory unit 202. The update information designates the frequency-domain input signal which should be deleted so as to be replaced by the new frequency-domain input signal when the data memory unit 202 stores newly the frequency-domain input signal which the selection control unit 201 outputs. For example, frame number of the frequency-domain input signal, which has the longest elapse time since being stored out of the frequency-domain input signals stored in the data memory unit 202, is exemplified as the update information. The selection control unit 201 can calculate the elapse time on the basis of a difference between the frame number of the frequency-domain input signal which the data memory unit 202 stores and the frame number of the current frequency-domain input signal.

The data memory unit 202 stores the frequency-domain input signals of the plural frames. In the case that the data memory unit 202 inputs the update information and the frequency-domain input signal newly, the data memory unit 202 deletes the frequency-domain input signal of the frame which the update information designates, and stores the inputted frequency-domain input signal newly.

Moreover, it may be preferable that the analysis value has not two discrete values as mentioned above but a continuous value. In this case, the input signal analysis unit 200 and the selection control unit 201 operate as shown in the following.

The input signal analysis unit 200 analyzes the frequency-domain input signal and outputs the analysis value, which indicates the state of no-sound, to the selection control unit 201. The input signal analysis unit 200 can set the analysis value, which the input signal analysis unit 200 outputs, for example, as follows. The input signal analysis unit 200 measures, for example, the power of the frequency-domain input signal. In the case that the power is lower than a lower limit threshold value, it is preferable that the input signal analysis unit 200 judges that the frequency-domain input signal is in the state of no-sound, and sets the analysis value to 0. In the case that the power is larger than an upper limit threshold value, it is preferable that the input signal analysis unit 200 judges that the frequency-domain input signal is in the state of sound existence, and sets the analysis value to 1. In other cases, it is preferable that the input signal analysis unit 200 sets the analysis value to a value, which is not smaller than 0 and not larger than 1, through carrying out an interpolation process on the basis of the power of the frequency-domain input signal. The input signal analysis unit 200 can use the linear interpolation method as the interpolation process.

The selection control unit 201 holds the analysis value corresponding to each of the frames which the data memory unit 202 stores. The selection control unit 201 sets, as the update information, the frame number of the frame which has the smallest analysis value out of the analysis values of the plural frames stored in the data memory unit 202. Then, the selection control unit 201 outputs the frequency-domain input signal and the update information to the data memory unit 202. Through using the continuous value as the analysis value, the selection control unit 201 can delete the frame in an order of smallness of the analysis value of the frame, that is, in an order of closeness to the state of no-sound. In this case, it is possible to store the frequency-domain input signal which is more suited to demultiplexing the signal than the case of using two discrete values as the analysis value as mentioned above.

Moreover, in the case that the input signal analysis unit 200 outputs the continuous analysis value to the selection control unit 201 as mentioned above, it may be preferable that the selection control unit 201 operates as shown in the following.

In the case that there is a frame whose elapse time since being stored in the data memory unit 202 exceeds a predetermined time, the selection control unit 201 set the frame number of the frame as the update information. In the case that there is no frame whose elapse time since being stored in the data memory unit 202 exceeds the predetermined time, the selection control unit 201 sets, as the update information, the frame number of the frame which has the smallest analysis value out of the analysis values of the plural frames stored in the data memory unit 202. The selection control unit 201 outputs the frequency-domain input signal and the update information, which is set as mentioned above, to the data memory unit 202. Similarly to the above mention, it is possible to calculate the elapse time since being stored in the data memory unit 202.

Moreover, it may be preferable that the selection control unit 201 operates as shown in the following. The selection control unit 201 makes the analysis value of each of the frames, which is stored in the data memory unit 202, close to zero gradually every time when a new frame is inputted. The selection control unit 201 sets frame number of the frame, which has the smallest analysis value, as the update information. Then, the selection control unit 201 outputs the frequency-domain input signal and the update information to the data memory unit 202. The selection control unit 201 can make the analysis value close to zero gradually, for example, through multiplying the analysis value of each of the frames by a coefficient $\alpha$ ($0.0<\alpha<1.0$) every time when a new frame is inputted.

Next, returning to FIG. 3, an operation of the demultiplexing matrix generation unit 102 will be described. The demultiplexing matrix generation unit 102 carries out a learning and calculation process to the demultiplexing matrix by use of the frequency-domain input signals of the plural frames which are read from the data memory unit 202 shown in FIG. 4. Then, the demultiplexing matrix generation unit 102 outputs the calculated demultiplexing matrix to the demultiplexed signal generation unit 103. The demultiplexing matrix generation unit 102 can carry out the learning and calculation process to the demultiplexing matrix, for example, by use of ICA. Hereinafter, the learning and calculation process, which is carried out to the demultiplexing matrix on the basis of ICA, will be described. Xi(f), i=1, 2, . . . , M (M is number of input channels) in the following formula is the frequency-domain input signal in a certain frequency band f. Moreover, Yi(f), i=1, 2, . . . , N (N is number of output channels) is a frequency-domain demultiplexed signal. The demultiplexing matrix generation unit 102 calculates a frequency component (hereinafter, denoted as demultiplexing matrix) W (f) of the demultiplexing matrix which satisfies the following formula.

$$\begin{bmatrix} Y_1(f) \\ Y_2(f) \\ \vdots \\ Y_N(f) \end{bmatrix} = W(f) \begin{bmatrix} X_1(f) \\ X_2(f) \\ \vdots \\ X_M(f) \end{bmatrix} \quad \text{[Formula 1]}$$

The demultiplexing matrix W (f) is a matrix of N rows and M columns which is expressed in the following formula.

$$W(f) = \begin{bmatrix} w_{11}(f) & w_{12}(f) & \cdots & w_{1M}(f) \\ w_{21}(f) & w_{22}(f) & \cdots & w_{2M}(f) \\ \vdots & \vdots & \ddots & \vdots \\ w_{N1}(f) & w_{N2}(f) & \cdots & w_{NM}(f) \end{bmatrix} \quad \text{[Formula 2]}$$

The demultiplexing matrix generation unit 102 can calculate the demultiplexing matrix W (f) through carrying out repeated updating by use of the following formula as described in the non-patent literature 2.

$$W(f) \leftarrow W(f) + \mu[I - S(f)]W(f) \quad \text{[Formula 3]}$$

Refer to the non-patent literature 2: Speech Enhancement, Springer, 2005, pp. 299 to 327

Here, $\mu$ in the formula 3 is a step size, and I is the unit matrix. Moreover, S (f) is statistics value which evaluates independence of the frequency-domain demultiplexed signal. The demultiplexing matrix generation unit 102 calculates S (f) according to the following formula.

$$S(f) = E\{\Phi(Y(f,\tau))Y(f,\tau)^H\} = \langle \Phi(Y(f,\tau))Y(f,\tau)^H \rangle_\tau \quad \text{[Formula 4]}$$

Here, $\tau$ in the formula 4 is the frame number. Moreover, E{*} means an expectation value, and Φ(*) means a nonlinear transformation function, and H means complex conjugate transpose, and <*>τ means an operator of time average. Moreover, Y(f,τ) is a vector [Y1(f,τ), . . . , YN(f,τ)]T (T means transpose) which expresses the frequency-domain demultiplexed signal corresponding to frame number τ. [Y1 (f,τ), . . . , YN (f,τ)]T is corresponding to the left side of the formula 1 which is expressed with specifying the corresponding frame number. A function expressed by the following formula is exemplifies as the nonlinear transform function Φ(*).

$$\Phi(Y(f,t)) = \tan h(|Y(f,t)|) \cdot e^{j\,\arg(Y(f,t))} \quad \text{[Formula 5]}$$

Moreover, since it is assumed that the frequency-domain demultiplexed signal Yi(f) has the ergodic property as shown in Formula 4, the demultiplexing matrix generation unit 102 can calculate the expectation value through calculating the time average.

The demultiplexing matrix generation unit 102 can use, for example, the demultiplexing matrix, which is generated in the past learning and calculation process, as an initial value in the repetitive update process shown in Formula 3.

The demultiplexed signal generation unit 103 generates the frequency-domain demultiplexed signal by use of the frequency-domain input signals and the demultiplexing matrix, and outputs the generated frequency-domain demultiplexed signal to the inverse frequency transformation unit 104.

The inverse frequency transformation unit 104 transforms the frequency-domain demultiplexed signal into a demultiplexed signal through carrying out the inverse frequency transformation. The inverse frequency transformation unit 104 can carry out the inverse frequency transformation, for example, by use of IDFT. Here, a transformation block length of the inverse frequency transformation carried out by the inverse frequency transformation unit 104 is the same as one of the frequency transformation carried out by the frequency transformation unit 100 mentioned above. For example, in the case that the frequency transformation unit 100 carries out the frequency transformation whose transformation block length is two times longer than the frame length, the inverse frequency transformation unit 104 outputs the demultiplexed signal which exists in a section where the transformation block of the current frame and the transformation block of the frame previous to the current frame by one frame overlap each other.

Next, an operation of a whole of the signal demultiplexing device according to the exemplary embodiment will be described in detail with reference to a drawing.

Figure 5:
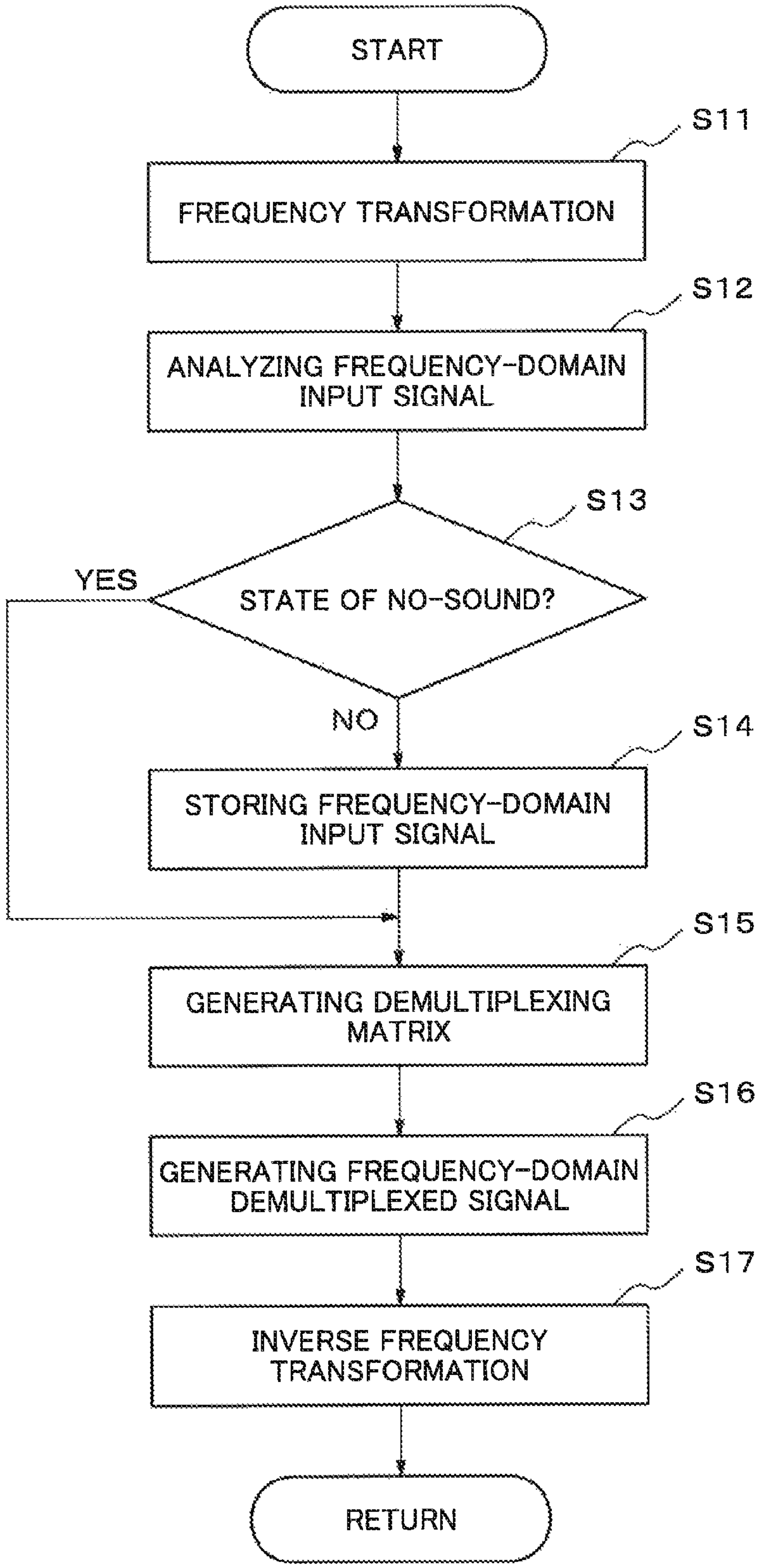
[FIG. 5]

FIG. 5 is a flowchart showing the operation of the signal demultiplexing device according to the exemplary embodiment.

According to FIG. 5, the frequency transformation unit 100 of the signal demultiplexing device according to the exemplary embodiment transforms firstly the input signal into the frequency-domain signal to generate the frequency-domain input signal (Step S11). The input signal analysis unit 200 of the data selection memory unit 101 analyzes the generated frequency-domain input signal, and judges whether the input signal is in the state of no-sound (Step S12). In the case that the input signal is in the state of no-sound (Yes in Step S13), the operation proceeds to Step S15. In the case that the input signal is not in the state of no-sound (No in Step S13), the selection control unit 201 makes the data memory unit 202 store the frequency-domain input signal to which the input signal is transformed (Step S14), and the operation proceeds to Step S15.

The demultiplexing matrix generation unit 102 carries out the learning process by use of the frequency-domain input signals of the plural frames stored in the data memory unit 202 to generate the demultiplexing matrix (Step S15).

The demultiplexed signal generation unit 103 generates the frequency-domain demultiplexed signal from the frequency-domain input signal by use of the demultiplexing matrix which the demultiplexing matrix generation unit 102 generates (Step S16). The inverse frequency transformation unit 104 generates the demultiplexed signal through transforming the frequency-domain demultiplexed signal, which the demultiplexed signal generation unit 103 generates, into a time-domain signal by the inverse frequency transformation (Step S17).

Figure 30:
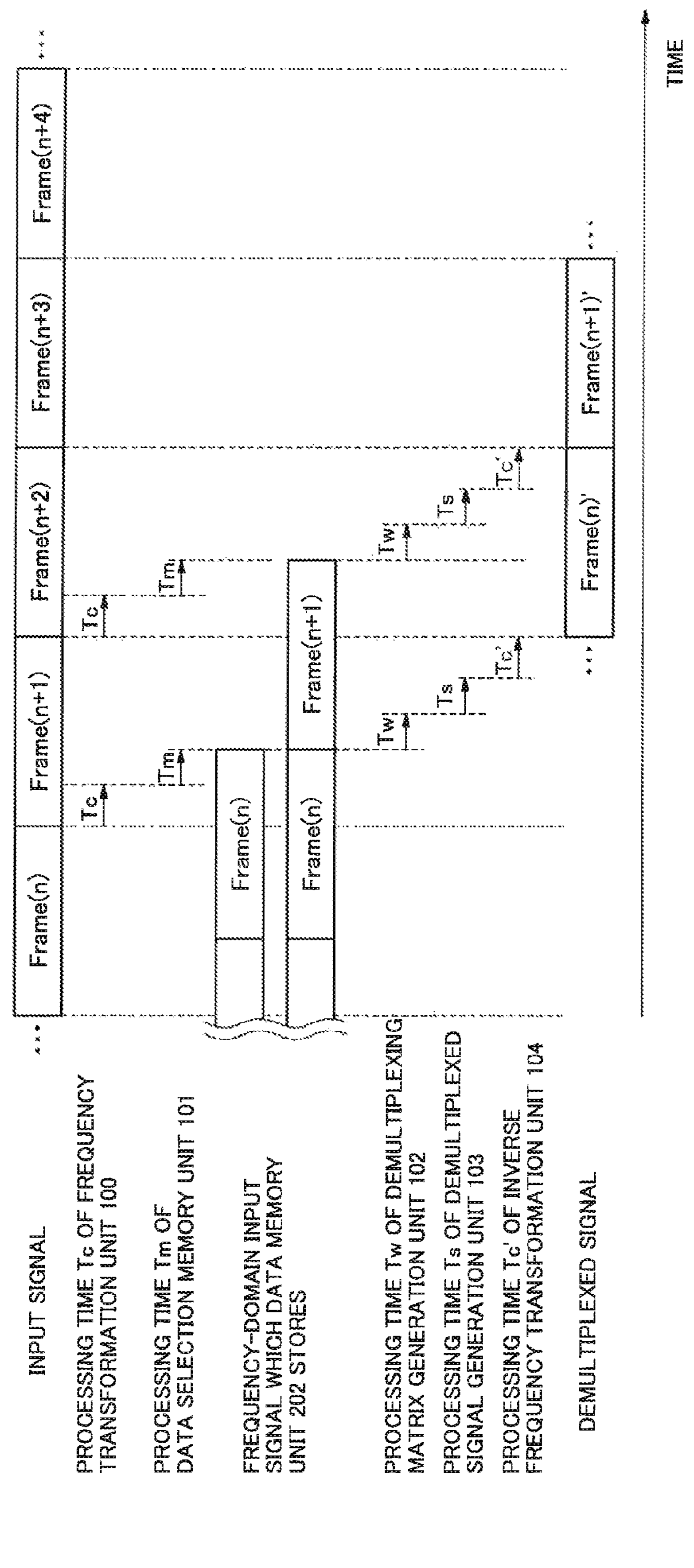
[FIG. 30]

The processes according to the exemplary embodiment can be mainly divided into two groups of the processes, that is, a first group of the processes which is carried out by the frequency transformation unit 100, the data selection memory unit 101, the demultiplexed signal generation unit 103 and the inverse frequency transformation unit 104, and a second group of the processes which is carried out by the demultiplexing matrix generation unit 102. In the case that the signal demultiplexing device operates in real time, each processing unit related to the first group of the processes is needed to operate every frame, differently from a processing unit related to the second group of the processes, in order to output the demultiplexed signal. If a total processing time of two groups of the processes is not longer than one frame time length, it may be preferable that each processing unit operates in turn as shown in FIG. 30. FIG. 30 shows timing of the sequential processes for the input signal in the processing units. Here, in FIG. 30, n means the frame number of the frame at a certain time, and Tc means a processing time of the frequency transformation unit 100, and Tm means a processing time of the data selection memory unit 101, and Tw means a processing time of the demultiplexing matrix generation unit 102, and Ts means a processing time of the demultiplexed signal generation unit 103, and Tc' means a processing time of the inverse frequency transformation unit 104. In this case, the processing units of the frequency transformation unit 100, the data selection memory unit 101, the demultiplexing matrix generation unit 102, the demultiplexed signal generation unit 103, and the inverse frequency transformation unit 104 operate in this order. In the case that each processing unit operates sequentially as mentioned above, it is possible to obtain the preferable demultiplexing performance since the signal demultiplexing device carries out demultiplexing the frequency-domain input signal of the current frame by use of the demultiplexing matrix to which the learning and calculation process is carried out by use of the frequency-domain input signal of the current frame.

Figure 31:
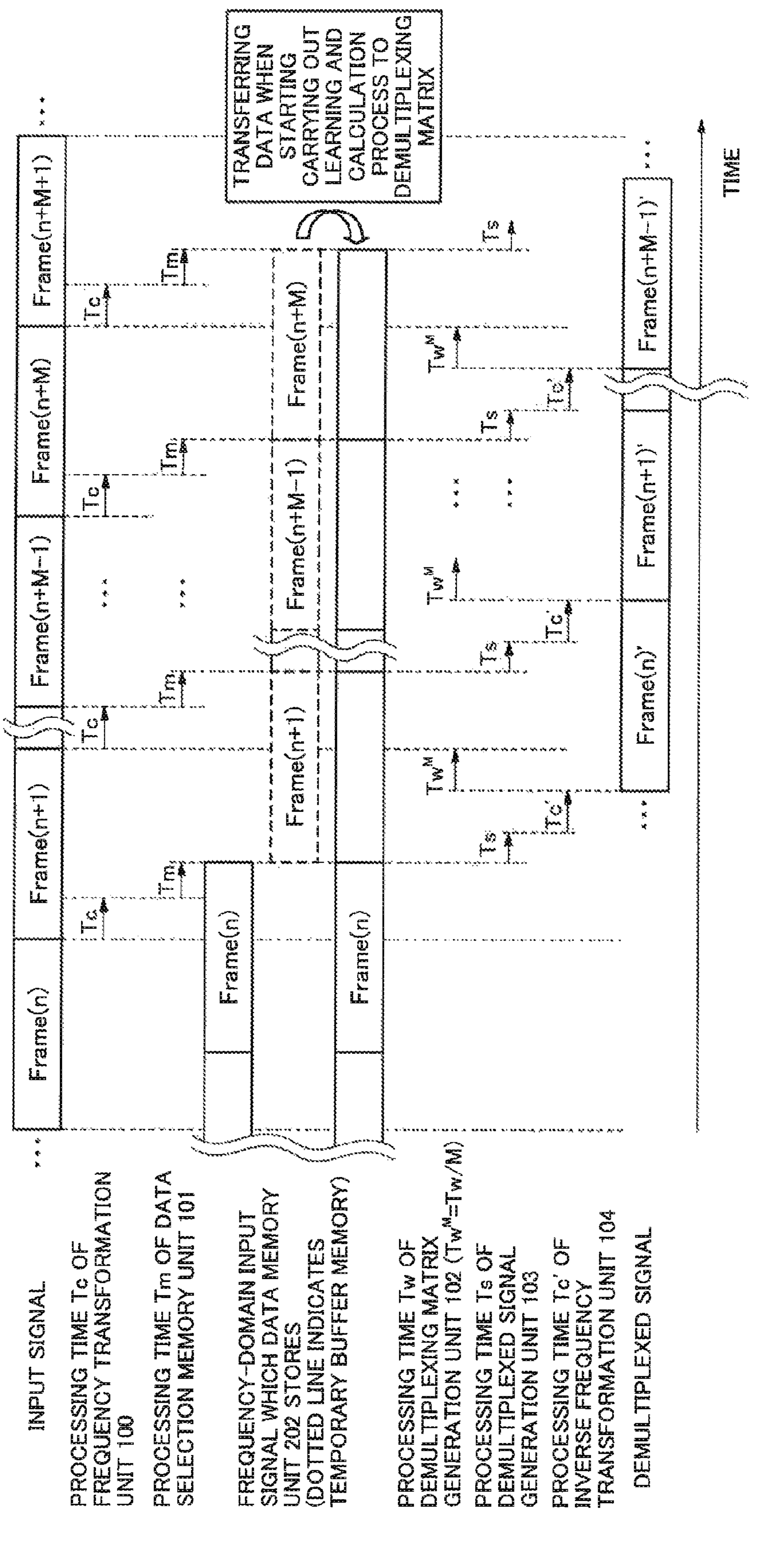
[FIG. 31]

However, the total processing time of two groups of the processes often exceeds one frame time length since the processing time of the demultiplexing matrix generation unit 102 is generally very long. In this case, in order to realize the operation according to the exemplary embodiment in real time, it may be preferable that the demultiplexing matrix generation unit 102 is operated only at a period of time TwM per one frame, where TwM=Tw/M, and the learning and calculation process is carried out once every M frames, as shown in FIG. 31. FIG. 31 shows timing of the sequential processes which the processing units carry out to the input signal, and timing of the learning and calculation process. Here, M satisfies the following inequality formula: TwM<=(one frame time length)−(Tc+Tm+Ts+Tc'). In this case, the processing units of the frequency transformation unit 100, the data selection memory unit 101, the demultiplexed signal generation unit 103, the inverse frequency transformation unit 104, and the demultiplexing matrix generation unit 102 operate in this order. In the case that the processing units operate in this order, the learning and calculation process, which is carried out by the demultiplexing matrix generation unit 102, is completed at the frame n+M, and the demultiplexed signal generation unit 103 can use the demultiplexing matrix, which is the result of the learning and calculation process by use of the frame n+M, in order to process the frame n+M+1. Here, since the multiplexing matrix generation unit 102 carries out the learning and calculation process once every M frames, a buffer memory is additionally needed in order to store temporarily the frequency-domain input signals of M frames which are inputted while the demultiplexing matrix generation unit 102 carries out the learning and calculation process.

Figure 32:
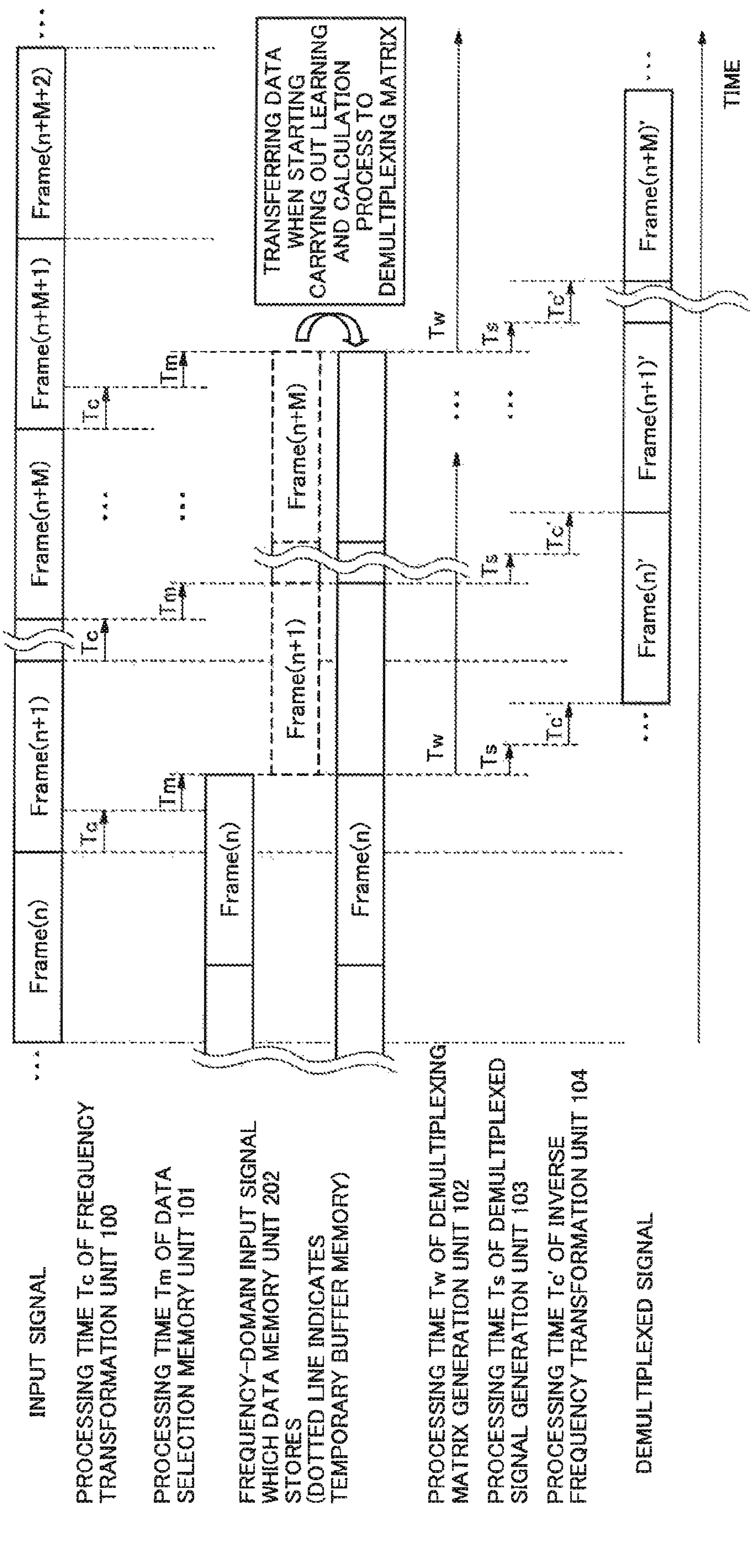
[FIG. 32]

As shown in FIG. 32, it may be preferable that two groups of the processes mentioned above are carried out in parallel. FIG. 32 shows timing of the processes which are carried out in the case of the parallel processing. In this case, the frequency transformation unit 100, the data selection memory unit 101, the demultiplexed signal generation unit 103, and the inverse frequency transformation unit 104 operate every frame. Moreover, the demultiplexing matrix generation unit 102 carries out the learning and calculation process once every M frames, where M is the smallest integer out of integers larger than the processing time Tw which is required for carrying out the learning and calculation process to the demultiplexing matrix. In this case, the demultiplexed signal generation unit 103 can use the new separate matrix, which is updated through processing the frame n+M, for processing the frame n+M+1. Here, a buffer memory is additionally needed in order to store temporarily the frequency-domain input signals of M frames which are inputted while the demultiplexing matrix generation unit 102 carries out the learning and calculation process.

As mentioned above, the exemplary embodiment has an effect of reducing the degradation of the demultiplexing performance which is caused in the case that the input signal is in the state of no-sound.

The reason is that the signal demultiplexing device according to the exemplary embodiment includes the input signal analysis unit 200 and the selection control unit 201, and selects a plurality of the frequency-domain input signals, which are in the state of sound existence and which are suited to calculating the statistics value at the time when carrying out the learning and calculation process to the demultiplexing matrix, as the signal for calculating the demultiplexing matrix. According to the signal demultiplexing device of the exemplary embodiment, it is possible to reduce the degradation of the demultiplexing performance, which is caused through carrying out the learning by use of the input signal including no-sound, through calculating the demultiplexing matrix by use of the selected plural frequency-domain input signals which are in the state of sound existence.

[Third Exemplary Embodiment]

Next, a third exemplary embodiment according to the present invention will be described in detail with reference to a drawing.

Figure 6:
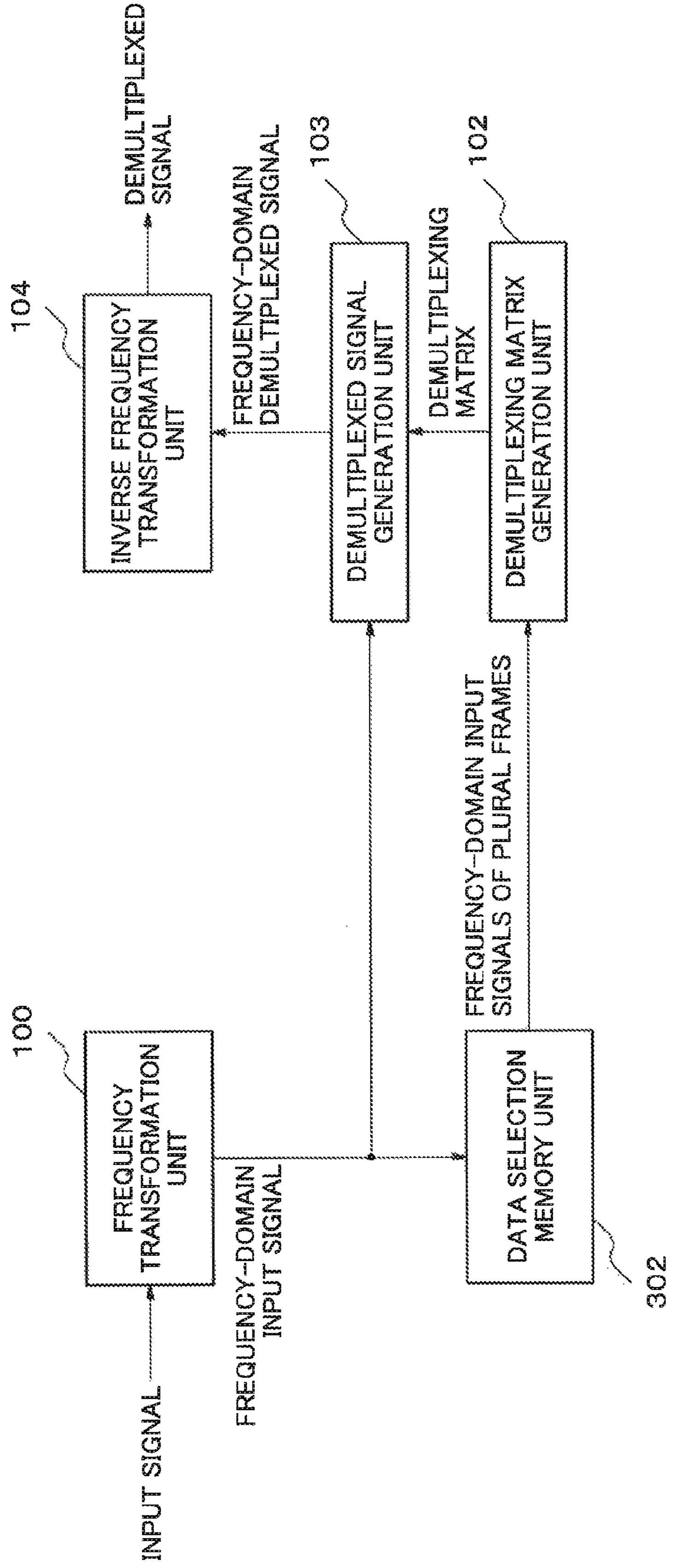
FIG. 6 is a block diagram showing a configuration according to a third exemplary embodiment.

FIG. 6 shows a configuration of a whole of a signal demultiplexing device according to the exemplary embodiment.

Only one different point of the present exemplary embodiment from the second exemplary embodiment according to the present invention shown in FIG. 3 is that the configuration according to the present exemplary embodiment includes a data selection memory unit 302, whose configuration and operation are different from ones of the data selection memory unit 101, instead of the data selection memory unit 101. The configuration according to the present exemplary embodiment except the different point is the same as one according to the second exemplary embodiment. Hereinafter, the different point of the present exemplary embodiment from the second exemplary embodiment will be described mainly.

Figure 7:
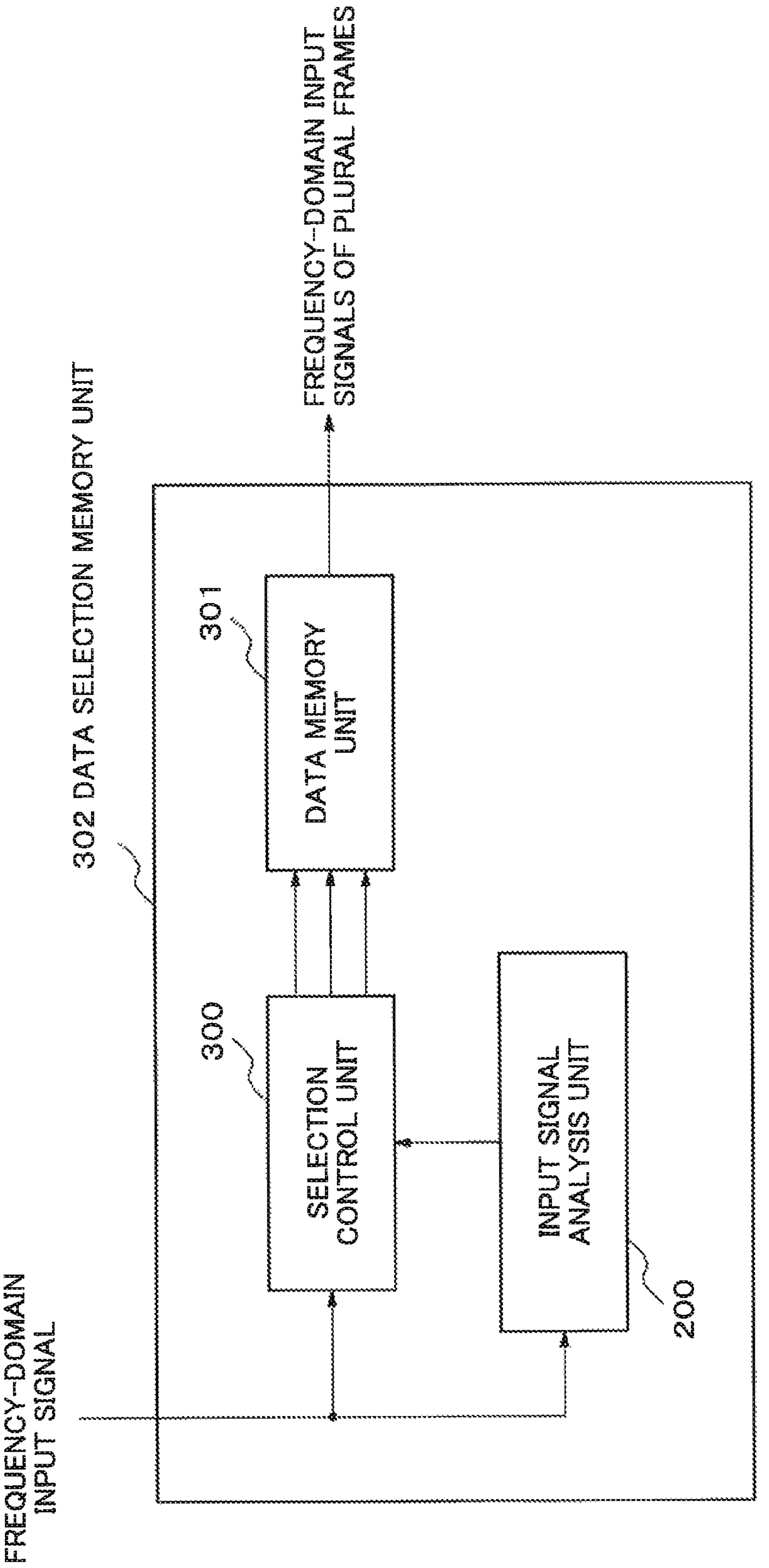
FIG. 7 is a block diagram showing a configuration of a data selection memory unit according to the third exemplary embodiment.

FIG. 7 shows a configuration of the data selection memory unit 302 according to the exemplary embodiment. Hereinafter, the configuration and the operation of the data selection memory unit 302 will be described with reference to FIG. 7.

With reference to FIG. 7, the data selection memory unit 302 according to the exemplary embodiment includes the input signal analysis unit 200, a selection control unit 300 and a data memory unit 301.

The input signal analysis unit 200 calculates an analysis value which indicates the state of no-sound as described in the second exemplary embodiment, and outputs the analysis value to the selection control unit 300.

The selection control unit 300 sets update information on the basis of the analysis value and outputs the frequency-domain input signal and the update information to the data memory unit 301, similarly to the operation of the selection control unit 201 shown in FIG. 4 according to the second exemplary embodiment. Moreover, the selection control unit 300 sets initialization information, which is used for initializing the frequency-domain input signal stored in the data memory unit 301, on the basis of duration time of the state of no-sound. Then, the selection control unit 300 outputs the initialization information to the data memory unit 301. The initialization information notifies the data memory unit 301 of a judgment whether the initialization, in which the selection control unit 300 deletes all the frequency-domain input signals stored in the data memory unit 301, is carried out.

In the case that the state of no-sound continues for a fixed period of time, there is a possibility that an environmental change, such as a case that a sound source moves, is caused while being in the state of no-sound. In the case that the environmental change is caused, the frequency-domain input signals, which has been stored in the data memory unit 301 at the time when the environmental change is caused, carry information which is in the environment previous to the environmental change. In the case that the state of no-sound continues for a fixed period of time, it is possible to carry out the learning for generating the demultiplexing matrix by use of only the frequency-domain input signals, which is in the changed environment, through initializing the data memory unit 301 before generating the demultiplexing matrix, even if the environmental change is caused. It is preferable to select appropriately the duration time of the state of no-sound, which makes it judged that there is a possibility that the environmental change is caused, according to the environment.

For example, the selection control unit 300 measures the duration time of the state of no-sound whose analysis value is smaller than a predetermined threshold level. In the case that the duration time is not shorter than a predetermined threshold value, it is preferable that the selection control unit 300 sets the initialization information to 1 in order to initialize the frequency-domain input signal stored in the data memory unit 301. On the other hand, in the case that the duration time is shorter than the predetermined threshold value, it is preferable that the selection control unit 300 sets the initialization information to 0. According to this example, in the case that the initialization information is 1, the initialization information indicates that the initialization process, in which all the frequency-domain input signals stored in the data memory unit 301 are deleted, is carried out. In the case that the initialization information is 0, the initialization information indicates that the initialization process is not carried out.

The data memory unit 301 stores the frequency domain input signals of plural frames. In the case that the data memory unit 301 inputs the update information and the frequency-domain input signal newly, the data memory unit 301 deletes the frequency-domain input signal of the frame which the update information designates, and stores the inputted frequency-domain input signal newly. Moreover, it is preferable that, in the case that the inputted initialization information is 1, the data memory unit 301 deletes all the frequency-domain input signals which the data memory 302 stores.

According to the above mentioned example, the selection control unit 300 sends the initialization information to the data memory unit 301 to instruct the data memory unit 301 to initialize the frequency-domain input signals which the data memory unit 301 stores. Moreover, in the case that the value of the received initialization information instructs the initialization, the data memory unit 301 deletes all the frequency-domain input signals which the data memory unit 301 stores. However, the configuration mentioned above is only an example and the present invention is not always limited to the configuration.

Next, an operation of a whole of the signal demultiplexing device according to the exemplary embodiment will be described in detail with reference to a drawing.

Figure 8:
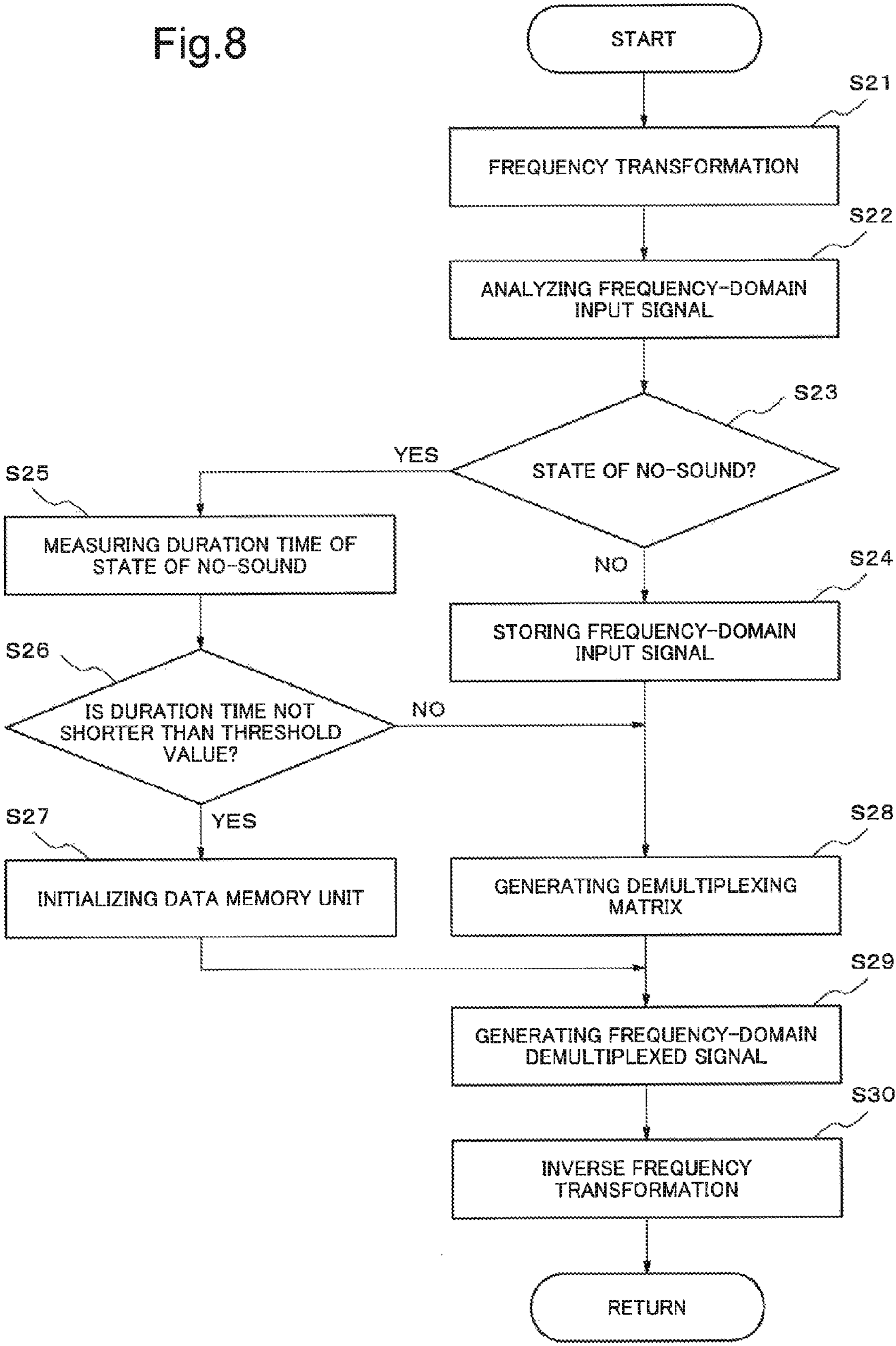
[FIG. 8]

FIG. 8 is a flowchart showing the operation of a whole of the signal demultiplexing device according to the exemplary embodiment. Hereinafter, a different point between the operation according to the present exemplary embodiment and the operation according to the second exemplary embodiment shown in FIG. 5 will be described mainly.

When comparing FIG. 5 and FIG. 8, Steps S21 to S24 and Steps S28 to S30 in FIG. 8 are corresponding to Steps S11 to S14 and Steps S15 to S17 in FIG. 5 respectively.

The operation of the signal demultiplexing device according to the exemplary embodiment, which includes carrying out the frequency transformation (Step S21), judging whether the input signal is in the state of no-sound (Step S22), making the data memory unit 301 store the frequency-domain input signal (Step S24) in the case that the input signal is not in the state of no-sound (No in Step S23), is the same as the operation according to the second exemplary embodiment which includes Steps S11 to S14.

In the case that the input signal analysis unit 200 judges that the input signal is in the state of no-sound (Yes in Step S23), the selection control unit 300 measures duration time of the state of no-sound (Step S25). In the case that the duration time of the state of no-sound is shorter than a predetermined time (No in Step S26), the demultiplexing matrix generation unit 102 generates the demultiplexing matrix by use of the plural frequency-domain input signals of the plural frames stored in the data memory unit 301 (Step S28), and the operation proceeds to Step S29.

In the case that the duration time of the state of no-sound is not shorter than the predetermined time (Yes in Step S26), the selection control unit 300 initializes the data memory unit 301, and deletes all the frequency-domain input signals stored in the data memory unit 301 (Step S27), and the operation proceeds to Step S29. In this case, since the frequency-domain input signal stored in the data memory unit 301 is deleted, the demultiplexing matrix is not updated, and then the current demultiplexing matrix is used as it is.

The demultiplexed signal generation unit 103 generates the frequency-domain demultiplexed signal from the frequency-domain input signal by use of the demultiplexing matrix (Step S29). The inverse frequency transformation unit 104 transforms the generated frequency-domain demultiplexed signal into a time-domain signal to generate a demultiplexed signal (Step S30).

As mentioned above, the exemplary embodiment has an effect of reducing the degradation of the demultiplexing performance in the case that the input signal is in the state of no-sound, similarly to the second exemplary embodiment.

The reason is that the signal demultiplexing device according to the exemplary embodiment includes the input signal analysis unit 200 and the selection control unit 300, and selects a plurality of the frequency-domain input signals, which are in the state of sound existence and which are suited to calculating the statistics value at the time when carrying out the learning and calculation process to the demultiplexing matrix, as the signal for calculating the demultiplexing matrix, similarly to the second exemplary embodiment. In the case that the input signal is in the state of no-sound, it is possible to reduce the degradation of the demultiplexing performance through the demultiplexing matrix generation unit 102 calculating the demultiplexing matrix by use of a plurality of the selected frequency-domain input signals which are in the state of sound existence.

Furthermore, the exemplary embodiment has an effect that, even if the environmental change, such as the case that the sound source moves, is caused while being in the state of no-sound, it is possible to track the caused environmental change quickly after the state of no-sound is ended. That is, the exemplary embodiment has an effect that, in the case that the environmental change is caused while being in the state of no-sound, a time interval from the end of the state of no-sound until the generation of the demultiplexing matrix which is adaptable to the changed environment is shortened. The multiplexing matrix, which is adapted to the changed environment, makes it possible to generate the correct demultiplexed signal from the mixed signal which is in the changed environment.

The reason is that according to the configuration of the exemplary embodiment, the input signal analysis unit 200 analyzes the frequency-domain input signal, and the selection control unit 300 initializes the data memory unit 301 on the basis of the duration time of the state of no-sound. Therefore, in the case that the environmental change, such as the case that the sound source moves, is caused while being in the state of no-sound, the data memory unit 301 does not store the frequency-domain input signal which is in the environment previous to the environment change, after the environment is changed. As a result, when generating the demultiplexing matrix in the changed environment, the demultiplexing matrix generation unit 102 does not use the frequency-domain input signal, which is in the environment previous to the environmental change, in the learning process. Moreover, the data memory unit 301 can store newly the frequency-domain input signal which ends the state of no-sound. Accordingly, the signal demultiplexing device according to the exemplary embodiment has an effect that tracking property after end of the state of no-sound is improved, since the signal demultiplexing device can calculate quickly the demultiplexing matrix which reflects the state generated after the environment is changed.

[Fourth Exemplary Embodiment]

Next, a fourth exemplary embodiment according to the present invention will be described in detail with reference to a drawing.

Figure 9:
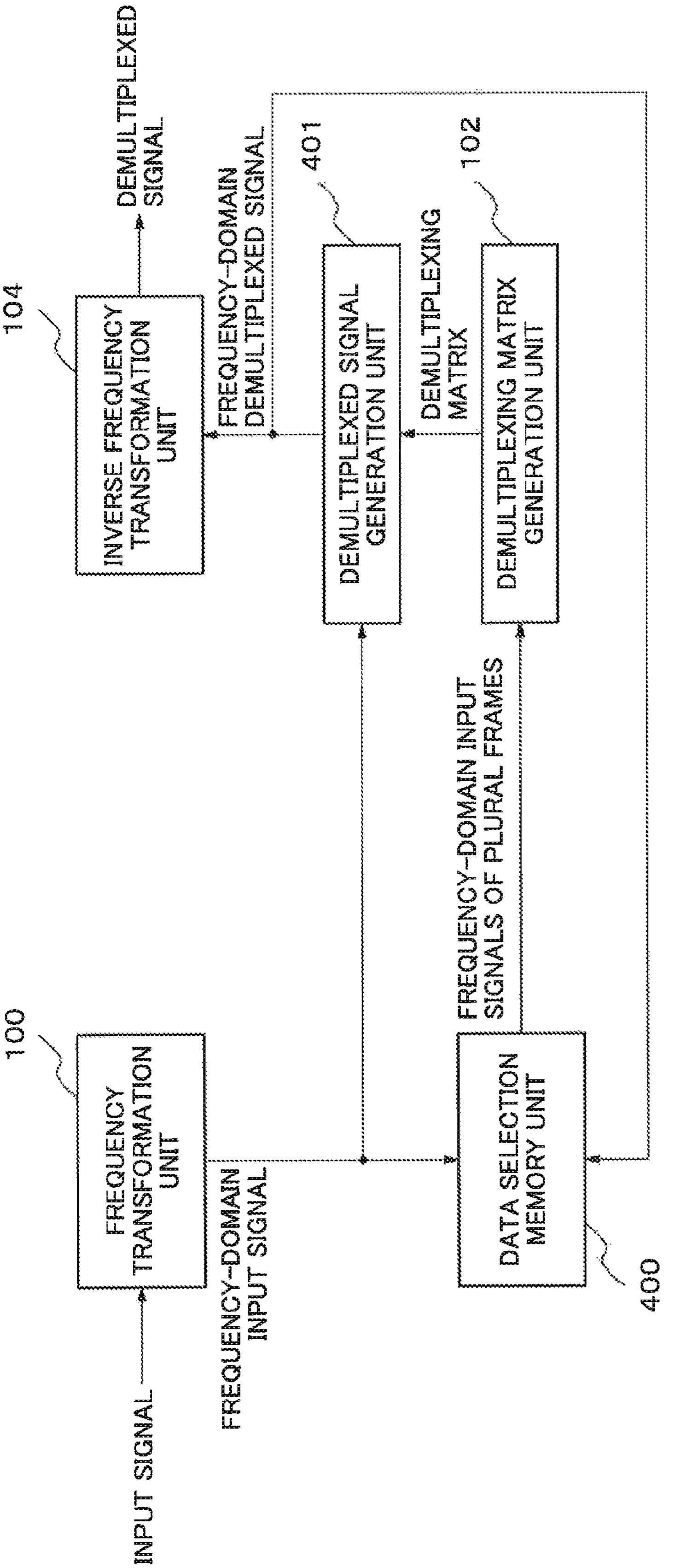
[FIG. 9]

FIG. 9 shows a configuration according to the exemplary embodiment.

With reference to FIG. 9, the configuration according to the exemplary embodiment includes the frequency transformation unit 100, a data selection memory unit 400, the demultiplexing matrix generation unit 102, a demultiplexed signal generating unit 401 and the inverse frequency transformation unit 104. A different point of the configuration according to the present exemplary embodiment from the second exemplary embodiment shown in FIG. 3 is that the configuration according to the present exemplary embodiment includes the demultiplexed signal generation unit 401 and the data selection memory unit 400 instead of the demultiplexed signal generation unit 103 and the data selection memory unit 101. Configurations and operations of the demultiplexed signal generation unit 401 and the data selection memory unit 400 according to the present exemplary embodiment are different from ones of the demultiplexed signal generation unit 103 and the data selection memory unit 101 according to the second exemplary embodiment. Hereinafter, the configurations and the operations of the demultiplexed signal generation unit 401 and the data selection memory unit 400, which are corresponding to the different point of the present exemplary embodiment from the second exemplary embodiment, will be described mainly.

Figure 10:
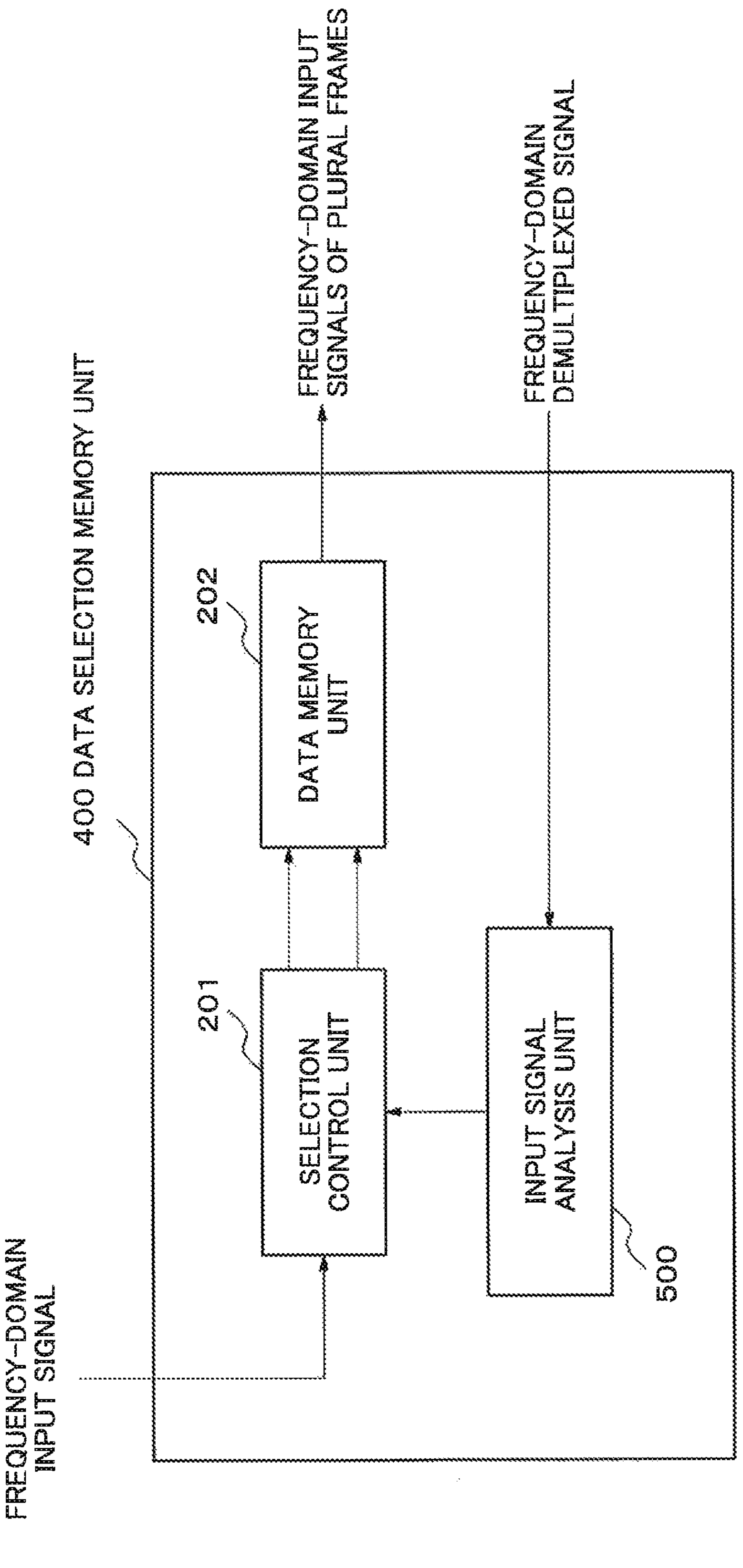
[FIG. 10]

FIG. 10 shows the configuration of the data selection memory unit 400 according to the exemplary embodiment.

With reference to FIG. 10, the data selection memory unit 400 according to the fourth exemplary embodiment includes an input signal analysis unit 500, the selection control unit 201 and the data memory unit 202.

The input signal analysis unit 500 analyzes a frequency-domain demultiplexed signal, and judges whether an input signal includes mixture of all sound source signals. Hereinafter, a state that the input signal includes mixture of all the sound source signals is denoted as a state of simultaneous existence(of the sound source signals), and denotation that an input signal is in a state of simultaneous existence will be used. Moreover, a state that the input signal does not include mixture of at least one sound source signal is denoted as a state of not-simultaneous existence, and notation that an input signal is in a state of not-simultaneous existence will be used. The input signal analysis unit 500 indicates a result of judgment whether the input signal is in the state of simultaneous existence, for example, by use of an analysis value which will be described later. Then, the input signal analysis unit 500 outputs the analysis value to the selection control unit 201. The input signal analysis unit 500, for example, measures each power of the frequency-domain demultiplexed signals. Then, it is preferable that, in the case that each power is not smaller than a threshold value, the input signal analysis unit 500 judges that the input signal is in the state of simultaneous existence, and in other cases, the input signal analysis unit 500 judges that the input signal is in the state of not-simultaneous existence. Moreover, it is preferable that, in the case that the input signal analysis unit 500 judges that the input signal is in the state of simultaneous existence, the input signal analysis unit 500, for example, sets the analysis value to 1. Moreover, it is preferable that, in the case that the input signal analysis unit 500 judges that the input signal is in the state of not-simultaneous existence, the input signal analysis unit 500 sets the analysis value to 0. A signal demultiplexing process is an inverse process of the mixing process of the sound source signals. The frequency-domain demultiplexed signal can be regarded as the sound source signal in the frequency domain. Therefore, it is possible to detect the state of simultaneous existence of the sound source signals through carrying out an analysis on the basis of the frequency-domain demultiplexed signal.

In the case that the input signal analysis unit 500 sets the analysis value as mentioned above, it is preferable that the selection control unit 201 outputs a frequency-domain input signal to the data memory unit 202 when the analysis value is 1. When the analysis value is 0, it is preferable that the selection control unit 201 does not output the frequency-domain input signal. Moreover, in the case that the selection control unit 201 outputs the frequency-domain input signal, the selection control unit 201 outputs update information, which makes the data memory unit 202 store the frequency-domain input signal, to the data memory unit 202. When the data memory unit 202 stores newly the frequency-domain input signal which the selection control unit 201 outputs, the update information designates the frequency-domain input signal which should be deleted so as to be replaced by the new frequency-domain input signal. It is preferable that the selection control unit 201 sets, for example, frame number of the frequency-domain input signal, which has the longest elapse time since being stored out of the frequency-domain input signals stored in the data memory unit 202, as the update information. A method of calculating the elapsed time is the same as the above-mentioned method.

The data memory unit 202 stores the frequency-domain input signals of plural frames. In the case that the data memory unit 202 inputs the update information and the frequency-domain input signal newly, the data memory unit 202 deletes the frequency-domain input signal of the frame which the update information designates, and stores the inputted frequency-domain input signal newly.

Moreover, it may be preferable that the analysis value has not two discrete values but a continuous value. In this case, the input signal analysis unit 500 and the selection control unit 201 operate as shown in the following.

The input signal analysis unit 500 analyzes the frequency-domain demultiplexed signal, and outputs the analysis value, which indicates the state of simultaneous existence of the sound source signals, to the selection control unit 201. The input signal analysis unit 500 can set the analysis value, which the input signal analysis unit 500 outputs, for example, as follows. The input signal analysis unit 500, for example, measures each power of the frequency-domain demultiplexed signals. Then, in the case that each the power is not smaller than an upper limit threshold value, it is preferable that the input signal analysis unit 500 judges to be in the state of simultaneous existence, and sets the analysis value to 1. In the case that at least one power is smaller than a lower limit threshold value, it is preferable that the input signal analysis unit 500 judges to be in the state of not-simultaneous existence, and sets the analysis value to 0. In other cases, it is preferable that the input signal analysis unit 500 sets the analysis value to a value, which is larger than 0 and smaller than 1, through carrying out an interpolation process on the basis of the power of the frequency-domain demultiplexed signal. The input signal analysis unit 500 can use, for example, a linear interpolation method in the interpolation process.

Similarly to the second exemplary embodiment, the selection control unit 201 sets the update information on the basis of the analysis value which has the continuous value, and outputs the frequency-domain input signal and the update information to the data memory unit 202.

Moreover, it may be preferable that the input signal analysis unit 500 uses not the analysis value which has two discrete values indicating the state of simultaneous existence and the state of not-simultaneous existence respectively, but, for example, an analysis value which has three discrete values. The above-mentioned analysis value is, for example, a value which indicates the state of simultaneous existence, a value which indicates a state of sole existence (state that only one sound source signal out of the plural sound source signals exists) or a value which indicates the state of no-sound. In this case, the input signal analysis unit 500 and the selection control unit 201 operate as shown in the following.

The input signal analysis unit 500 analyzes the frequency-domain demultiplexed signal, and outputs the analysis value, which indicates any one of the state of simultaneous existence, the state of sole existence, and the state of no-sound, to the selection control unit 201. The input signal analysis unit 500 can set the analysis value, which the input signal analysis unit 500 outputs, as shown in the following. For example, the input signal analysis unit 500 measures firstly each power of the frequency-domain demultiplexed signals. Next, in the case that each of the power values is not smaller than a threshold value, the input signal analysis unit 500 judges to be in the state of simultaneous existence, and sets the analysis value to 0. In the case that each of the power values is smaller than the threshold value, the input signal analysis unit 500 judges to be in the state of no-signal, and sets the analysis value to −1. In other cases, the input signal analysis unit 500 judges to be in the state of sole existence, and sets the analysis value to number i (i is not smaller than 1 and not larger than N, where N is number of the frequency-domain demultiplexed signals) of the i'th frequency-domain demultiplexed signal which has the largest power out of the frequency-domain demultiplexed signals which are in the state of sole existence.

When the analysis value is not smaller than 0, it is preferable that the selection control unit 201 outputs the frequency-domain input signal to the data memory unit 202. When the analysis value is −1, it is preferable that the selection control unit 201 does not output the frequency-domain input signal. Moreover, in the case that the selection control unit 201 outputs the frequency-domain input signal, the selection control unit 201 outputs the update information, which makes the data memory unit 202 store the frequency-domain input signal, to the data memory unit 202.

Next, a method with which the selection control unit 201 sets the update information will be described with reference to FIG. 11 and FIG. 12. The frame number shown in FIG. 11 and FIG. 12 is assigned to each the frame of the frequency-domain input signal, which the data memory unit 202 stores, in a descending order from a top of the memory area of the data memory unit 202.

Figure 11:
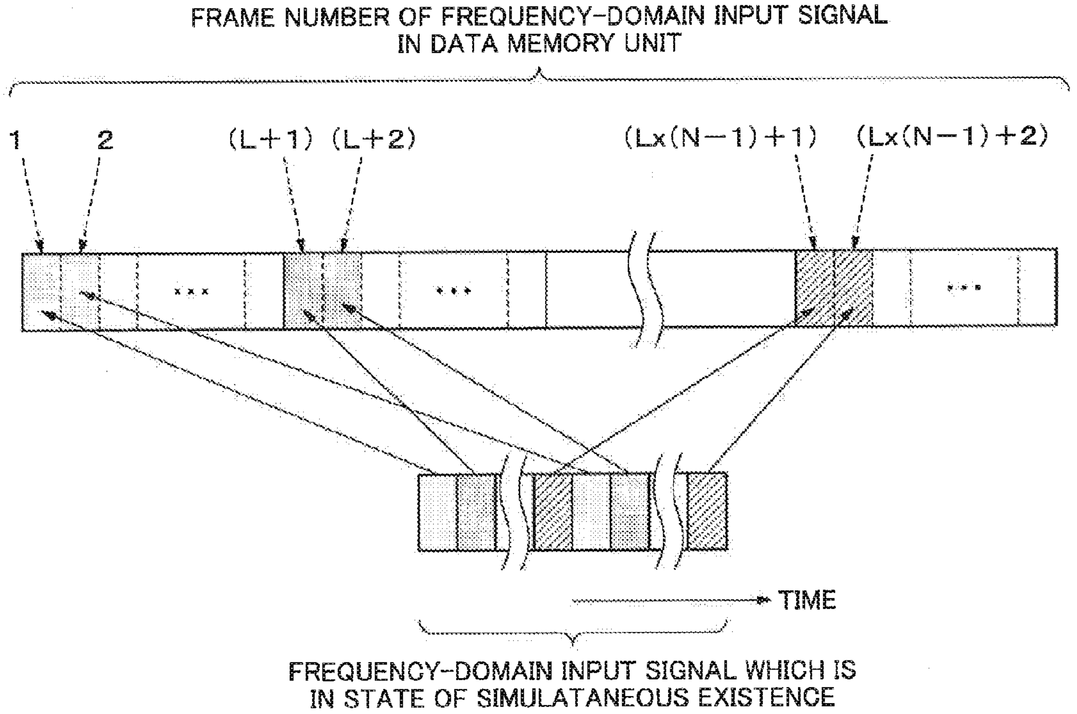
[FIG. 11]

FIG. 11 shows an example of a position at which the frequency-domain input signal is stored within the data memory unit 202 in the case that the analysis value is 0. According to the example shown in FIG. 11, frame signals of the frequency-domain input signals are stored respectively in a frame 1, a frame (L+1), . . . , a frame (L×(N−1)+1), a frame 2, a frame (L+2), . . . , a frame (L×(N−1)+2), . . . , which are within the data memory unit 202, in an order of input time. In the case that the analysis value is 0, it is preferable that the selection control unit 201 sets the update information to frame number, which is defined in the data memory unit 202, so that the frame signals of the frequency-domain input signals may be stored respectively in the frame 1, the frame (L+1), . . . , the frame (L×(N−1)+1), the frame 2, the frame (L+2), . . . , the frame (L×(N−1)+2), . . . , which are within the data memory unit 202, in an order of the input time. Here, L is equal to number of all frames of the frequency-domain input signals, which are stored in the data memory unit 202, divided by N.

Figure 12:
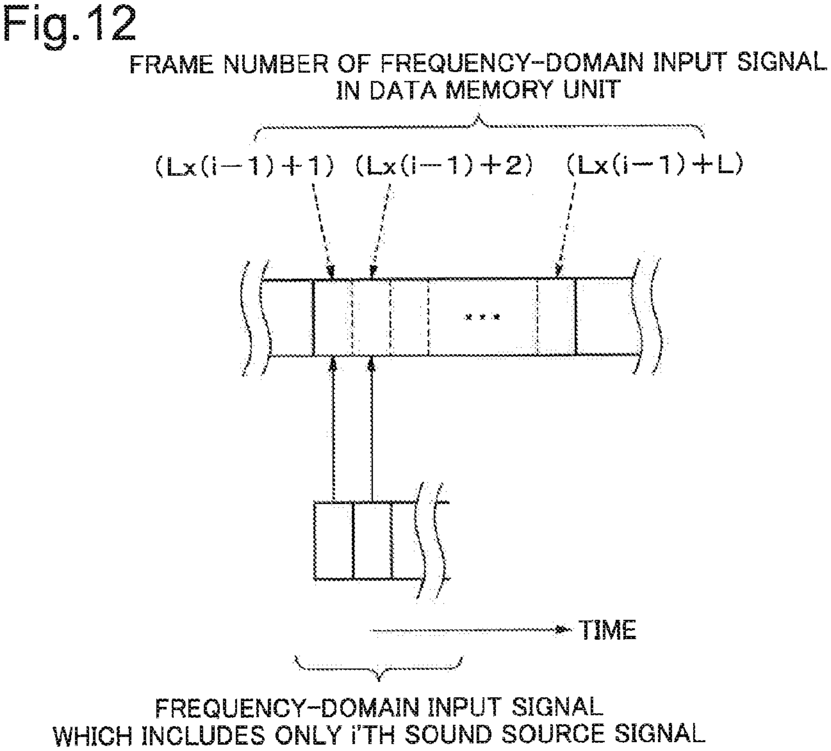
[FIG. 12]

FIG. 12 shows an exemplified method for assigning a storage position where the frequency-domain input signal is stored within the data memory unit 202 in the case that the analysis value is i (i is integer not smaller than 1). According to the example shown in FIG. 12, the frame signals of the frequency-domain input signals are stored respectively in a frame (L×(i−1)+1), a frame (L×(i−1)+2), . . . , a frame (L×(i−1)+L), which are within the data memory 202, in an order of the input time. In the case that the analysis value is i, it is preferable that the selection control unit 201 sets the update information to the frame number, which is defined in the data memory unit 202, so that the frame signals of the frequency-domain input signals may be stored respectively in the frame (L×(i−1)+1), the frame (L×(i−1)+2), . . . , the frame (L×(i−1)+L), which are within the data memory unit 202, in an order of the input time.

Through setting the update information as mentioned above, the signal demultiplexing device according to the exemplary embodiment can update the frequency-domain input signals which are in the data memory unit 202, even if the state of not-simultaneous existence continues for a long time. Furthermore, since the frequency-domain input signal of each sound source signal can always be held, the signal demultiplexing device according to the exemplary embodiment can reduce the degradation of the separate performance.

Next, returning to FIG. 9, the demultiplexed signal generation unit 401 will be described. The demultiplexed signal generation unit 401 generates the frequency-domain demultiplexed signal from the frequency-domain input signal by use of the demultiplexing matrix, and outputs the frequency-domain demultiplexed signal to the inverse frequency transformation unit 104 and the data selection memory unit 400.

Next, an operation of a whole of the signal demultiplexing device according to the exemplary embodiment will be described in detail with reference to a drawing.

Figure 13:
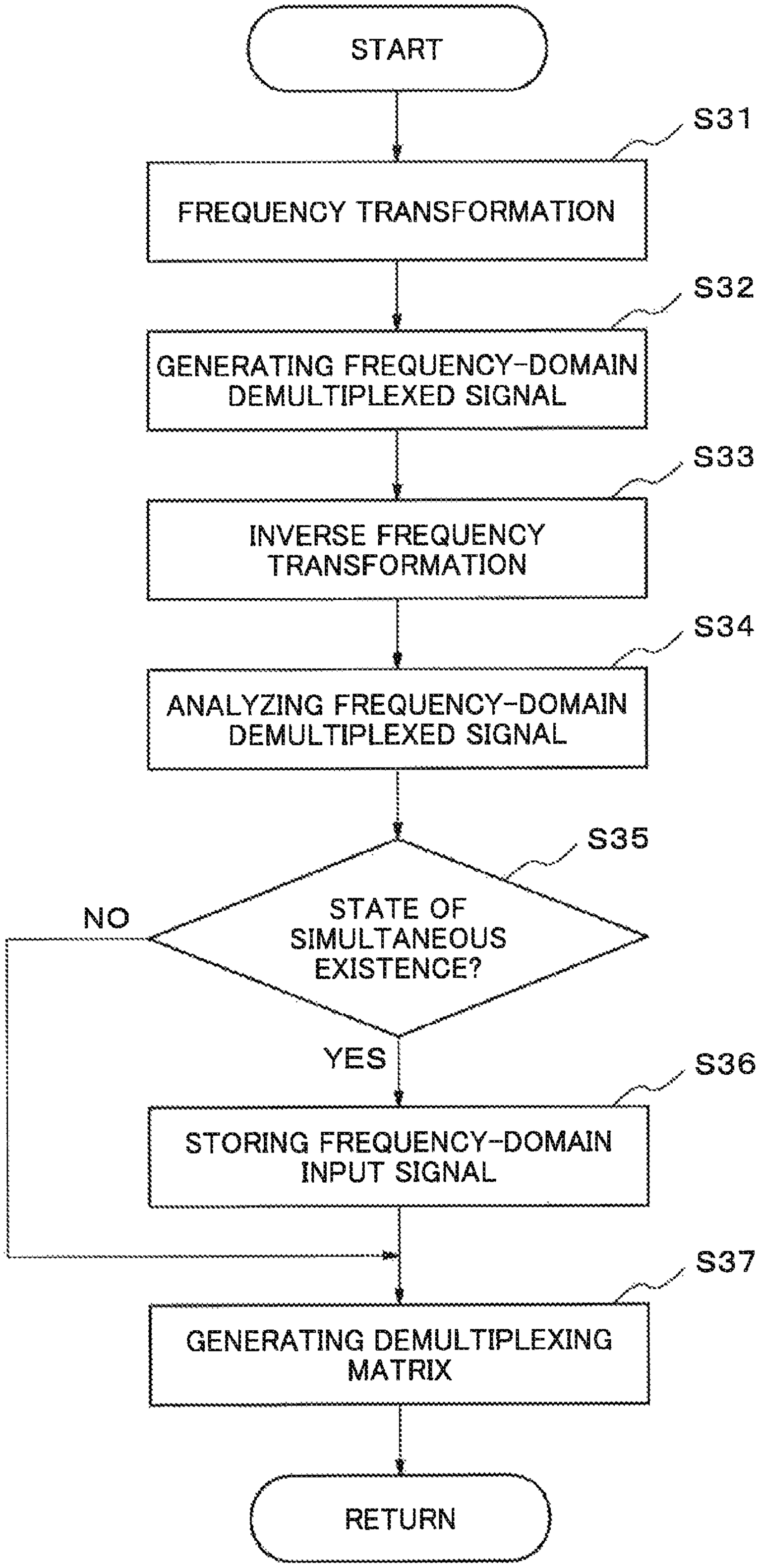
[FIG. 13]

FIG. 13 shows the operation of the signal demultiplexing device according to the exemplary embodiment.

With reference to FIG. 13, the frequency transformation unit 100 generates firstly the frequency-domain input signal through carrying out the frequency transformation in which the input signal is transformed into the frequency-domain signal (Step S31).

The demultiplexed signal generation unit 401 generates the frequency-domain demutiplexed signal on the basis of the generated frequency-domain input signal (Step S32). The inverse frequency transformation unit 104 generates the demultiplexed signal through transforming the frequency-domain demultiplexed signal into the time-domain signal (Step S33).

Meanwhile, the input signal analysis unit 500 of the data selection memory unit 400 analyzes the frequency-domain demultiplexed signal which is generated in Step S32, and judges whether the frequency-domain input signal is in the state of simultaneous existence (Step S34). In the case that the frequency-domain input signal is in the state of simultaneous existence (Yes in Step S35), the selection control unit 201 makes the data memory unit 202 store the frequency-domain input signal (Step S36), and the operation proceeds to Step S37. On the other hand, in the case that the frequency-domain input signal is not in the state of simultaneous existence (No in Step S35), the operation proceeds to Step S37.

The demultiplexing matrix generation unit 102 generates the demultiplexing matrix by use of the frequency-domain demultiplexed signals of the plural frames which are stored in the data memory unit 202 (Step S37).

Figure 33:
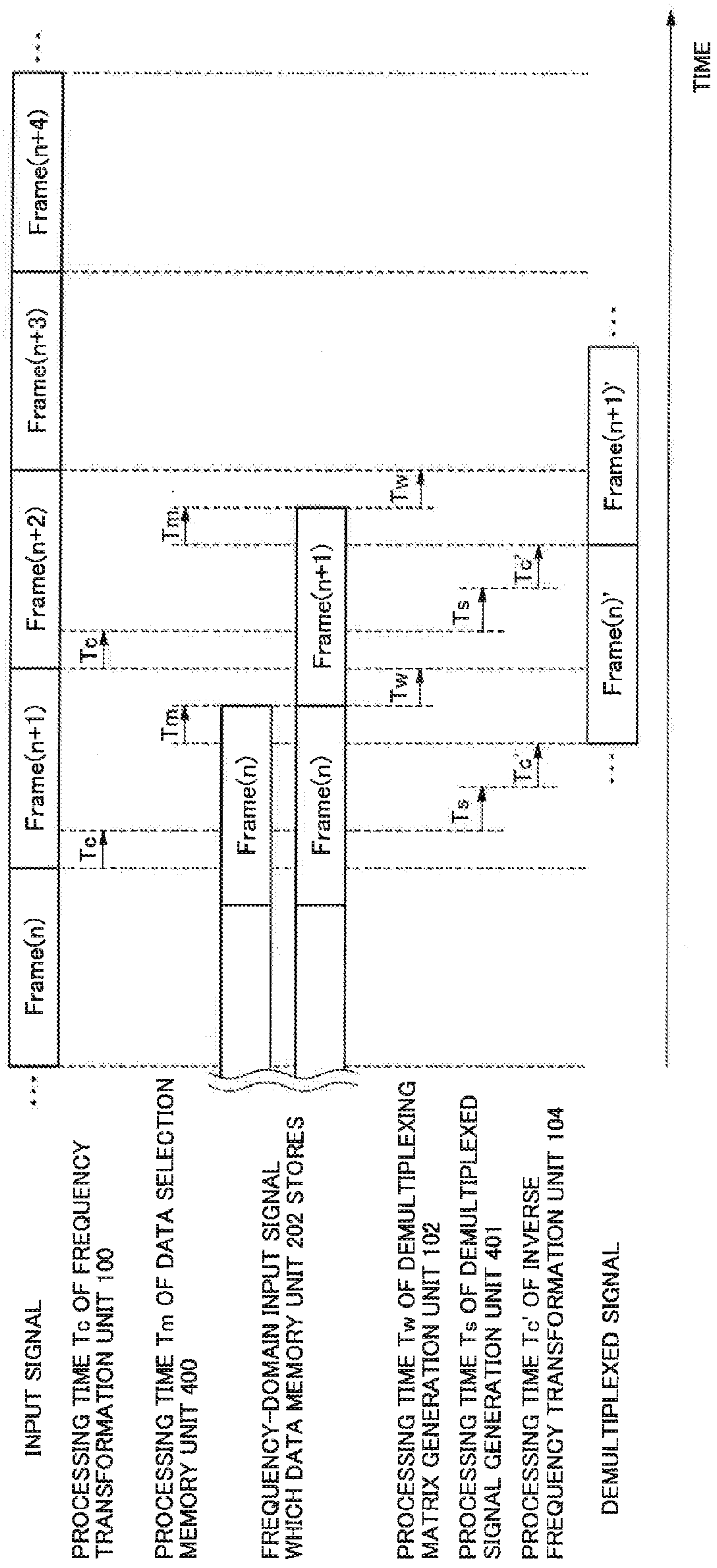
[FIG. 33]

In the case that the configuration according to the exemplary embodiment is operated in real time, the processes according to the exemplary embodiment are classified mainly into two groups of the processes. A first group out of two groups is composed of the processes which are carried out by the frequency transformation unit 100, the data selection memory unit 400, the demultiplexed signal generation unit 401 and the inverse frequency transformation unit 104. A second group is composed of the processes which are carried out by the demultiplexing matrix generation unit 102. Since the first group of the processes outputs the demultiplexed signal, it is necessary to operate each processing unit, which is related to the first group of the processes, every frame, differently from the second group of the processes. If a total processing time of two groups of the processes is not longer than one frame time length, it may be preferable to operate the processing units sequentially as shown in FIG. 33. Here, n shown in FIG. 33 is frame number of a frame at a certain time. Tc is a processing time of the frequency transformation unit 100. Tm is a processing time of the data selection memory unit 400. Tw is a processing time of the demultiplexing matrix generation unit 102. Ts is a processing time of the demultiplexed signal generation unit 401. Tc' is a processing time of the inverse frequency transformation unit 104. In this case, the frequency transformation unit 100, the demultiplexed signal generation unit 401, the inverse frequency transformation unit 104, the data selection memory unit 400, and the demultiplexing matrix generation unit 102 operate in this order. Here, a different point of the operation according to the present exemplary embodiment from one according to the second exemplary embodiment is that, while the data selection memory unit 400 operates just after the frequency transformation unit 100 operates according to the second exemplary embodiment, the data selection memory unit 400 operates just after the inverse frequency transformation unit 104 operates, and consequently the demultiplexing matrix generation unit 102 operates finally according to the present exemplary embodiment. This is because the frequency-domain input signal is stored on the basis of the analysis result on the frequency-domain demultiplexed signal.

Figure 34:
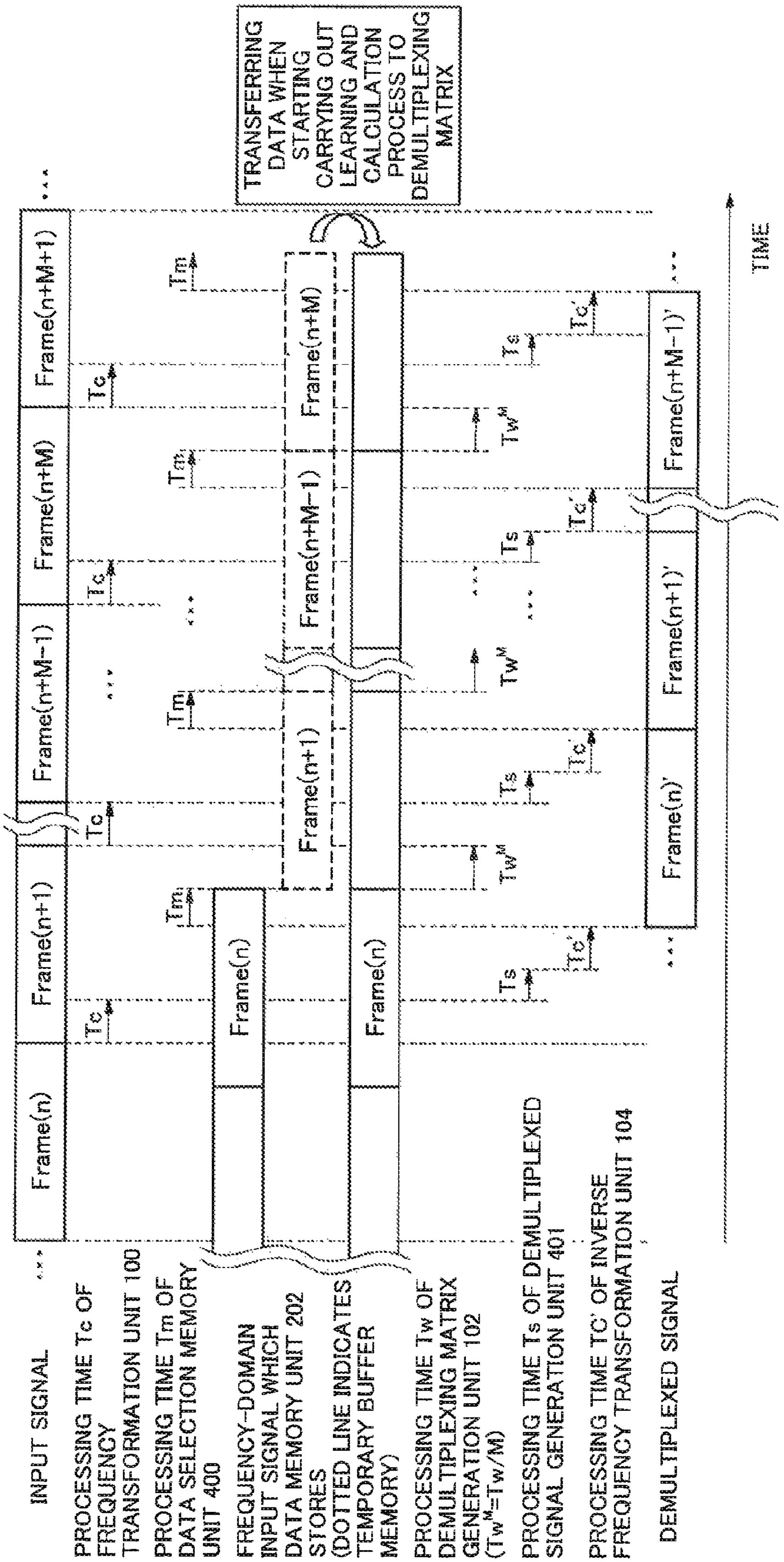
[FIG. 34]

However, the total processing time of two groups of the processes often exceeds one frame time length since the processing time of the demultiplexing matrix generation unit 102 is generally very long. In this case, in order to realize the operation according to the fourth exemplary embodiment in real time, it may be preferable that the demultiplexing matrix generation unit 102 is operated only at a period of time TwM per one frame, where TwM=Tw/M, and the learning and calculation process is carried out once every M frames, as shown in FIG. 34. Here, M satisfies the following inequality formula: TwM<=(one frame time length)−(Tc+Tm+Ts+Tc'). In this case, the frequency transformation unit 100, the demultiplexed signal generation unit 401, the inverse frequency transformation unit 104, the data selection memory unit 400, and the demultiplexing matrix generation unit 102 operate in this order.

Here, a different point of the operation according to the present exemplary embodiment from one according to the second exemplary embodiment, which is explained with reference to FIG. 31, is that, while the data selection memory unit 400 operates just after the frequency transformation unit 100 operates according to the second exemplary embodiment, the data selection memory unit 400 operates just after the inverse frequency transformation unit 104 operates according to the exemplary embodiment. This is because the frequency-domain input signal is stored on the basis of the analysis result on the frequency-domain demultiplexed signal. In the case that the processing units operate in the order which is described in the exemplary embodiment, the learning and calculation process, which is carried out by the demultiplexing matrix generation unit 102, is completed at the frame n+M. The demultiplexed signal generation unit 401 can use the demultiplexing matrix, which is the result of the learning and calculation process, in order to process the frame n+M+1. Here, since the multiplexing matrix generation unit 102 carries out the learning and calculation process once every M frames, a buffer memory is needed. That is, the buffer memory has to store temporarily the frequency-domain input signals of M frames which are inputted while the demultiplexing matrix generation unit 102 carries out the learning and calculation process.

Figure 35:
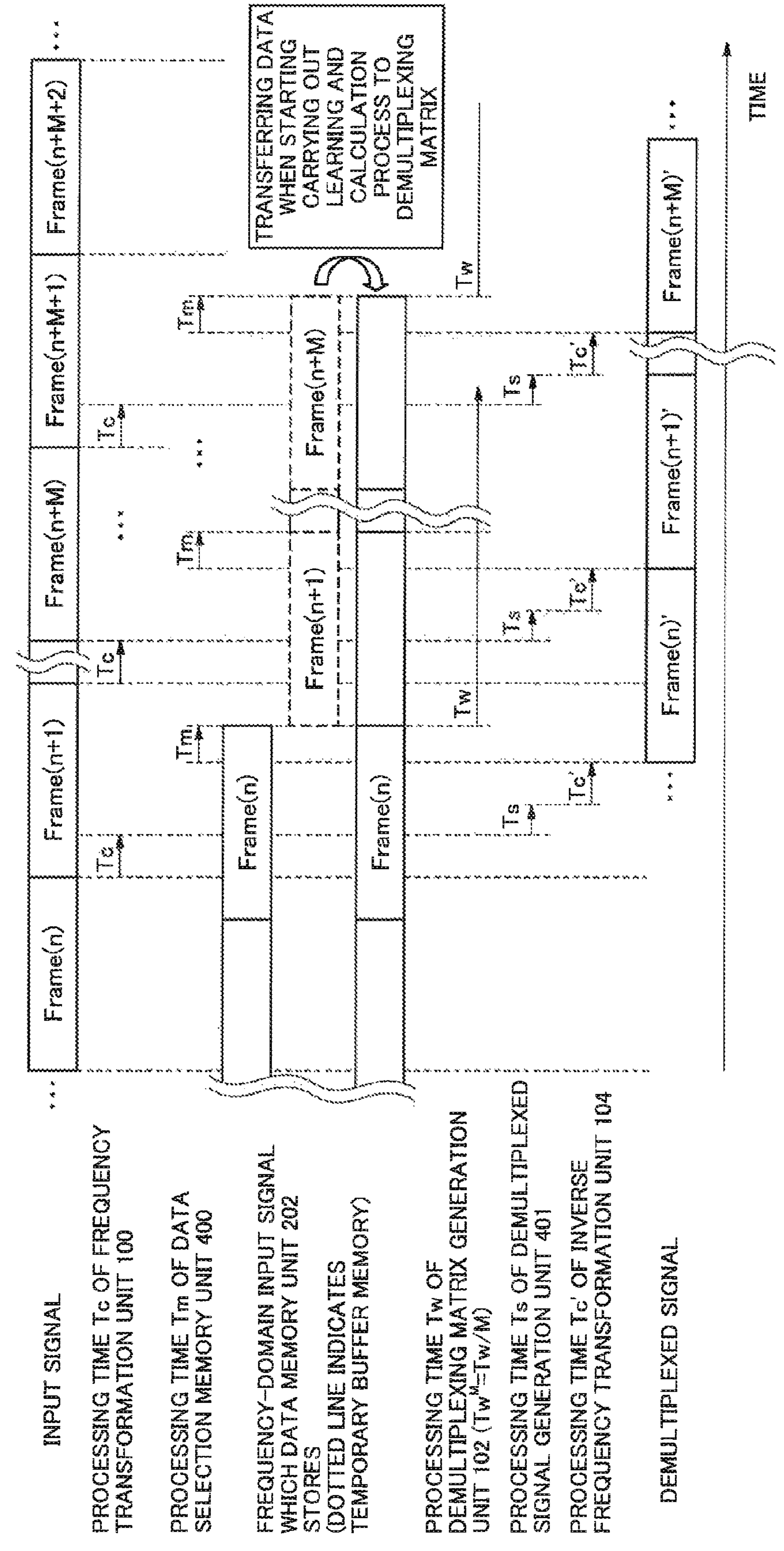
[FIG. 35]
Figure 36:
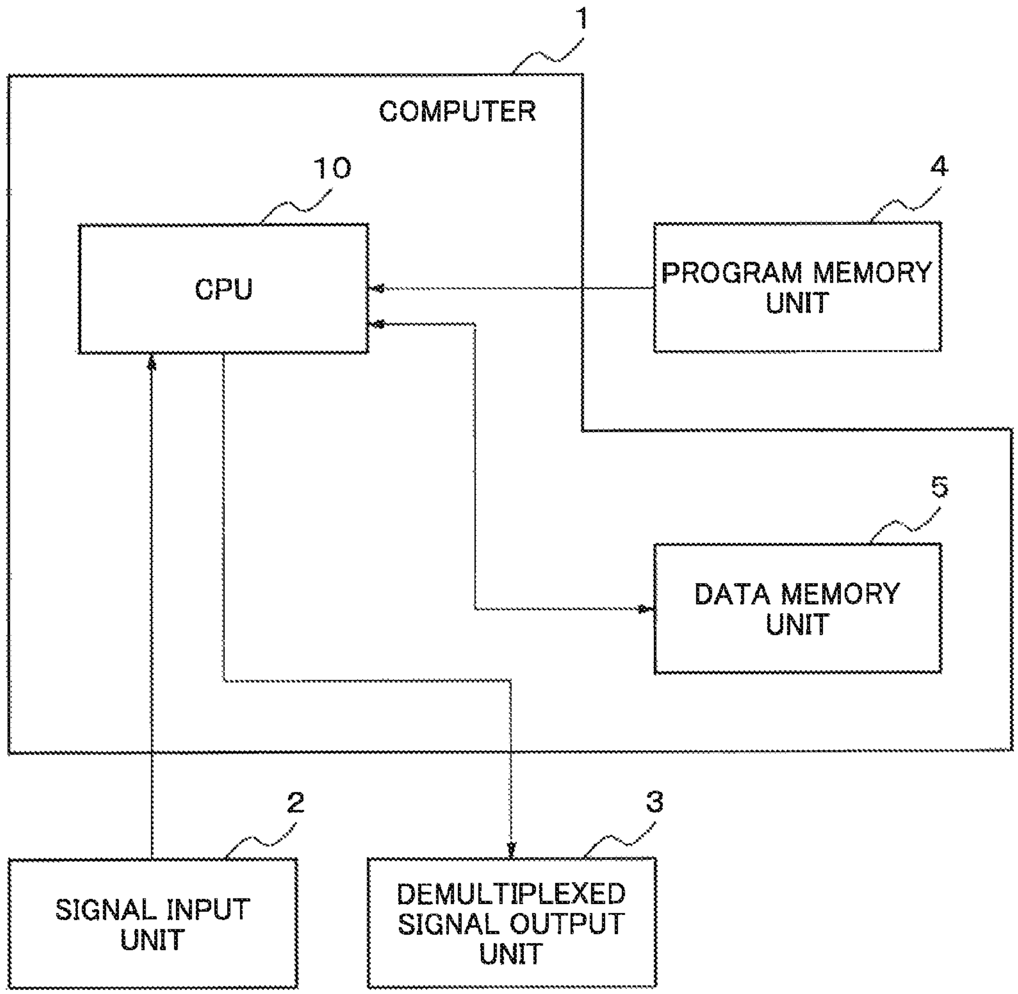
[FIG. 36]

Or, it may be preferable that two groups of the processes mentioned above are carried out in parallel, as shown in FIG. 35. In this case, the frequency transformation unit 100, the demultiplexed signal generation unit 401, the inverse frequency transformation unit 104, and the data selection memory unit 400 operate every frame. Moreover, the demultiplexing matrix generation unit 102 carries out the learning and calculation process once every M frames, where M is the smallest integer out of integers larger than the processing time Tw which is required for carrying out the learning and calculation process to the demultiplexing matrix. Here, a different point of the operation according to the present exemplary embodiment from one according to the second exemplary embodiment, which is explained with reference to FIG. 32, is that, while the data selection memory unit 400 operates just after the frequency transformation unit 100 operates according to the second exemplary embodiment, the data selection memory unit 400 operates just after the inverse frequency transformation unit 104 operates according to the present exemplary embodiment. This is because the frequency-domain input signal is stored on the basis of the analysis result on the frequency-domain demultiplexed signal according to the exemplary embodiment. As a result, operation timing of the demultiplexing matrix generation unit 102 is delayed by (Ts+Tc'). Moreover, the demultiplexed signal generation unit 401 can use the updated demultiplexing matrix, which is obtained through processing the frame n+M, in order to process the frame n+M+1. Here, a buffer memory, which stores temporarily the frequency-domain input signals of M frames which are inputted while the demultiplexing matrix generation unit 102 carries out the learning and calculation process, is needed additionally.

As mentioned above, the exemplary embodiment has an effect of reducing the degradation of the demultiplexing performance which is caused by that any input signal does not include each the sound source signal.

The reason is that the exemplary embodiment has the configuration that a plurality of the frequency-domain input signals, which are in the state of simultaneous existence, that is, which include mixture of all the sound source signals, are selected, and the demultiplexing matrix is calculated on the basis of the selected frequency-domain input signals.

[Fifth Exemplary Embodiment]

Next, a fifth exemplary embodiment according to the present invention will be described in detail with reference to a drawing.

Figure 14:
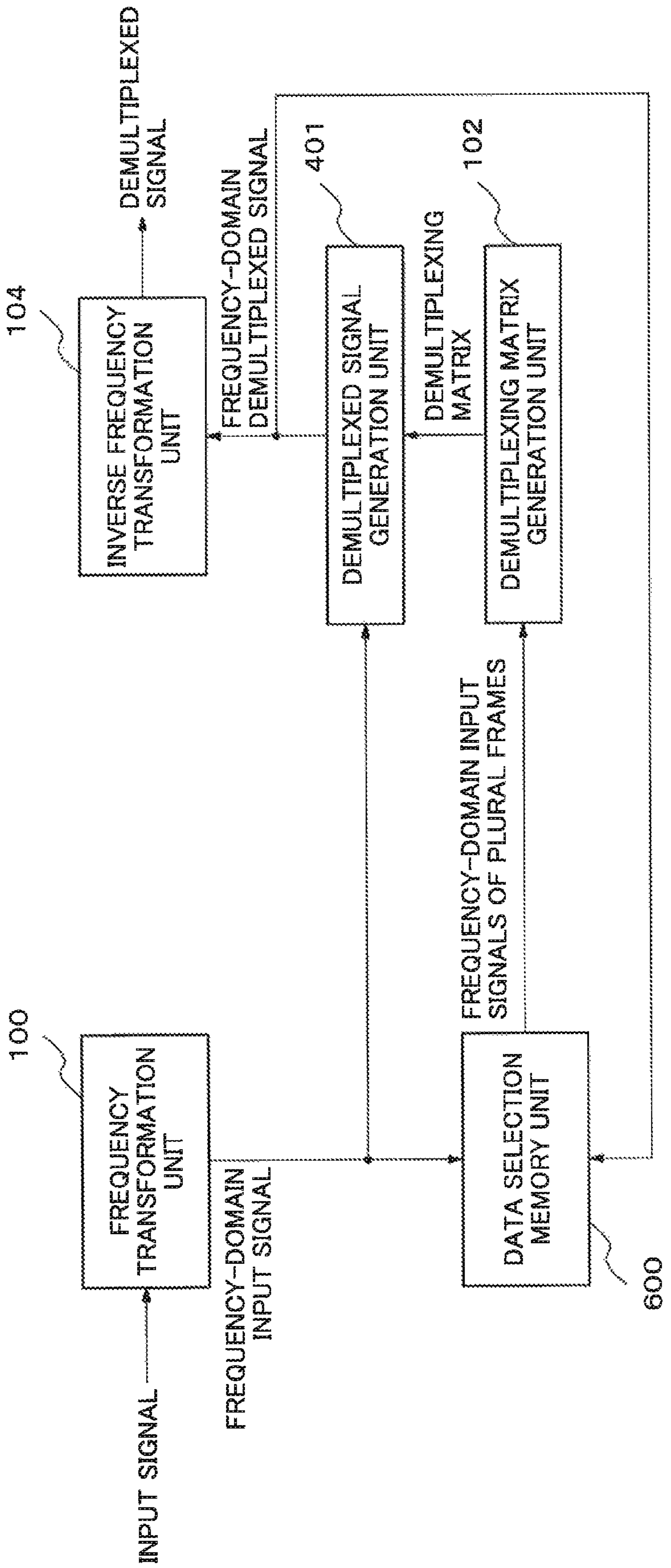
[FIG. 14]

FIG. 14 shows a configuration of a signal demultiplexing device according to the exemplary embodiment.

With reference to FIG. 14, only one different point of the configuration according to the present exemplary embodiment from the configuration according to the fourth exemplary embodiment of the present invention shown in FIG. 9 is that the configuration according to the present exemplary embodiment includes a data selection memory unit 600 instead of the data selection memory unit 400, and the configuration according to the present exemplary embodiment is the same as one according to the fourth exemplary embodiment except the different point mentioned above. Hereinafter, the different point between the present exemplary embodiment and the fourth exemplary embodiment will be described mainly.

Figure 15:
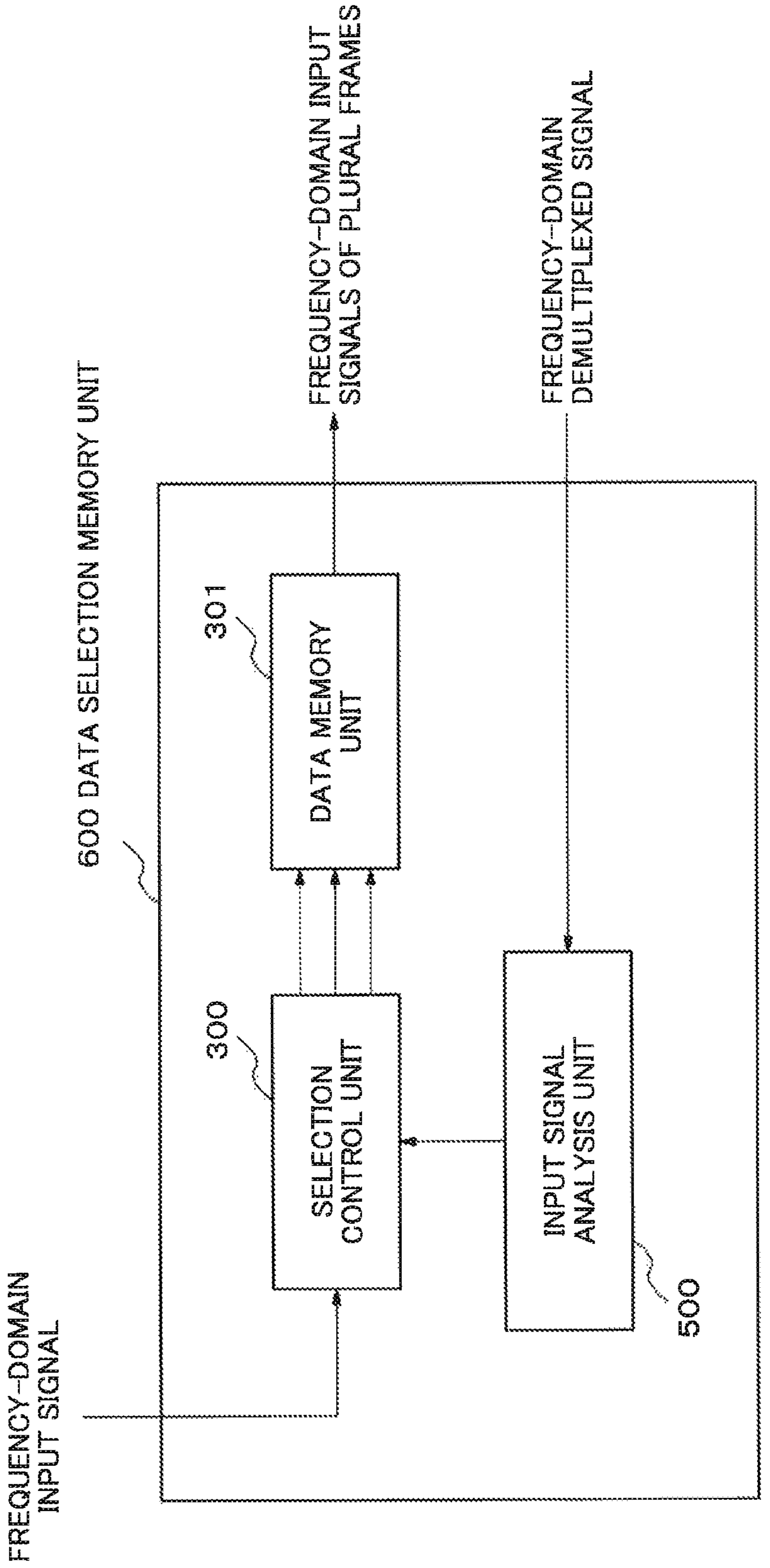
[FIG. 15]

FIG. 15 shows a configuration of the data selection memory unit 600 according to the exemplary embodiment.

With reference to FIG. 15, the data selection memory unit 600 according to the exemplary embodiment includes the input signal analysis unit 500, the selection control unit 300 and the data memory unit 301.

Since the input signal analysis unit 500 according to the present exemplary embodiment is the same as the input signal analysis unit 500 according to the fourth exemplary embodiment shown in FIG. 10, and the data memory unit 301 and the selection control unit 300 according to the present exemplary embodiment are the same as the data memory unit 301 and the selection control unit 300 according to the third exemplary embodiment shown in FIG. 7 respectively, description on these units is omitted. Here, when comparing the present exemplary embodiment with the third exemplary embodiment which is explained with reference to FIG. 7, a different point is that the input signal analysis unit 500 replaces the input signal analysis unit 200.

As a result, the present exemplary embodiment is also different from the third exemplary embodiment in a modification point that an analysis value, which the selection control unit 300 inputs, is based on not the state of no-sound but the state of simultaneous existence of the sound source signals.

Next, an operation of the signal demultiplexing device according to the exemplary embodiment will be described in detail with reference to a drawing.

Figure 16:
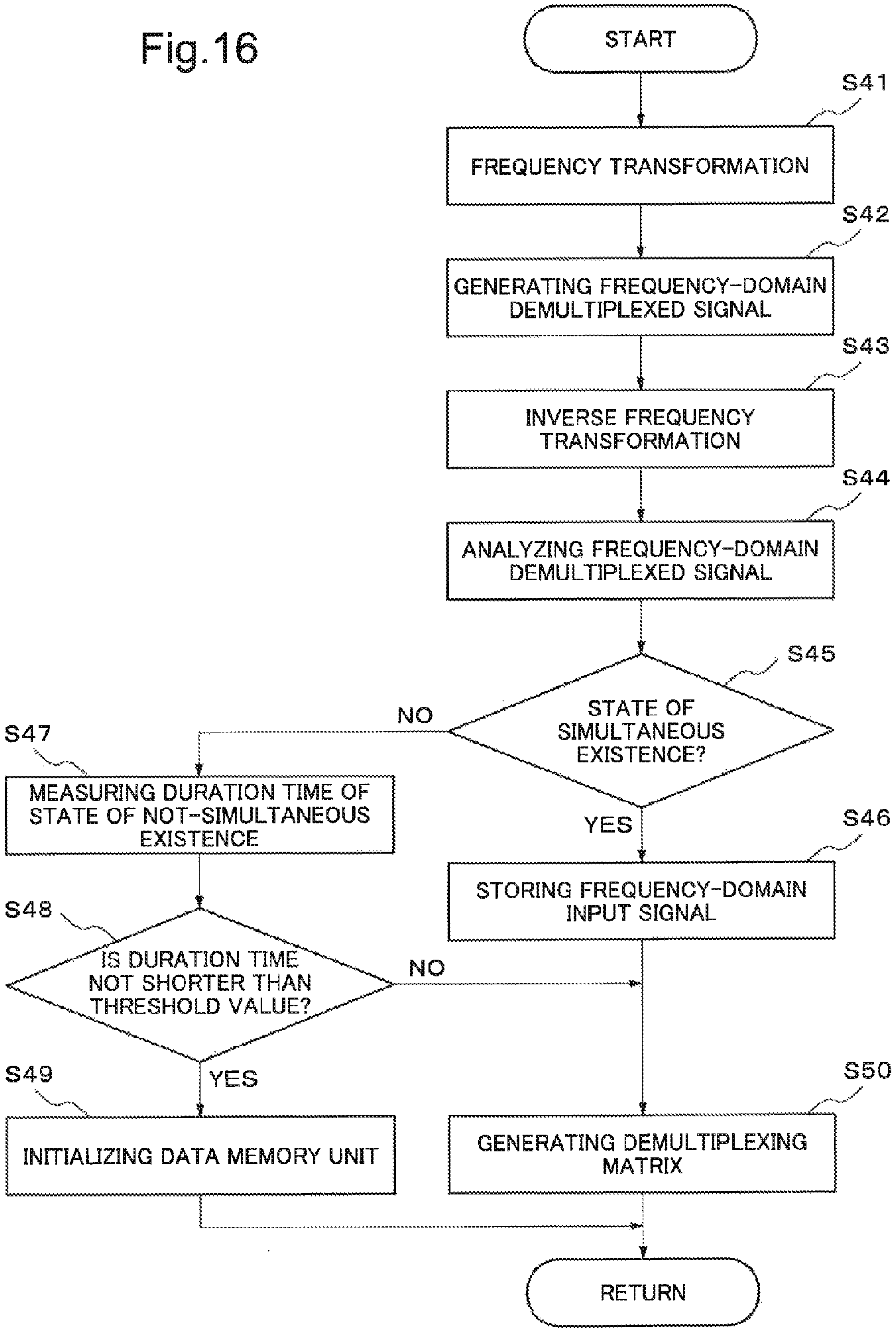
[FIG. 16]

FIG. 16 is a flowchart showing the operation of the signal demultiplexing device according to the exemplary embodiment. Hereinafter, a different point between the operation according to the present exemplary embodiment and the operation according to the fourth exemplary embodiment shown in FIG. 13 will be described mainly.

When comparing the flowchart shown in FIG. 16 with the flowchart shown in FIG. 13 which shows the operation according to the fourth exemplary embodiment, Steps S41 to S46 and S50 in FIG. 16 are corresponding to Steps S31 to S37 in FIG. 13 respectively. Since Steps S41 to S44 are the same as Steps S31 to S34 in FIG. 13 respectively, description on Steps S41 to S44 is omitted. Moreover, since the operation, which is carried out in the case that an input signal is in the state of simultaneous existence (Yes in Step S45), is also the same as the operation which is carried out in the case that the input signal is in the state of simultaneous existence (Yes in Step S35) according to the fourth exemplary embodiment shown in FIG. 13, description on the operation is omitted.

In the case that the input signal is not in the state of simultaneous existence (that is, the input signal is in the state of not-simultaneous existence) (No in Step S45), the selection control unit 300 measures duration time of the state of not-simultaneous existence (Step S47). In the case that the duration time is shorter than a predetermined time (No in Step 48), the demultiplexing matrix generation unit 102 generates a demultiplexing matrix on the basis of frequency-domain input signals of plural frames which are stored in the data memory unit 301 (Step S50).

On the other hand, in the case that the duration time is not shorter than the predetermined time (Yes in Step S48), the selection control unit 300 carries out an initialization process to delete all the frequency domain input signals which are stored in the data memory unit 301 (Step S49).

As mentioned above, the exemplary embodiment has an effect of reducing the degradation of the demultiplexing performance which is caused by that any input signal does not include each the sound source signal, similarly to the fourth exemplary embodiment.

The reason is that the exemplary embodiment has the configuration that a plurality of the frequency-domain input signals, which are in the state of simultaneous existence, that is, which includes mixture of all the sound source signals, are selected, and the demultiplexing matrix is calculated by use of the selected plural frequency-domain input signals which are in the state of simultaneous existence.

Furthermore, the exemplary embodiment has an effect that, even if an environmental change, such as a case that a sound source moves, is caused while being in the state of not-simultaneous existence, it is possible to track the caused environmental change quickly after the state of not-simultaneous existence is ended. That is, the exemplary embodiment has an effect that, in the case that the environmental change is caused while being in the state of not-simultaneous existence, a time interval from the end of the state of not-simultaneous existence until the generation of the demultiplexing matrix which is adaptable to the changed environment is shortened. The multiplexing matrix, which is adapted to the changed environment, makes it possible to generate the correct demultiplexed signal from the mixed signal which is in the changed environment.

The reason is that according to the configuration of the exemplary embodiment, the frequency-domain input signal is analyzed, and the data memory unit 301 is initialized on the basis of the duration time for which the sound source signal is in the state of not-simultaneous existence. Therefore, in the case that the environmental change, such as the case that the sound source moves, is caused while being in the state of not-simultaneous existence, the data memory unit 301 does not include the frequency-domain input signal which is in the environment previous to the environmental change, after the environment is changed. As a result, when generating the demultiplexing matrix in the changed environment, the frequency-domain input signal, which is in the environment previous to the environmental change, is not used in the learning process. Moreover, it is possible to store newly the frequency-domain input signal which ends the state of not-simultaneous existence. Accordingly, an effect that tracking property after end of the state of no-sound is improved is obtained, since it is possible to calculate quickly the demultiplexing matrix reflecting the state which is generated after the environment is changed.

[Sixth Exemplary Embodiment]

Next, a sixth exemplary embodiment of the present invention will be described in detail with reference to a drawing.

Figure 17:
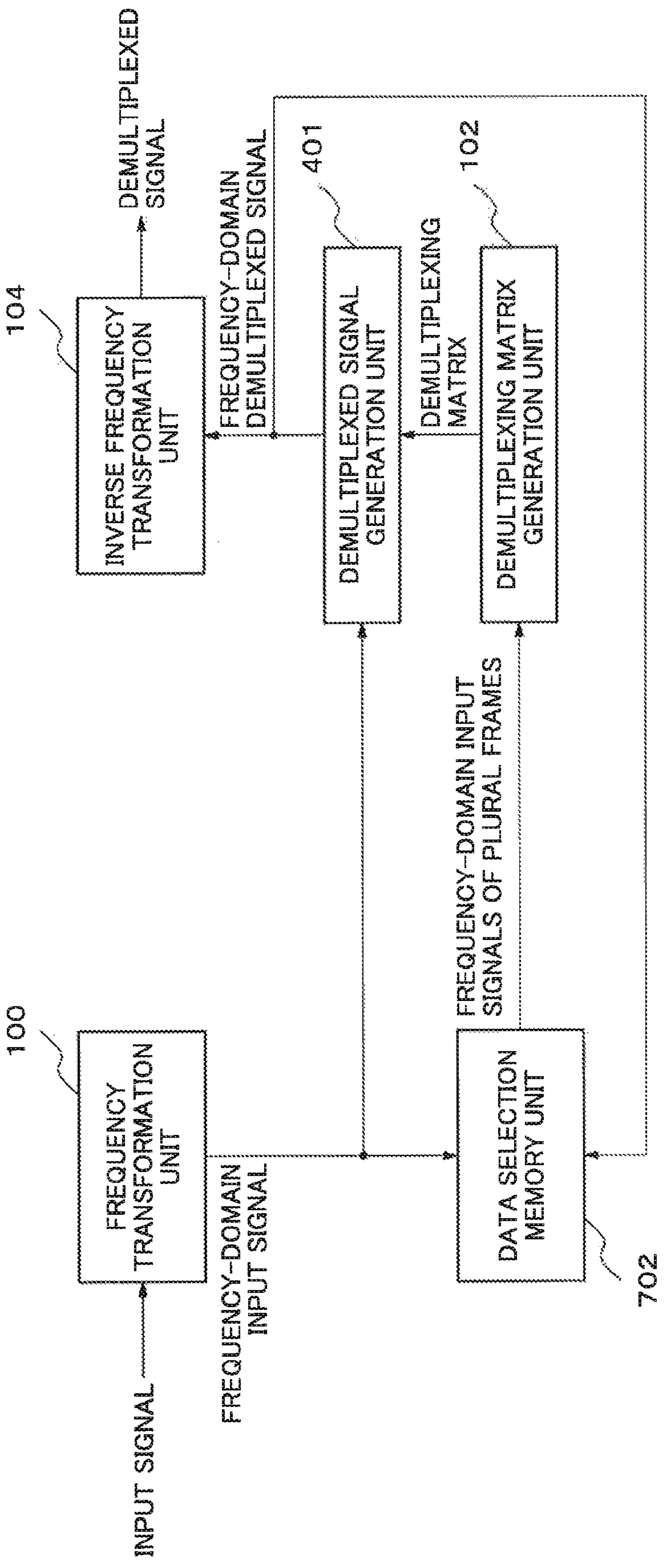
[FIG. 17]

FIG. 17 shows a configuration of a signal demultiplexing device according to the exemplary embodiment.

With reference to FIG. 17, only one different point of the configuration according to the present exemplary embodiment from one according to the fourth exemplary embodiment shown in FIG. 9 is that the configuration according to the present exemplary embodiment includes a data selection memory unit 702 instead of the data selection memory unit 400, and the configuration according to the present exemplary embodiment is the same as one according to the fourth exemplary embodiment except the different point. Hereinafter, the different point between the present exemplary embodiment and the fourth exemplary embodiment will be described mainly.

Figure 18:
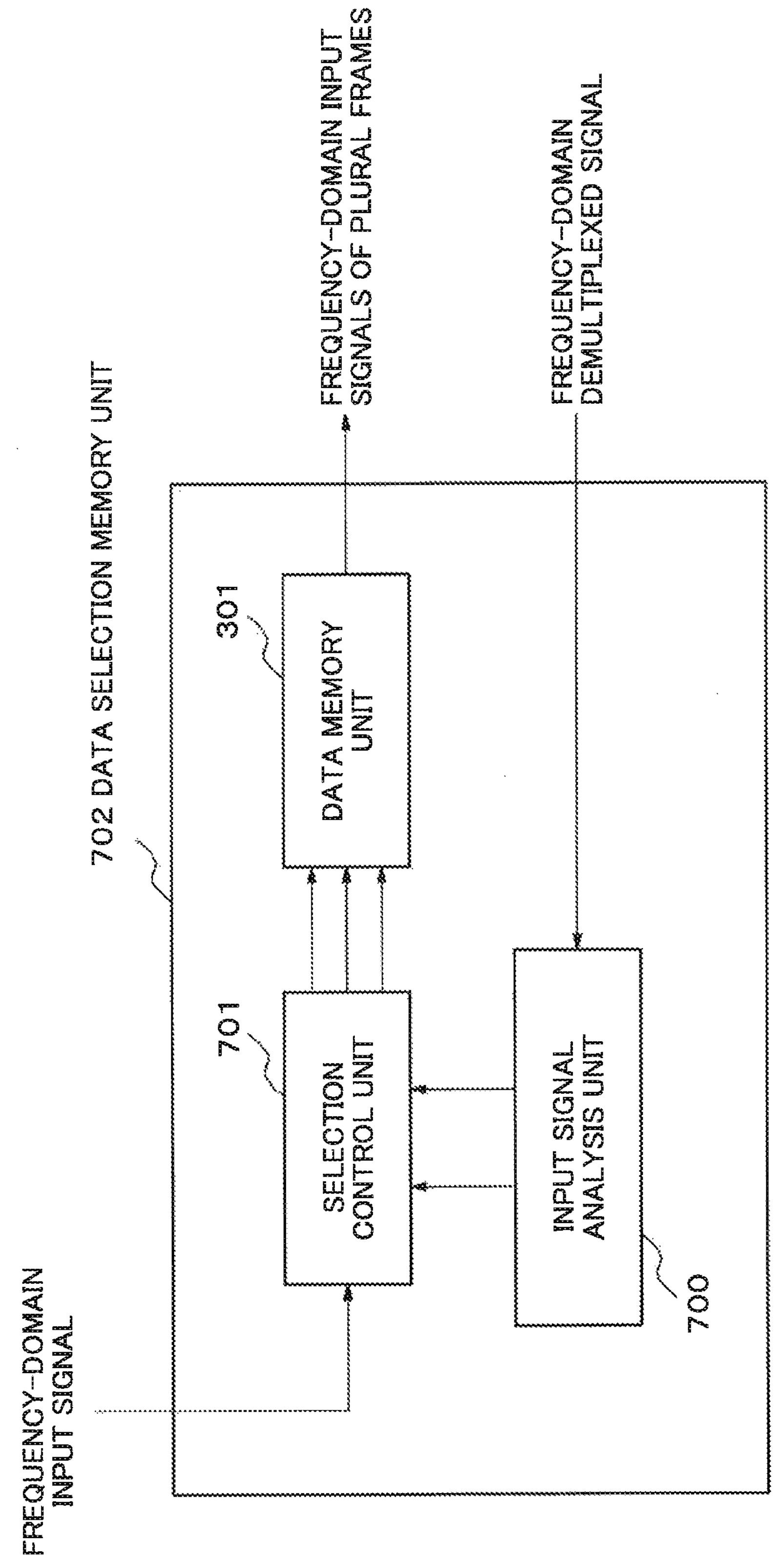
[FIG. 18]

FIG. 18 shows the configuration of the data selection memory unit 702 according to the exemplary embodiment.

With reference to FIG. 18, the data selection memory unit 702 according to the exemplary embodiment includes an input signal analysis unit 700, a selection control unit 701 and the data memory unit 301.

The input signal analysis unit 700 calculates an analysis value, which indicates that sound source signals are in the state of simultaneous existence, through carrying out the same operation as the input signal analysis unit 500 shown in FIG. 5 according to the fourth exemplary embodiment carries out, and outputs the analysis value to the selection control unit 701. Moreover, the input signal analysis unit 700 calculates degree of similarity SYiYj of a frequency-domain demultiplexed signal and outputs the degree of similarity SYiYj to the selection control unit 701. It may be preferable to calculate SYiYj, for example, on the basis of the following formula which uses the i'th frequency-domain demultiplexed signal Yi(f), and the j'th frequency-domain demultiplexed signal Yj(f).

$$S_{Y_iY_j} = \sum_{k=0}^{N-1} Y_i^*(k)Y_j(k) \quad \text{[Formula 6]}$$

In Formula 6, N means a half of a transformation block length of the frequency transformation, and * indicates complex conjugate.

Moreover, it may be preferable to calculate SYiYj, for example, on the basis of the following formula.

$$S_{Y_iY_j} = \frac{\sum_{k=0}^{N-1} Y_i^*(k)Y_j(k)}{\sqrt{\sum_{k=0}^{N-1} |Y_i(k)|^2}\sqrt{\sum_{k=0}^{N-1} |Y_j(k)|^2}} \quad \text{[Formula 7]}$$

The selection control unit 701 sets update information on the basis of the analysis value through carrying out the same operation as the selection control unit 201 shown in FIG. 10 according to the fourth exemplary embodiment carries out. Then, the selection control unit 701 outputs the frequency-domain input signal and the update information to the data memory unit 301. Moreover, the selection control unit 701 sets initialization information, which is used for initializing the frequency-domain input signals stored in the data memory unit 301, on the basis of the degree of similarity. Then, the selection control unit 701 outputs the initialization information to the data memory unit 301. It is preferable that the selection control unit 701 judges that an environmental change is caused, for example, in the case that the degree of similarity is not smaller than a threshold value, and sets the initialization information to 1. Moreover, it is preferable that the selection control unit 701 sets the initialization information to 0 in other cases. Here, if the correct demultiplexing matrix is calculated, the frequency-domain demultiplexed signals are different each other, and the degree of similarity becomes small. Accordingly, in the case that the degree of similarity is large, the demultiplexing matrix is not correct, that is, it is possible to judge that an environmental change, such as a case that a sound source moves, is caused. As mentioned above, the selection control unit 701 can detect the environmental change by virtue of the analysis which uses the degree of similarity.

Here, number of SYiSYj is coincident with number of combinations of i and j which are different each other. In the case that there are a plurality of combinations of i and j which are different each other, it is preferable that the selection control unit 701 judges that the environmental change is caused when number of SYiSYj, whose value exceeds a threshold value, exceeds a predetermined number. It is preferable to determine the number of SYiSYj, whose value exceeds the threshold value, appropriately according to an objective. "Case that the degree of similarity exceeds a threshold value" in the following description include a case that a plurality of the combinations of i and j, which are different each other, exist, and the number of SYiYj whose value exceeds the threshold value exceeds the predetermined number.

Moreover, it is preferable that the selection control unit 701 measures duration time, for which the sound source signal is in the state of not-simultaneous existence, through carrying out the same operation as the selection control unit 300 shown in FIG. 15 according to the fifth exemplary embodiment carries out.

Moreover, it may be preferable that the selection control unit 701 combines the degree of similarity mentioned above and the measured duration time, and sets the initialization information, for example, as follows. It is preferable that the control selection unit 701 sets the initialization information to 1 in the case that any one of the degree of similarity and the duration time is not smaller than a threshold value, and sets the initialization information to 0 in other cases.

The data memory unit 301 stores the frequency-domain input signals of the plural frames. In the case that the data memory unit 301 inputs the update information and the frequency-domain input signal newly, it is preferable that the data memory unit 301 deletes the frequency-domain input signal of the frame which the update information designates, and stores the inputted frequency-domain input signal newly. Moreover, in the case that the initialization information is 1, it is preferable that the data memory unit 301 deletes all the stored frequency-domain input signals.

Moreover, it may be preferable to use not the analysis value which indicates the state of simultaneous existence of the sound source signals mentioned above, but the analysis value which indicates any one of the state of simultaneous existence, the state of sole existence, and the state of no-sound. In this case, the input signal analysis unit 700 and the selection control unit 701 operate, for example, as shown in the following.

It is preferable that the input signal analysis unit 700 sets the analysis value, which indicates any one of the state of simultaneous existence, the state of sole existence, and the state of no-sound, and set the analysis value through carrying out the same operation as the input signal analysis unit 500 shown in FIG. 10 according to the fourth exemplary embodiment carries out, and outputs the set analysis value to the selection control unit 701. It is preferable that the selection control unit 701 sets the update information on the basis of the analysis value through carrying out the same operation as the input signal analysis unit 201 shown in FIG. 10 carries out, and outputs the frequency-domain input signal and the update information to the data memory unit 301.

Next, an operation of a whole of the signal demultiplexing device according to the exemplary embodiment will be described in detail with reference to a drawing.

Figure 19:
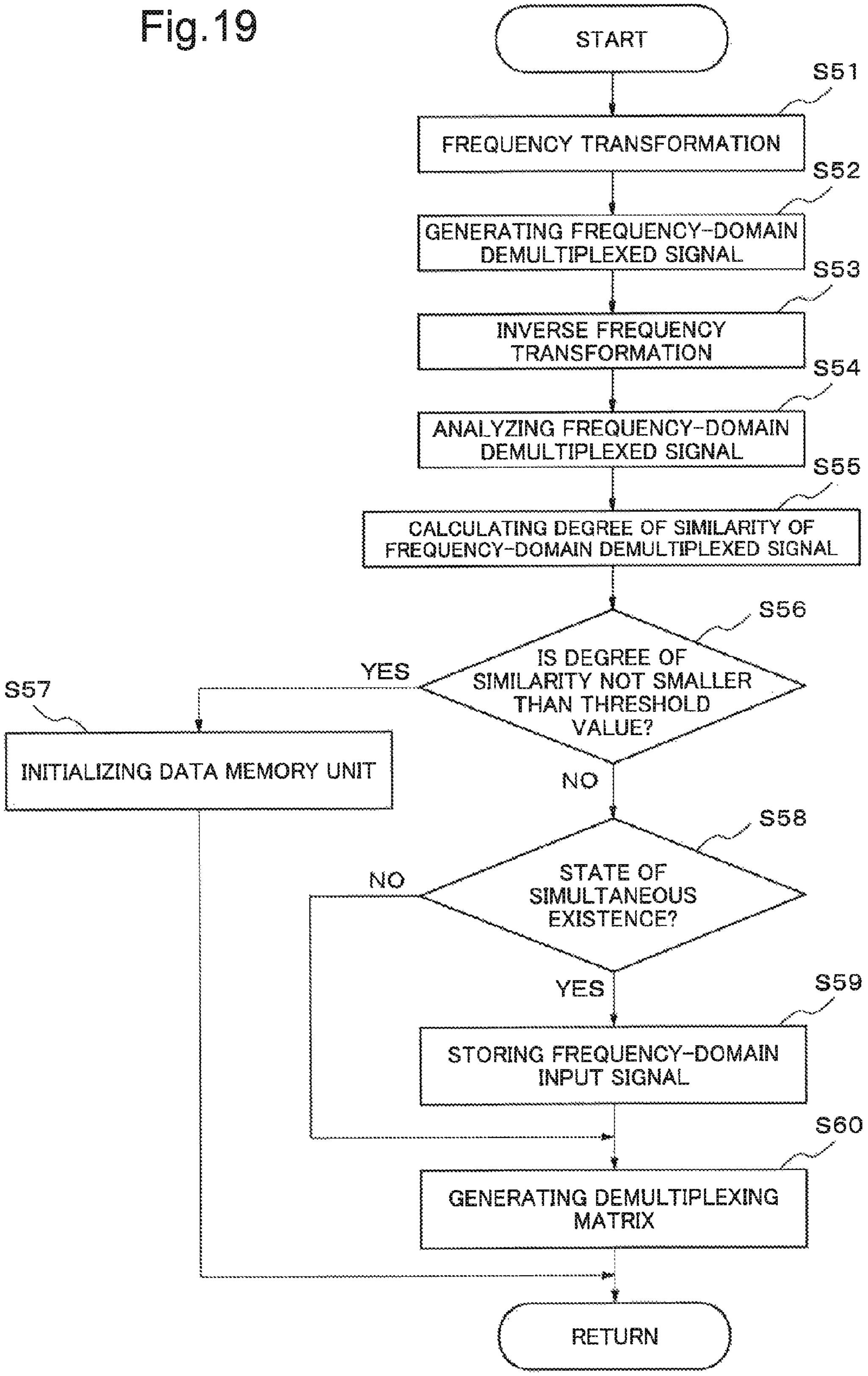
[FIG. 19]

FIG. 19 is a flowchart showing an operation according to the exemplary embodiment. Hereinafter, a different point of the flowchart according to the present exemplary embodiment from the flowchart shown in FIG. 13 according to the fourth exemplary embodiment will be described mainly. Since Steps S51 to S53 in FIG. 19 are the same as Steps S31 to S33 in FIG. 13, description on these Steps is omitted.

The input signal analysis unit 700 analyzes the frequency-domain demultiplexed signal, and judges whether the sound source signal is in the state of simultaneous existence (Step S54), and calculates the degree of similarity SYiYj (Step S55). In the case that the degree of similarity is not smaller than a threshold value (Yes in Step S56), the selection control unit 701 initializes the data memory unit 301 (Step S57), and ends the process for the current frame signal.

In the case that the degree of similarity is smaller than the threshold value (No in Step S56), if the sound source signal is in the state of simultaneous existence (Yes in Step S58), the selection control unit 701 makes the data memory unit 301 store the frequency-domain demultiplexed signal (Step S59), and the operation proceeds to Step S59. If the sound source signal is not in the state of simultaneous existence (No in Step S58), the operation proceeds to Step S59. The demultiplexing matrix generation unit 102 generates the demultiplexing matrix, like Step S37 in FIG. 13 (Step S60).

Similarly to the fourth exemplary embodiment, the present exemplary embodiment has an effect of reducing the degradation of the demultiplexing performance which is caused by that any input signal does not include each of the sound source signals.

The reason is that the exemplary embodiment has the configuration that a plurality of the frequency-domain input signals, which are in the state of simultaneous existence, that is, which include mixture of all the sound source signals, are selected, and the demultiplexing matrix is calculated on the basis of the selected plural frequency-domain input signals which are in the state of simulataneous existence.

Furthermore, the exemplary embodiment has an effect that, even if the environmental change, such as the case that the sound source moves, is caused, it is possible to track the caused environmental change quickly. That is, the exemplary embodiment has an effect that, in the case that the environmental change is caused, a time interval from the environmental change until the generation of the demultiplexing matrix which is adaptable to the changed environment is shortened. The demultiplexing matrix, which is adapted to the changed environment, makes it possible to generate the correct demultiplexed signal from the mixed signal which is in the changed environment.

The reason is that according to the configuration of the exemplary embodiment, the environmental change, such as the case that the sound source moves, is detected by use of the degree of similarity of the frequency-domain demultiplexed signal, and the data memory unit 301 is initialized on the basis of the detection result. Therefore, in the case that the environmental change is caused, the data memory unit 301 does not store the frequency-domain input signal which is in the environment previous to the environmental change, after the environment is changed. As a result, when generating the demultiplexing matrix in the changed environment, the frequency-domain input signal which is in the environment previous to the environmental change, is not used in the learning process. Moreover, it is possible to store newly the frequency-domain input signal which is in the changed environment such as the case that the sound source moves. Accordingly, an effect that tracking property in the changed environment is improved is obtained, since it is possible to calculate quickly the demultiplexing matrix reflecting the state which is generated after the environment is changed.

[Seventh Exemplary Embodiment]

Next, a seventh exemplary embodiment of the present invention will be described in detail with reference to a drawing.

Figure 20:
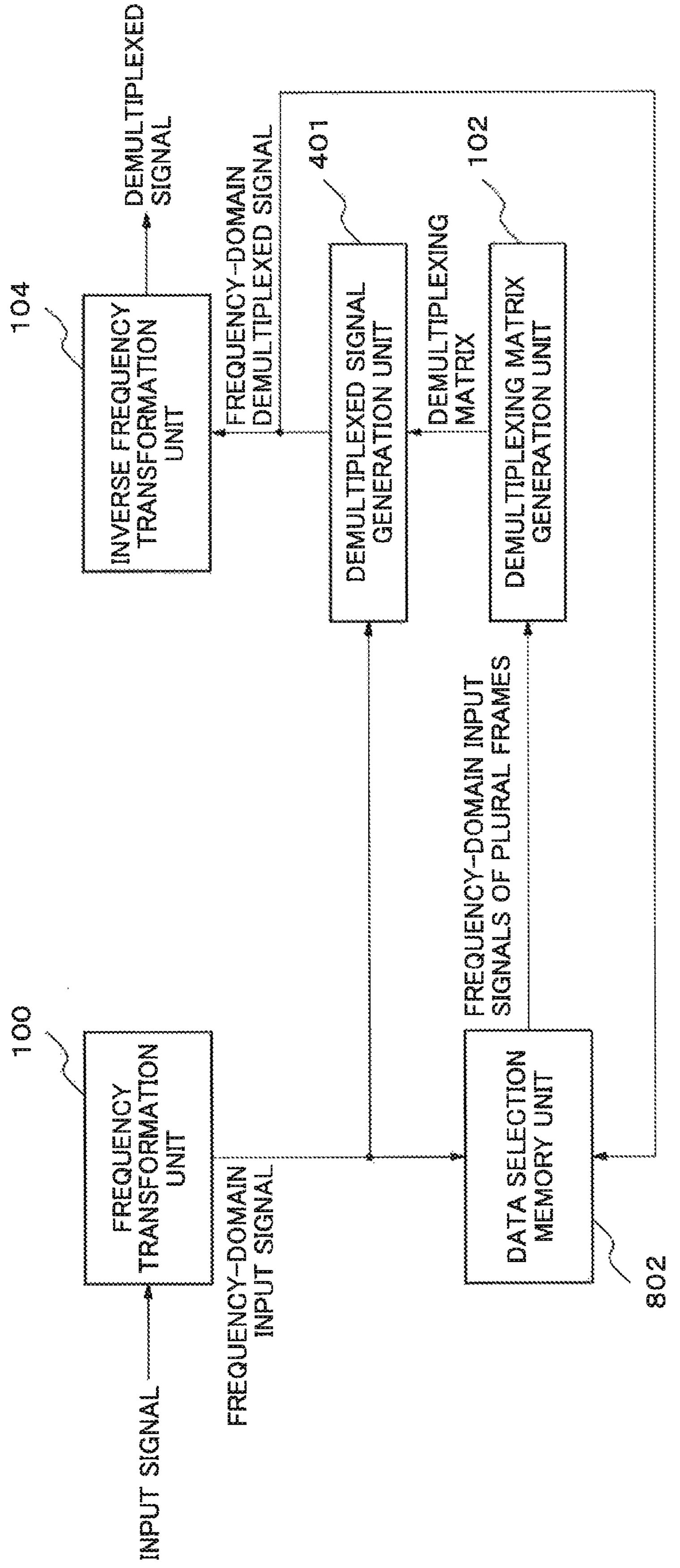
[FIG. 20]

FIG. 20 shows a configuration of a signal demultiplexing device according to the exemplary embodiment.

With reference to FIG. 20, only one different point of the configuration according to the present exemplary embodiment from one according to the fourth exemplary embodiment is that the configuration according to the present exemplary embodiment includes a data selection memory unit 802 instead of the data selection memory unit 400, and is the same as one according to the fourth exemplary embodiment except the different point mentioned above. Hereinafter, the different point in the configuration between the present exemplary embodiment and the fourth exemplary embodiment will be described mainly.

Figure 21:
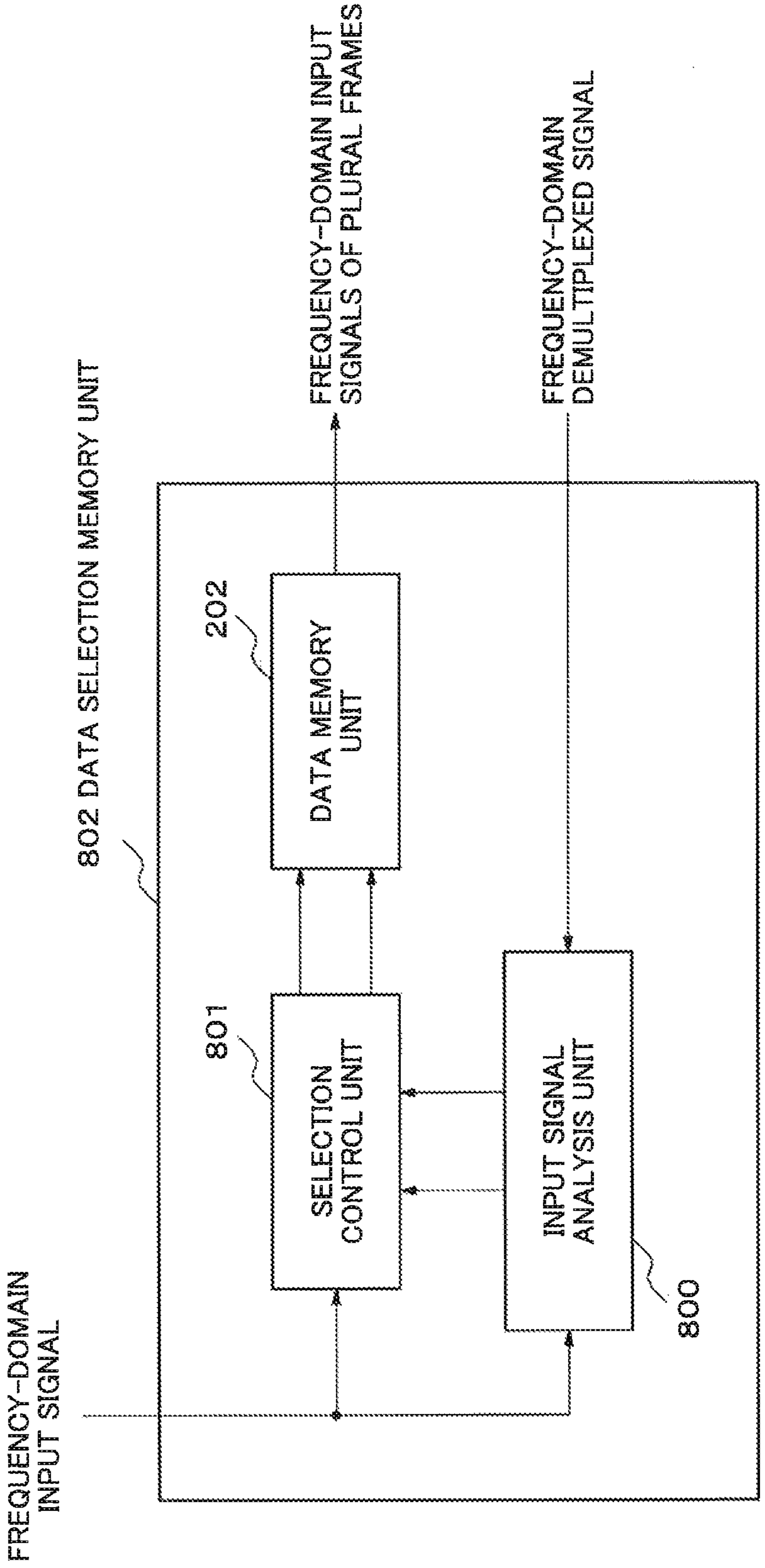
[FIG. 21]

FIG. 21 shows a configuration of the data selection memory unit 802 according to the exemplary embodiment.

With reference to FIG. 21, the data selection memory unit 802 according to the exemplary embodiment includes an input signal analysis unit 800, a selection control unit 801 and the data memory unit 202.

The input signal analysis unit 800 calculates an analysis value, which indicates the state of no-signal, through carrying out the same operation as the input signal analysis unit 200 shown in FIG. 4 according to the second exemplary embodiment carries out. Then, the input signal analysis unit 800 outputs the analysis value to the selection control unit 801. Moreover, the input signal analysis unit 800 calculates the analysis value, which indicates the state of simultaneous existence of the sound source signals, through carrying out the same operation as the input signal analysis unit 500 shown in FIG. 10 according to the fourth exemplary embodiment carries out. Then, the input signal analysis unit 800 outputs the analysis value to the selection control unit 801.

The selection control unit 801 calculates an integrated analysis value which is integration of the analysis value indicating the state of no-sound, and the analysis value indicating the state of simultaneous existence. It is preferable that the selection control unit 801 sets the integrated analysis value, for example, to the arithmetic average value or the geometrical average value of two analysis values. The selection control unit 801 sets update information, on the basis of the integrated analysis value instead of the analysis value according to the fourth exemplary embodiment, through carrying out the same operation as the selection control unit 201 shown in FIG. 10 according to the fourth exemplary embodiment carries out, and outputs the frequency-domain input signal and the update information to the data memory unit 202.

The data memory unit 202 stores frequency-domain input signals of plural frames. In the case that the data memory unit 202 inputs the update information and the frequency-domain input signal newly, it is preferable that the data memory unit 202 deletes the frequency-domain input signal of the frame which the update information designates, and stores the inputted frequency-domain input signal newly.

Next, an operation of a whole signal demultiplexing device according to the exemplary embodiment will be described in detail with reference to a drawing.

Figure 22:
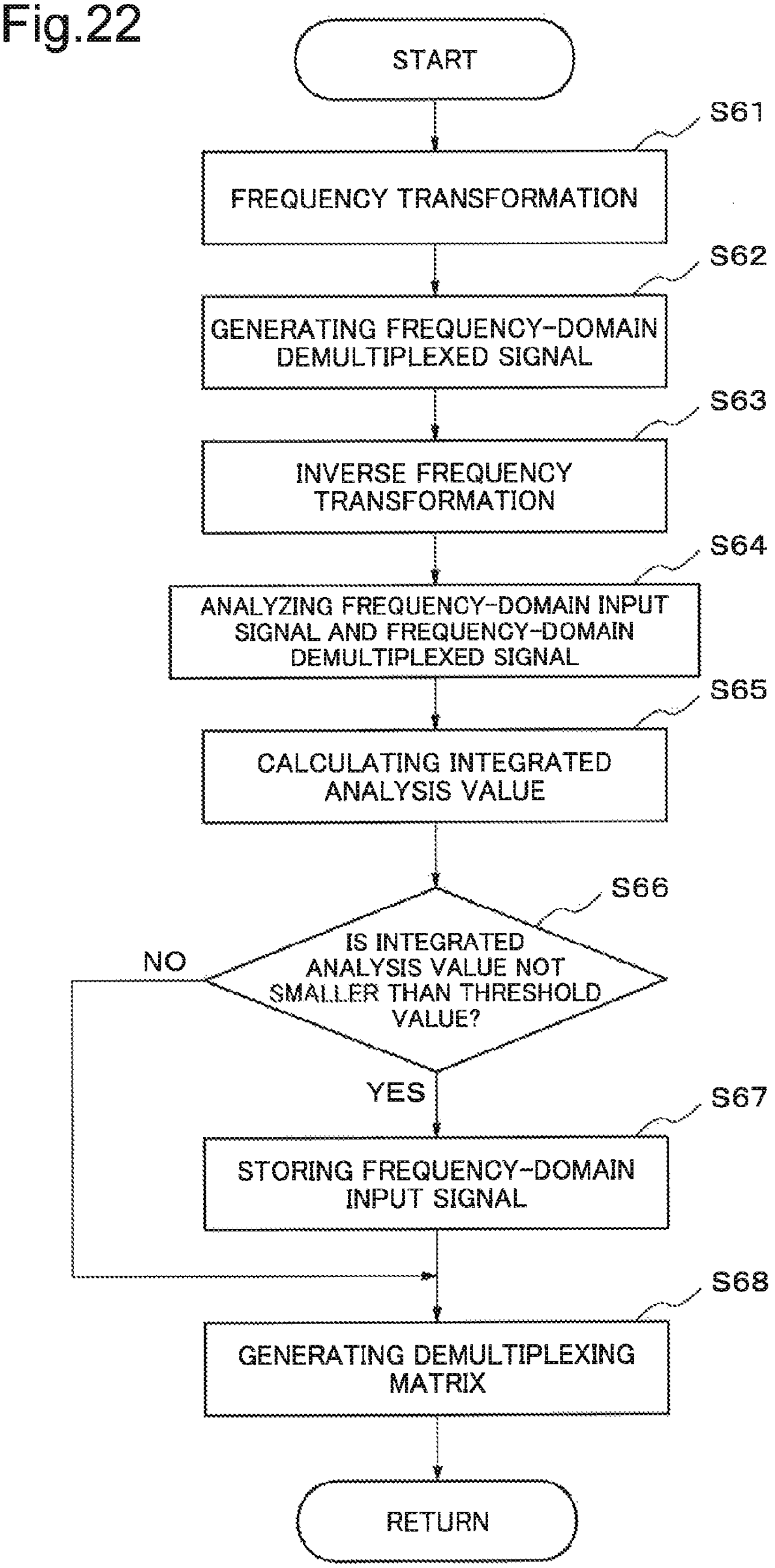
[FIG. 22]

FIG. 22 is a flowchart showing an operation according to the exemplary embodiment. Hereinafter, a different point in the operation between the present exemplary embodiment and the fourth exemplary embodiment will be described mainly.

Since Steps S61 to S63 in the operation according to the exemplary embodiment are the same as Steps S31 to S33 in the operation according to the fourth exemplary embodiment shown in FIG. 13 with reference to FIG. 22, description on these Steps is omitted.

The input signal analysis unit 800 of the data selection memory unit 802 analyzes the frequency-domain input signal which the frequency transformation unit 100 generates, and the frequency-domain demultiplexed signal which the demultiplexed signal generating unit 401 generates, and sets two analysis values mentioned above. The input signal analysis unit 800 sends the analysis values to the selection control unit 801 (Step S64).

The selection control unit 801 calculates the integrated analysis value on the basis of two analysis values which are received (Step S65). In the case that the integrated analysis value, which the selection control unit 801 calculates, is smaller than a threshold value (No in Step S66), the operation proceeds to Step S68. In the case that the integrated analysis value is not smaller than the threshold value (Yes in Step S66), the selection control unit 801 makes the data memory unit 202 store the frequency-domain input signal of the frame whose integration analysis value is calculated (Step S67).

The demultiplexing matrix generation unit 102 generates the demultiplexing matrix by use of the frequency-domain input signals of the plurality frames which are stored in the data memory unit 202 (Step S68).

As mentioned above, the present exemplary embodiment has an effect of reducing the degradation of the demultiplexing performance which is caused due to no-signal or no-mixture of the sound source signals.

The reason is that the signal demultiplexing device according to the exemplary embodiment has the configuration that the demultiplexing matrix is calculated by use of the plural frequency-domain input signals selected on the basis of the integrated analysis value which is calculated by use of the analysis value indicating the state of no-sound, and the analysis value indicating the state of simultaneous existence of the sound source signals. Since the frequency-domain input signal, which is selected on the basis of the integrated analysis value, is in the state of sound existence or in the state of simultaneous existence, it is possible to reduce the degradation of the demultiplexing performance which is caused due to no-signal or no-mixture of the sound source signals.

[Eighth Exemplary Embodiment]

Next, an eighth exemplary embodiment of the present invention will be described in detail with reference to a drawing.

Figure 23:
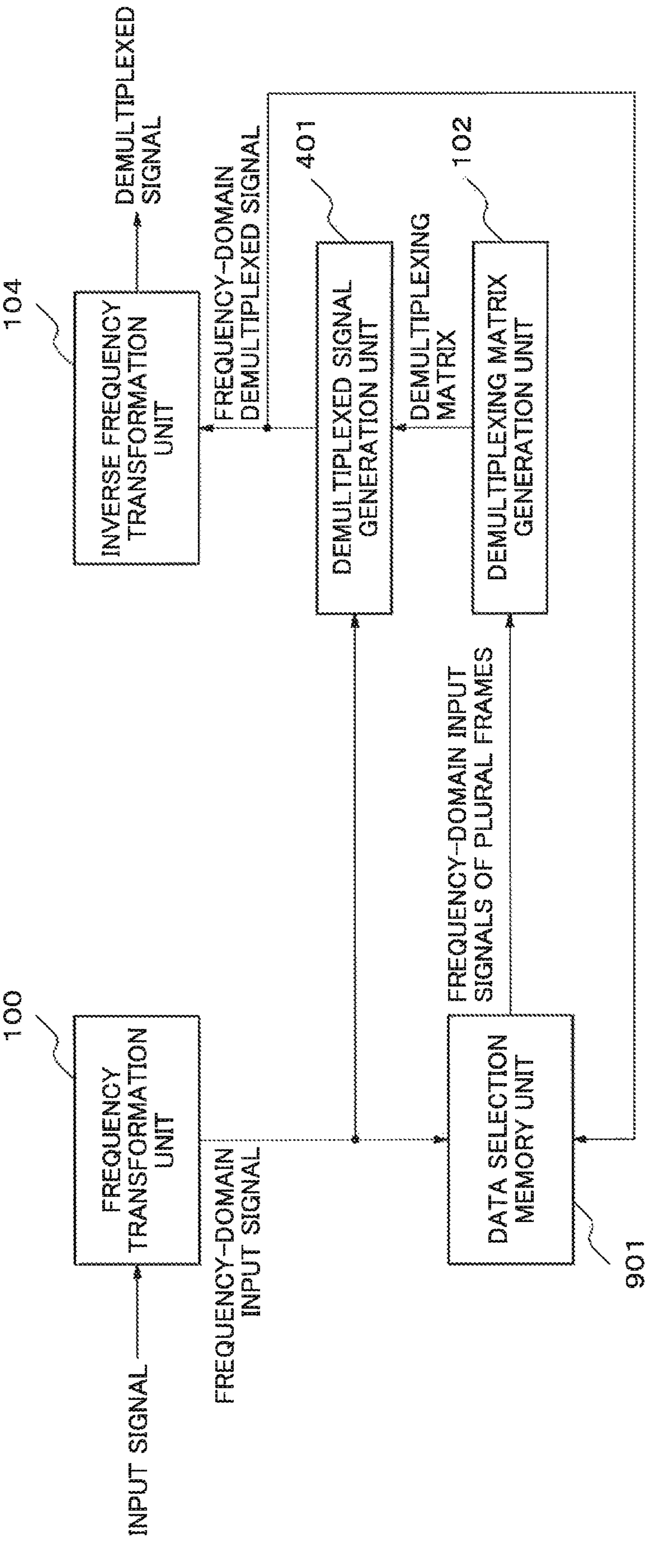
[FIG. 23]

FIG. 23 shows a configuration of a signal demultiplexing device according to the exemplary embodiment.

With reference to FIG. 23, only one different point of the configuration according to the present exemplary embodiment from one according to the fourth exemplary embodiment is that the configuration according to the present exemplary embodiment includes a data selection memory unit 901 instead of the data selection memory unit 400, and is the same as one according to the fourth exemplary embodiment except the different point mentioned above. Hereinafter, the different point between the present exemplary embodiment and the fourth exemplary embodiment will be described mainly.

Figure 24:
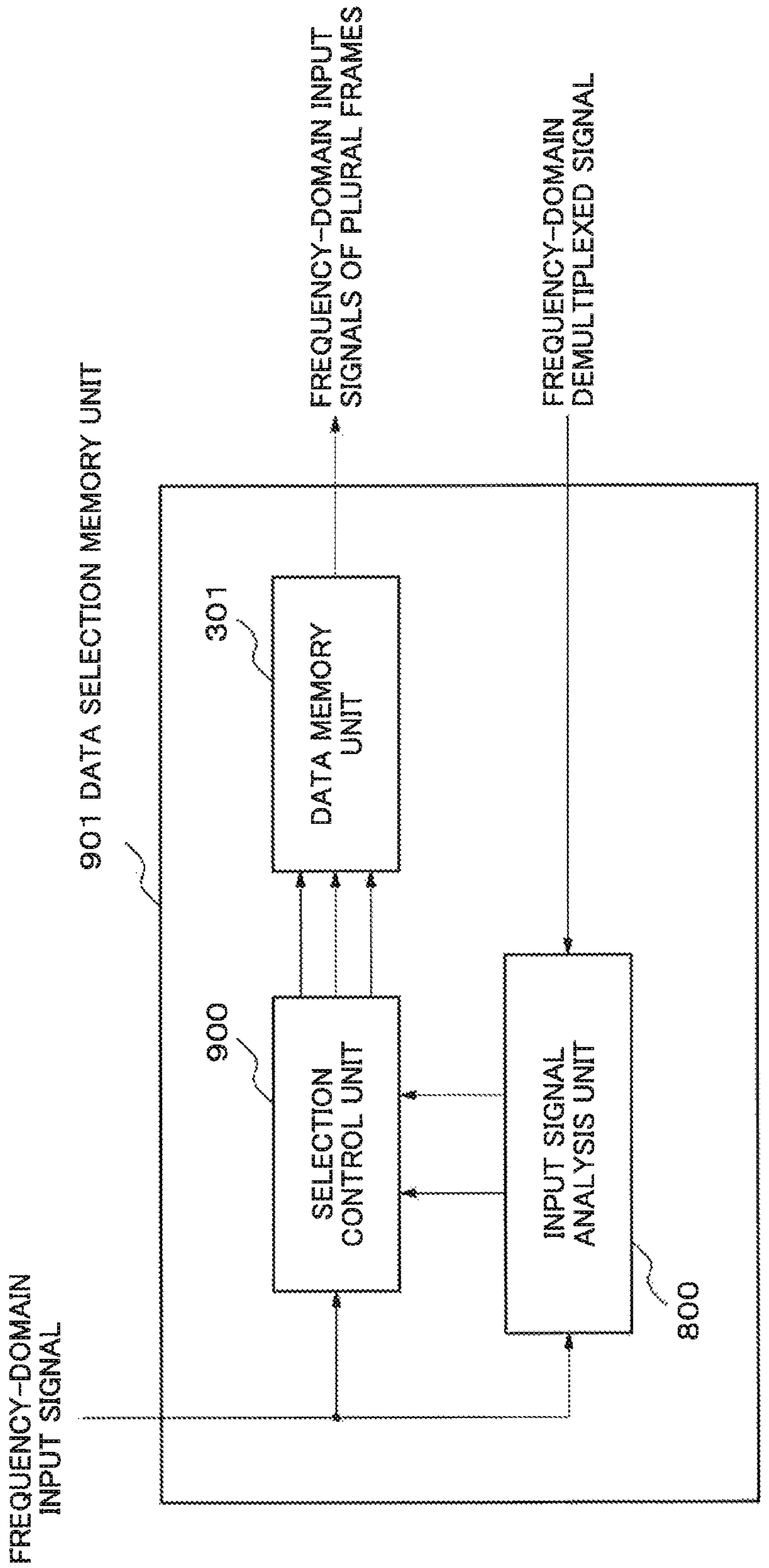
[FIG. 24]

FIG. 24 shows a configuration of the data selection memory unit 901 according to the exemplary embodiment.

As shown in FIG. 24, the data selection memory unit 901 according to the exemplary embodiment includes the input signal analysis unit 800, a selection control unit 900 and the data memory unit 301.

The input signal analysis unit 800 calculates an analysis value, which indicates the state of no-signal, through carrying out the same operation as the input signal analysis unit 200 shown in FIG. 4 according to the second exemplary embodiment carries out. Then, the input signal analysis unit 800 outputs the analysis value to the selection control unit 900. Moreover, the input signal analysis unit 800 calculates the analysis value, which indicates the state of simultaneous existence of the sound source signals, through carrying out the same operation as the input signal analysis unit 500 shown in FIG. 10 according to the fourth exemplary embodiment carries out. Then, the input signal analysis unit 800 outputs the analysis value to the selection control unit 900.

The selection control unit 900 calculates an integrated analysis value which is integration of the analysis value indicating the state of no-sound, and the analysis value indicating the state of simultaneous existence. It is preferable that the selection control unit 900 sets the integrated analysis value, for example, to the arithmetic average value or the geometrical average value of two analysis values. It is preferable that the selection control unit 900 sets update information, on the basis of the integrated analysis value instead of the analysis value according to the fourth exemplary embodiment, through carrying out the same operation as the selection control unit 201 shown in FIG. 10 according to the fourth exemplary embodiment carries out. Then, it is preferable the selection control unit 900 outputs the frequency-domain input signal and the update information to the data memory unit 301. Moreover, it is preferable that the selection control unit 900 sets initialization information, which is used for initializing the frequency-domain input signal stored in the data memory unit 301, on the basis of the integrated analysis value. Then, it is preferable that the selection control unit 900 outputs the initialization information to the data memory unit 301. It is preferable that the selection control unit 900, for example, measures duration time of a state that the integrated analysis value is smaller than a threshold value. Moreover, in the case that the duration time is not shorter than a predetermined threshold value, the selection control unit 900 set the initialization information to 1 so as to initialize the frequency-domain input signal which is stored in the data memory unit 301. In the case that the duration time is shorter that the predetermined threshold value, the selection control unit 900 sets the initialization information to 0.

It may be preferable that the selection control unit 900 sets the update information, similarly to the exemplary embodiment mentioned above, by use of any one out of three kinds of the analysis values, that is, the analysis value indicating the state of no-sound, the analysis value indicating the state of simultaneous existence of the sound source signals, and the integrated analysis value. Moreover, it may be preferable that the selection control unit 900 sets the initialization information, similarly to the exemplary embodiment mentioned above, by use of any one out of three kinds of above-mentioned analysis values. Here, in the case that the update information and the initialization information are set by use of the analysis value which indicates the state of no-sound, the same effect as one according to the third exemplary embodiment is obtained. Moreover, in the case that the update information and the initialization information are set by use of the analysis value which indicates the state of simultaneous existence of the sound source signals, the same effect as one according to the fifth exemplary embodiment is obtained.

The data memory unit 301 stores frequency domain input signals of plural frames. In the case that the data memory unit 301 inputs the update information and the frequency-domain input signal newly, it is preferable that the data memory unit 301 deletes the frequency-domain input signal of the frame which the update information designates, and stores the inputted frequency-domain input signal newly. Moreover, in the case that the initialization information is 1, it is preferable that the data memory unit 301 deletes all of the stored frequency-domain input signals.

Next, an operation of a whole of the signal demultiplexing device according to the exemplary embodiment will be described in detail with reference to a drawing.

Figure 25:
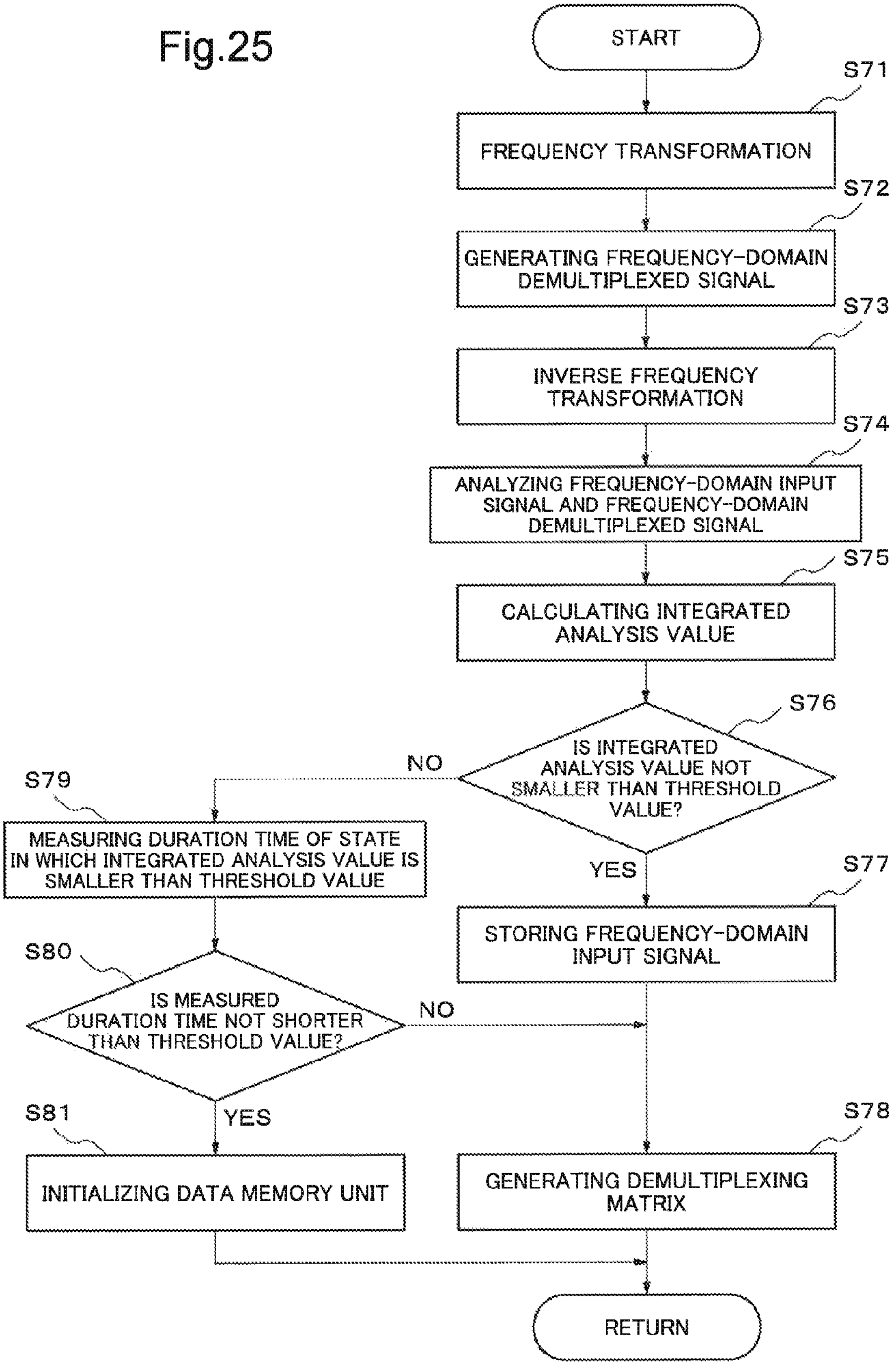
[FIG. 25]

FIG. 25 is a flowchart showing an operation of the signal processing device according to the exemplary embodiment. Hereinafter, a different point of the operation according to the present exemplary embodiment from the operation according to the seventh exemplary embodiment shown in FIG. 22 will be described mainly.

When comparing the operation shown in FIG. 25 according to the present exemplary embodiment with the operation shown in FIG. 22 according to the seventh exemplary embodiment, a different point of the operation according to the present exemplary embodiment from the operation according to the seventh exemplary embodiment is that the data memory unit 301 is initialized when a state that the integrated analysis value is smaller that a threshold value continues for a predetermined time. Since the operations in Steps S71 to S75 shown in FIG. 25 are the same as the operations in Steps S61 to S65 shown in FIG. 22, description on these Steps is omitted.

In the case that the integrated analysis value, which is calculated, is not smaller than the threshold value (Yes in Step S76), the selection control unit 801 of the data selection memory unit 901 makes the data memory unit 301 store the frequency-domain input signal of the frame whose integrated analysis value is calculated (Step S77), and the operation proceeds to Step S78.

In the case that the integrated analysis value, which is calculated, is smaller than the threshold value (No in Step S76), the selection control unit 801 measures duration time for which the integrated analysis value is smaller than the predetermined threshold value (Step S79). In the case that the duration time measured in Step S79 is shorter than a predetermined threshold value (No in Step S80), the operation proceeds to Step S78. In the case that the duration time measured in Step S79 is not shorter than the predetermined threshold value (Yes in Step S80), the selection control unit 900 carries out the initialization process for deleting all the frequency-domain input signals which the data memory unit 301 stores (Step S81), and ends the process carried out to the current frame.

In Step S78, the demultiplexing matrix generation unit 102 generates the demultiplexing matrix by use of the frequency-domain input signals of the plural frames which are stored in the data memory unit 301 (Step S78).

As mentioned above, the present exemplary embodiment has an effect of reducing the degradation of the demultiplexing performance, similarly to the seventh exemplary embodiment.

The reason is that the signal demultiplexing device according to the exemplary embodiment has the configuration that the demultiplexing matrix is calculated by use of the plural frequency-domain input signals selected on the basis of the integrated analysis value which is calculated by use of the analysis value indicating the state of no-sound, and the analysis value indicating the state of simultaneous existence of the sound source signals.

Furthermore, the exemplary embodiment has an effect that, even if an environmental change, such as a case that a sound source moves, is caused while being in the state of no-sound or in the state of not-simultaneous existence, it is possible to track the caused environmental change quickly. That is, the exemplary embodiment has an effect that, in the case that the environmental change is caused while being in the state of no-sound or the state of not-simultaneous existence, a time interval from end of the state of no-sound or the state of not-simultaneous existence until the generation of the demultiplexing matrix which is adaptable to the changed environment is shortened. The multiplexing matrix, which is adapted to the changed environment, makes it possible to generate the correct demultiplexed signal from the mixed signal which is in the changed environment.

The reason is that according to the configuration of the exemplary embodiment, the data memory unit 301 is initialized according to the duration time, for which the sound source signals are in the state of no-sound or the state of not-simultaneous existence, on the basis of the integrated analysis value which is calculated and which indicates whether the sound source signals are in the state of no-sound or in the state of not-simultaneous existence. In the case that the integrated analysis value according to the exemplary embodiment is not larger than a predetermined value, it is possible to judge that the sound source signals are in the state of no-sound or the state of not-simultaneous existence. In the case that the state of no-sound or the state of not-simultaneous existence continues for a predetermined time, the data memory unit 301 is initialized. Therefore, in the case that the environmental change is caused while being in the state of no-sound or the state of not-simultaneous existence, the data memory unit 301 does not include any frequency-domain input signal which is in the environment previous to the environmental change, after the environment is changed. As a result, when generating the demultiplexing matrix in the changed environment, the frequency-domain input signals, which are in the environment previous to the environmental change, are not used in the learning process. Moreover, the data memory unit 301 can store newly the frequency-domain input signals which are in the changed environment such as the case that the sound source moves. Accordingly, it is possible to calculate quickly the demultiplexing matrix reflecting the state which is generated after the environment is changed. Therefore, an effect that tracking property after end of the state of no-sound or the state of not-simultaneous existence is improved is obtained.

[Ninth Exemplary Embodiment]

Next, a ninth exemplary embodiment of the present invention will be described in detail with reference to a drawing.

Figure 26:
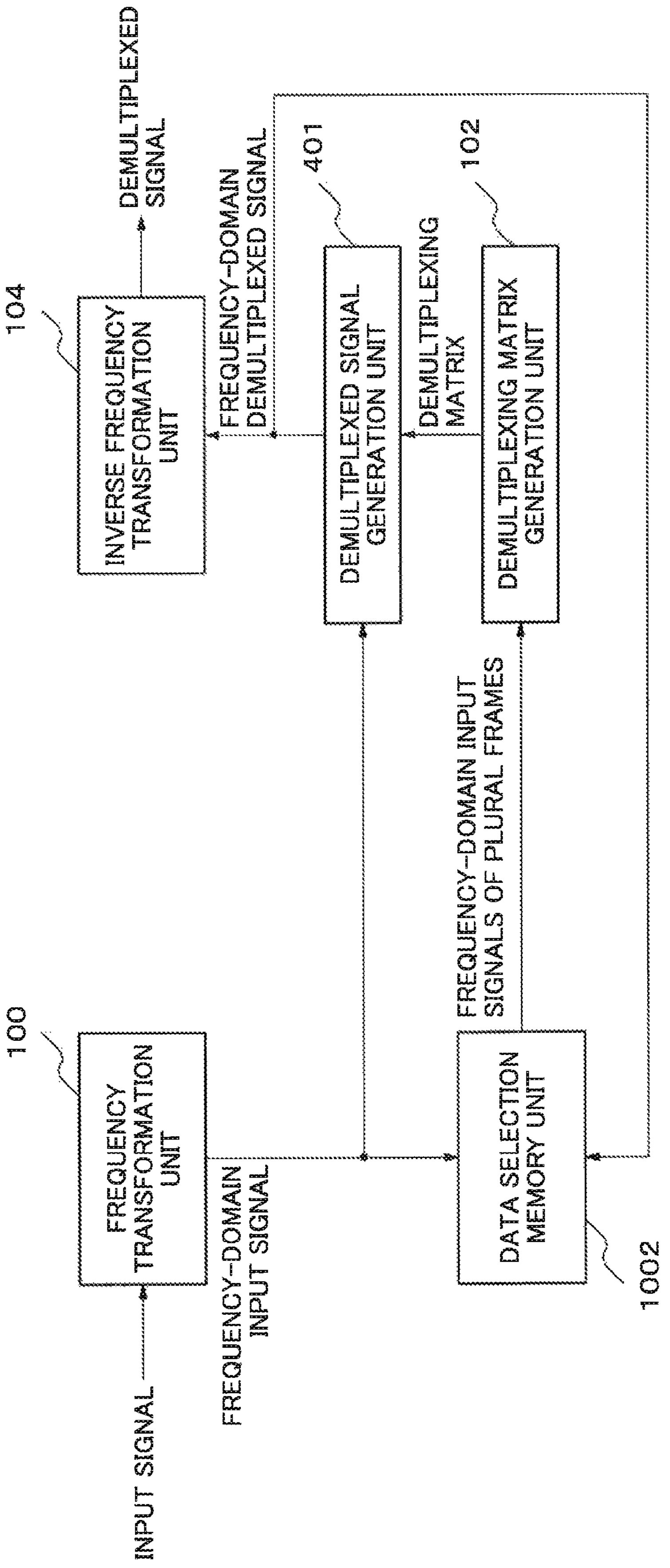
[FIG. 26]

FIG. 26 shows a configuration of a signal demultiplexing device according to the exemplary embodiment.

With reference to FIG. 26, only one different point of the configuration according to the present exemplary embodiment from the configuration shown in FIG. 20 according to the seventh embodiment is that the configuration according to the present exemplary embodiment includes a data selection memory unit 1002 instead of the data selection memory unit 802, and the configuration according to the present exemplary embodiment is the same as the configuration according to the seventh exemplary embodiment except the different point mentioned above. Hereinafter, the different point of the present exemplary embodiment from the seventh exemplary embodiment will be described mainly.

Figure 27:
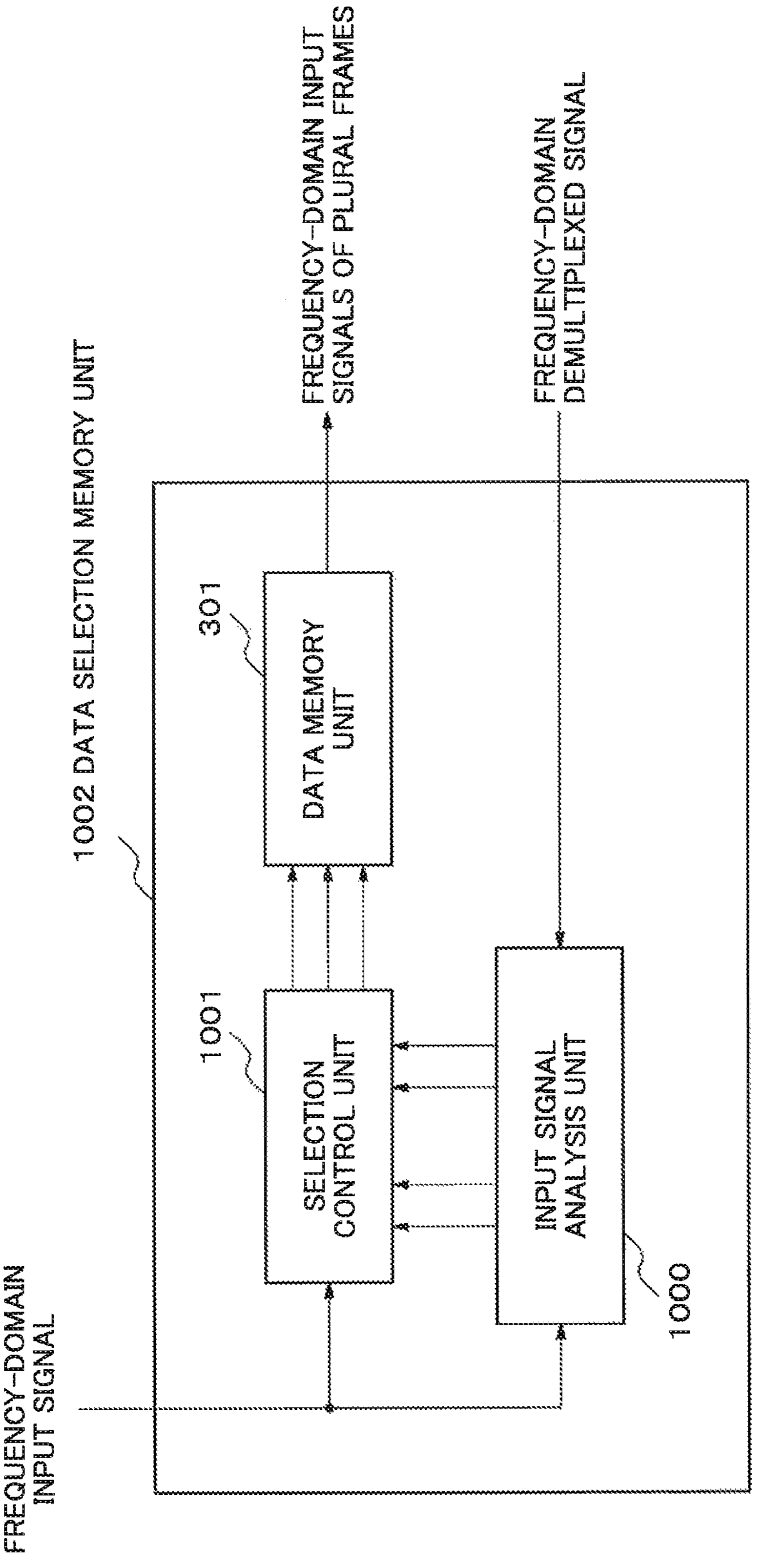
[FIG. 27]

FIG. 27 shows a configuration of the data selection memory unit 1002 according to the exemplary embodiment.

With reference to FIG. 27, the data selection memory unit 1002 according to the exemplary embodiment includes an input signal analysis unit 1000, a selection control unit 1001 and the data memory unit 301.

The input signal analysis unit 1000 calculates an analysis value, which indicates the state of no-sound, through carrying out the same operation as the input signal analysis unit 200 shown in FIG. 4 according to the second exemplary embodiment carries out. Then, the input signal analysis unit 1000 outputs the analysis value to the selection control unit 1001. Moreover, the input signal analysis unit 1000 calculates the analysis value, which indicates the state of simultaneous existence of the sound source signals, through carrying out the same operation as the input signal analysis unit 500 shown in FIG. 10 according to the fourth exemplary embodiment carries out. Then, the input signal analysis unit 1000 outputs the analysis value to the selection control unit 1001. Furthermore, the input signal analysis unit 1000 calculates the above-mentioned degree of similarity SYiYj of the frequency-domain demultiplexed signal through carrying out the same operation as the input signal analysis unit 700 shown in FIG. 18 according to the sixth exemplary embodiment carries out, and outputs the degree of similarity SYiYj to the selection control unit 1001. Moreover, the input signal analysis unit 1000 calculates the degree of similarity SXiYj between the frequency-domain input signal and the frequency-domain demultiplexed signal, and outputs the degree of similarity SXiYj to the selection control unit 1001. It may be preferable that the input signal analysis unit 100 calculates SXiYj, for example, on the basis of the following formula which uses the i'th frequency-domain input signal Xi(f), and the j'th frequency-domain demultiplexed signal Yj(f).

$$S_{X_iY_j} = \sum_{k=0}^{N-1} X_i^*(k)Y_j(k) \quad \text{[Formula 8]}$$

In Formula 8, N means a half of a transformation block length of the frequency transformation, and * indicates complex conjugate.

Moreover, it may be preferable that the input signal analysis unit 1000 calculates SXiYj, for example, on the basis of the following formula.

$$S_{X_iY_j} = \frac{\sum_{k=0}^{N-1} X_i^*(k)Y_j(k)}{\sqrt{\sum_{k=0}^{N-1} |X_i(k)|^2}\sqrt{\sum_{k=0}^{N-1} |Y_j(k)|^2}} \quad \text{[Formula 9]}$$

The selection control unit 1001 calculates an integrated analysis value which is integration of the analysis value indicating the state of no-sound, and the analysis value indicating the state of simultaneous existence. It is preferable that the selection control unit 1001 sets the integrated analysis value, for example, to the arithmetic average value or the geometrical average value of the two analysis values. The selection control unit 1001 sets update information on the basis of the integrated analysis value through carrying out the same operation as the selection control unit 201 shown in FIG. 10 according to the fourth exemplary embodiment carries out. Then, the selection control unit 1001 outputs the frequency-domain input signal and the update information to the data memory unit 301.

Moreover, the selection control unit 1001 calculates an integrated degree of similarity which is integration of two degrees of similarity, that is, SYiYj and SXiYj mentioned above. The selection control unit 1001 sets the integrated analysis value, for example, to the arithmetic average value or the geometrical average value of SYiYj and SXiYj. Moreover, the selection control unit 1001 sets initialization information, which is used for initializing the frequency-domain input signal stored in the data memory unit 301, on the basis of the integrated degree of similarity which is calculated. The selection control unit 1001 outputs the initialization information to the data memory unit 301. It is preferable that the selection control unit 701 judges that an environmental change is caused, for example, in the case that the integrated degree of similarity is not smaller than a threshold value, and sets the initialization information to 1. It is preferable that, in the case that the integrated degree of similarity is smaller than the threshold value, the selection control unit 1001 sets the initialization information to 0. Here, if the correct demultiplexing matrix is calculated, the frequency-domain input signal and the frequency-domain demultiplexed signal are different each other, and consequently SXiYj becomes small. Accordingly, in the case that SXiYj is large, the demultiplexing matrix is not correct, that is, it is possible to judge that the environmental change is caused.

Moreover, it may be preferable that the selection control unit 1001 sets the update information through carrying out the same operation as the operation according to the above-mentioned embodiments by use of any one out of three analysis values, that is, the analysis value indicating the state of no-sound, the analysis value indicating the state of simultaneous existence of the sound source signals, and the integrated analysis value. Moreover, it may be preferable that the selection control unit 1001 sets the initialization information through carrying out the same operation as the operation according to the above-mentioned embodiments by use of any one of three degrees of similarity, that is, the degree of similarity between the frequency-domain demultiplexed signals, the degree of similarity between the frequency-domain input signal and the frequency-domain demultiplexed signal and the integrated degree of similarity.

Moreover, it may be preferable that the update initialization control unit 1001 measures duration time through carrying out the same operation as the operation according to the above-mentioned exemplary embodiments by use of the analysis value which is used for setting the update information. Moreover, it may be preferable that the update initialization control unit 1001 sets the initialization information through combining the duration time and the degree of similarity. It is preferable that the control selection unit 1001, for example, sets the initialization information to 1 in the case that at least one out of the degree of similarity and the duration time is not smaller than a threshold value. It is preferable that update initialization control unit 1001 sets the initialization information to 0 in the case that both of the degree of similarity and the duration time are smaller than the threshold values respectively.

Here, in the case that the update information is set by use of the analysis value which indicates the state of not-simultaneous existence of the sound source signals, and the initialization information is set by use of the degree of similarity of the frequency-domain demultiplexed signal, the same effect as one according to the sixth exemplary embodiment is obtained. Moreover, in the case that the update information and the initialization information are set by use of the analysis value which indicates the state of no-sound, the same effect as one according to the third exemplary embodiment is obtained. Moreover, in the case that the update information and the initialization information are set by use of the analysis value which indicates the state of simultaneous existence of the sound source signals, the same effect as one according to the fifth exemplary embodiment is obtained. Moreover, in the case that the update information and the initialization information are set by use of the integrated analysis value, the same effect as one according to the eighth exemplary embodiment is obtained.

The data memory unit 301 stores the frequency domain input signals of the plural frames. In the case that the data memory unit 301 inputs the update information and the frequency-domain input signal newly, it is preferable that the data memory unit 301 deletes the frequency-domain input signal of the frame which the update information designates, and stores the inputted frequency-domain input signal newly. Moreover, it is preferable that, in the case that the initialization information is 1, the data memory unit 301 deletes all the stored frequency-domain input signals.

Next, an operation of a whole of the signal demultiplexing device according to the exemplary embodiment will be described in detail with reference to a drawing.

Figure 28:
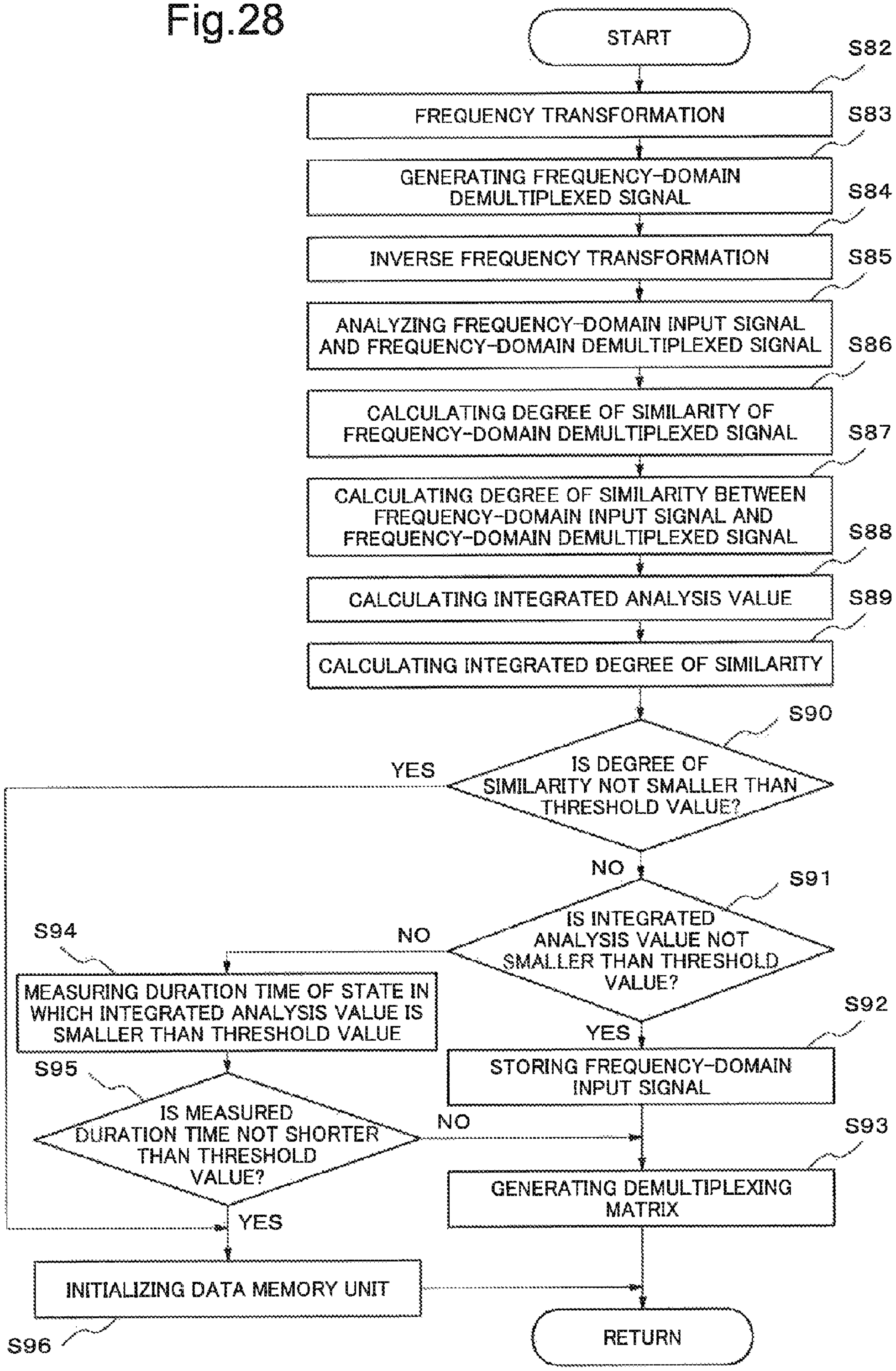
[FIG. 28]
Figure 29:
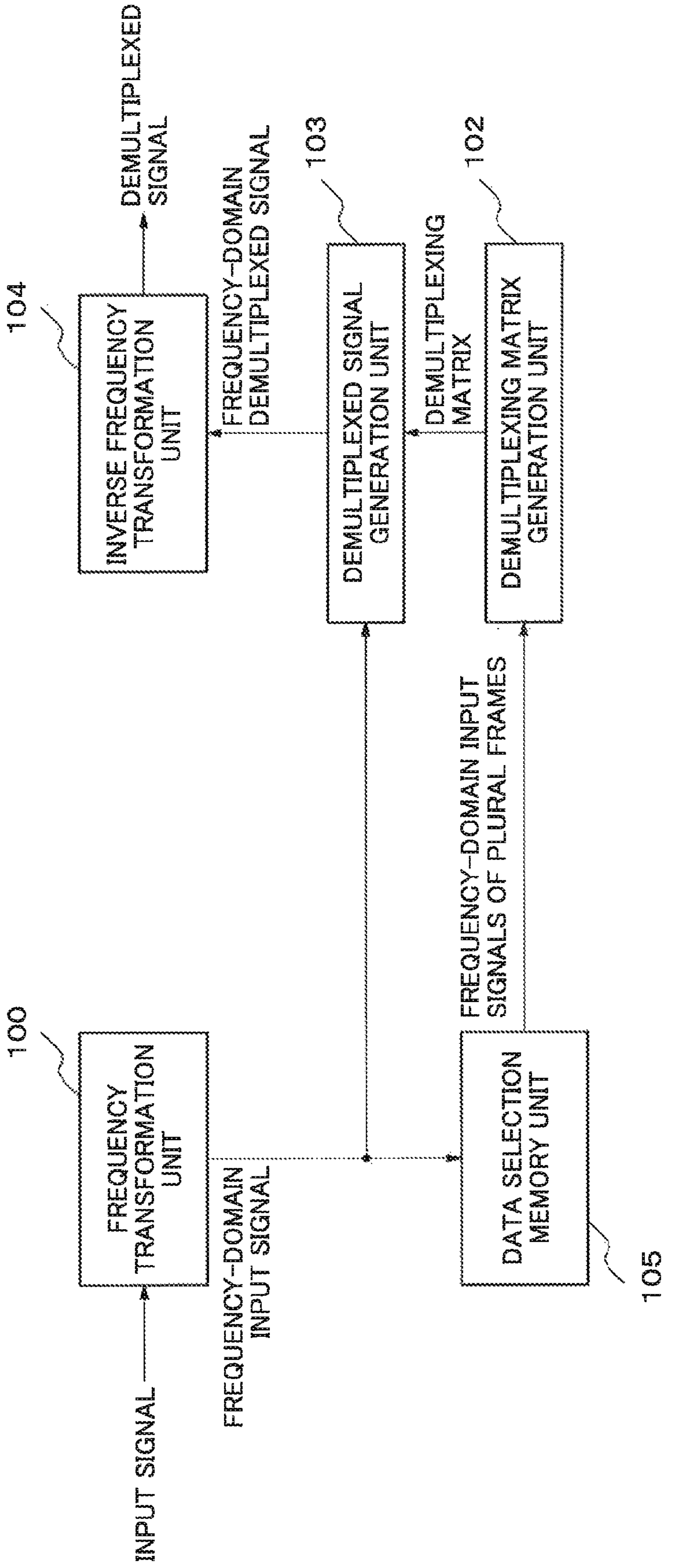
[FIG. 29]

FIG. 28 is a flowchart showing the operation of the signal demultiplexing device according to the exemplary embodiment. Here, a different point of the operation according to the present exemplary embodiment from the operation shown in FIG. 25 according to the eighth exemplary embodiment will be described mainly.

When comparing the operation shown in FIG. 28 and the operation shown FIG. 25 according to the eighth exemplary embodiment, the operations of Steps S82 to S85 and Step S89 in FIG. 28 are the same as the operations of Steps S71 to S74 and Step S75 in FIG. 25 respectively. Therefore, description on these Steps is omitted. Moreover, since the operation in Step S86 is the same as the operation in Step S55 in FIG. 19, description on Step S86 is omitted.

After carrying out Step S86, the selection control unit 1001 calculates the degree of similarity SXiYj between the frequency-domain input signal and the frequency-domain demultiplexed signal (Step S87). After calculating the integrated analysis value (Step S88), the selection control unit 1001 calculates the integrated degree of similarity which is calculated from two degrees of similarity in Step S86 and Step S87 respectively (Step S89). In the case that the integrated degree of similarity, which is calculated, is not smaller than a predetermined threshold value (Yes in Step S90), the selection control unit 1001 carries out the initialization process to delete all the frequency-domain input signals stored in the data memory unit 301 (Step S96), and ends the process for the current frame. In the case that the integrated degree of similarity, which is calculated, is smaller than the predetermined threshold value (No in Step S90), the operation proceeds to Step S91.

Since the operations of Steps S91 to S96 are the same as the operations of Steps S71 to S81 according to the eighth exemplary embodiment respectively, description on these Steps is omitted.

As mentioned above, the present exemplary embodiment has an effect of reducing the degradation of the demultiplexing performance similarly to the seventh exemplary embodiment.

The reason is that the signal demultiplexing device according to the exemplary embodiment has the configuration that the demultiplexing matrix is calculated by use of the plural frequency-domain input signals selected on the basis of the integrated analysis value which is calculated by use of the analysis value indicating the state of no-sound, and the analysis value indicating the state of simultaneous existence of the sound source signals.

Furthermore, the present exemplary embodiment, similarly to the eighth exemplary embodiment, has an effect that, even if the environmental change, such as a case that a sound source moves, is caused while being in the state of no-sound or the state of not-simultaneous existence, it is possible to track the caused environmental change quickly. That is, the exemplary embodiment has an effect that, in the case that the environmental change is caused while being in the state of no-sound or the state of not-simultaneous existence, a time interval from the end of the state of no-sound or the state of not-simultaneous existence until the generation of the demultiplexing matrix which is adaptable to the changed environment is shortened. The multiplexing matrix, which is adapted to the changed environment, makes it possible to generate the correct demultiplexed signal from the mixed signals which are in the changed environment.

The reason is that according to the configuration of the exemplary embodiment, the data memory unit 301 is initialized according to the duration time of the state of no-sound or the state of not-simultaneous existence on the basis of the integrated analysis value which is calculated and which indicates whether being in the state of no-sound or in the state of not-simultaneous existence. In the case that the state of no-sound or the state of not-simultaneous existence continues for a predetermined time, the data memory unit 301 is initialized. Therefore, in the case that the environmental change is caused while being in the state of no-sound or the state of not-simultaneous existence, the data memory unit 301 does not include any frequency-domain input signal which is in the environment previous to the environmental change, after the environment is changed. As a result, when generating the demultiplexing matrix in the changed environment, the frequency-domain input signal, which is in the environment previous to the environmental change, is not used in the learning process. Moreover, the data memory unit 301 can store newly the frequency-domain input signal which is in the changed environment such as the case that the sound source moves. Accordingly, it is possible to calculate quickly the demultiplexing matrix reflecting the state which is generated after the environment is changed. Accordingly, an effect that tracking property after end of the state of no-sound or the state of not-simultaneous existence is improved is obtained.

Furthermore, the present exemplary embodiment has an effect that, even if the environmental change, such as the case that the sound source moves, is caused, it is possible to track the caused environmental change quickly. That is, the exemplary embodiment has an effect that a time interval from the environmental change until the generation of the demultiplexing matrix which is adaptable to the changed environment is shortened. The multiplexing matrix, which is adapted to the changed environment, makes it possible to generate the correct demultiplexed signal on the basis of the mixed signal which is in the changed environment.

The reason is that according to the configuration of the exemplary embodiment, the environmental change, such as the sound source moves, is detected by use of the integrated degree of similarity, which is calculated from the degree of similarity between the frequency-domain demultiplexed signals, and the degree of similarity between the frequency-domain input signal and the frequency-domain demultiplexed signal, and the data memory unit 301 is initialized on the basis of the detection result. Therefore, in the case that the environmental change is caused, the data memory unit 301 does not include any frequency-domain input signal which is in the environment previous to the environmental change, after the environment is changed. As a result, when generating the demultiplexing matrix in the changed environment, the frequency-domain input signal which is in the environment previous to the environmental change is not used in the learning process. Moreover, the data memory unit 301 can store newly the frequency-domain input signal which is in the changed environment such as the case that the sound source moves. Accordingly, it is possible to calculate quickly the demultiplexing matrix which reflecting the state which is generated after the environment is changed. Consequently, it is possible to improve tracking property in the changed environment.

[Tenth Exemplary Embodiment]

FIG. 34 is a block diagram showing a configuration of a signal demultiplexing device according to the exemplary embodiment.

With reference to FIG. 34, the signal demultiplexing device according to the exemplary embodiment includes a computer 1, a signal input unit 2, a demultiplexed signal output unit 3 and a program memory unit 4.

The computer 1 includes CPU 10 (Central Processing Unit) which executes a program stored in the program memory unit 4, and a data memory unit 5.

The signal input unit 2 makes an input signal inputted into the computer 1. The signal input unit 2 is corresponding to a plurality of sensors, which make the computer 1 input a signal, such as a plurality of microphones which input a voice.

The demultiplexed signal output unit 3 outputs a demultiplexed signal which is received from the computer 1. The demultiplexed signal output unit 3 is corresponding to, for example, a plurality of speakers which output a voice. Moreover, it may be preferable that the demultiplexed signal output unit 3 is a display device which indicates a plurality of signal waveforms as an image, or a storage medium which stores data of plural signals.

The program memory unit 4 stores the program which makes the computer 1 operate as the signal demultiplexing device according to any one of the first to the ninth exemplary embodiments. The computer 1 can read the program which the program memory unit 4 stores. The program memory unit 4 is a removable medium, such as CD-ROM (Compact Disc Read Only Memory), an USB (Universal Serial Bus) memory or the like, or a non-transitory computer readable medium such as a hard disk device or the like.

The data memory unit 5 is, for example, a memory device such as a hard disk device. The data memory unit 5 operates as the above-mentioned data memory unit 202 or data memory device 301.

It may be preferable that the signal demultiplexing devices according to the first to the ninth exemplary embodiments are realized by the program which the program memory unit 4 according to the present exemplary embodiment stores, and the computer 1.

While the present invention has been described with reference to the exemplary embodiment as mentioned above, the present invention is not limited to the above-mentioned exemplary embodiment. It is possible to make various changes, which a person skilled in the art can understand, in the form and details of the present invention without departing from the sprit and scope of the present invention.

This application is based upon and claims the benefit of priority from Japanese Patent Application No. 2009-287676, filed on Dec. 18, 2009, the disclosure of which is incorporated herein in its entirety by reference.

Industrial Applicability

The present invention can be applied to a signal demultiplexing device, a signal demultiplexing program, or the like.

What is claimed is:

1. A signal demultiplexing device, comprising:

a frequency transformation unit which transforms a frame, which is an input signal inputted in a predetermined time interval, into a frequency-domain input signal which is a signal in the frequency domain;

an input signal analysis unit which analyzes effectiveness of the inputted frame on generating a demultiplexing matrix which is used for demultiplexing;

a selection control unit which selects the frames which have high effectiveness among the inputted frames;

a data memory unit which stores the frequency-domain input signals of which the frames are selected by the selection control unit; and a demultiplexing matrix generation unit which generates the demultiplexing matrix for each of the inputted frames by use of the frequency-domain input signals which are stored in the data memory unit, wherein the selection control unit selects the frames which have high effectiveness by comparing the effectiveness of the inputted frame and the effectiveness of the frames which are selected by the selection control unit in the past.

2. The signal demultiplexing device according to claim 1, wherein the selection control unit carries out an initialization to delete all data which the data memory unit stores, in the case that the newly inputted frame is not suited to the demultiplexing continuously for a not shorter time than a predetermined time on the basis of the analysis result on the effectiveness of the frames.

3. The signal demultiplexing device according to claim 1, wherein the input signal includes a plurality of input sensor signals each of which is a signal inputted by each of a plurality of sensors, the frequency transformation unit transforms each of the input sensor signals into a frequency-domain input sensor signal which is a signal in the frequency domain, and generates the frequency-domain input signal which includes each of the frequency-domain input sensor signals, and the signal demultiplexing device further comprises:

a demultiplexed signal generation unit which generates a plurality of frequency-domain demultiplexed signals, each of which is demultiplexed for each signal source, from the frequency-domain input signals, which the frequency transformation unit generates, by use of the demultiplexing matrix which the demultiplexing matrix generation unit generates; and an inverse frequency transformation unit which generates a plurality of the demultiplexed signals through transforming a plurality of the frequency-domain demultiplexed signals into time-domain signals respectively.

4. The signal demultiplexing device according to claim 3, wherein the input signal analysis unit determines that the frame is suited to the demultiplexing, in the case that at least one of the plural input sensor signals included in the frame is not a null signal, and determines that the frame is not suited to the demultiplexing, in the case that each of the plural input sensor signals included in the frame is the null signal.

5. The signal demultiplexing device according to claim 3, wherein the input signal analysis determines that the frame is suited to the demultiplexing, in the case that each of the demultiplexed signals is not the null signal, and determines that the frame is not suited to the demultiplexing, in the case that any at least one of the demultiplexed signals is the null signal.

6. The signal demultiplexing device according to claim 3, wherein the input signal analysis unit determines that the frame is suited to the demultiplexing, in the case that at least one out of the plural input sensor signals included in the frame is not a null signal and each of the demultiplexed signals is not the null signal, and determines that the frame is not suited to the demultiplexing in other cases.

7. The signal demultiplexing device according to claim 3, wherein the selection control carries out an initialization to delete all the frequency-domain input signals which the data memory stores, in at least one of the case that the input signal analysis determines that at least a couple of the demultiplexed signals are similar to each other, and the case that the input signal analysis determines that at least one of the plural input sensor signals included in the frame is similar to any one of the plural demultiplexed signals.

8. The signal demultiplexing device according to claim 3, wherein the data memory unit includes an area which is associated with each of the plural demultiplexed signals, and the selection control unit stores the frequency-domain input signal related to the frame, in the areas associated with the demultiplexed signals, which is not the null signal, in the order in which the frame is inputted.

9. A signal demultiplexing method, comprising:

transforming a frame, which is an input signal inputted in a predetermined time interval, into a frequency-domain input signal which is a signal in the frequency domain;

analyzing effectiveness of the inputted frame on generating a demultiplexing matrix which is used for demultiplexing;

selecting the frames which have high effectiveness among the inputted frames;

storing frequency-domain input signals of which the frames are selected, in a data memory unit; and generating a demultiplexing matrix for each of the inputted frames by use of the frequency-domain input signals which are stored in the data memory unit, wherein the selecting includes selecting the frames which have high effectiveness by comparing the effectiveness of the inputted frame and the effectiveness of the frames which are selected in the past.

10. A non-transitory computer readable medium to store a signal demultiplexing program which makes a computer work as:

a frequency transformation unit which transforms a frame, which is an input signal inputted in a predetermined time interval, into a frequency-domain input signal which is a signal in the frequency domain;

an input signal analysis unit which analyzes effectiveness of the inputted frame on generating a demultiplexing matrix which is used for demultiplexing;

a selection control unit which selects the frames which have high effectiveness among the inputted frames;

a data memory unit which stores the frequency-domain input signals of which the frames are selected by the selection control unit; and a demultiplexing matrix generation unit which generates the demultiplexing matrix for each of the inputted frames by use of the frequency-domain input signals which are stored in the data memory unit, wherein the selection control unit selects the frames which have high effectiveness by comparing the effectiveness of the inputted frame and the effectiveness of the frames which are selected by the selection control unit in the past.

11. A signal demultiplexing device, comprising:

a frequency transformation means for transforming a frame, which is an input signal inputted in a predetermined time interval, into a frequency-domain input signal which is a signal in the frequency domain;

an input signal analysis means for analyzing effectiveness of the inputted frame on generating a demultiplexing matrix which is used for demultiplexing;

a selection control means for selecting the frames which have high effectiveness among the inputted frames;

a data memory means for storing the frequency-domain input signals of which the frames are selected by the selection control means; and a demultiplexing matrix generation means for generating the demultiplexing matrix for each of the inputted frames by use of the frequency-domain input signals which are stored in the data memory means, wherein the selection control means selects the frames which have high effectiveness by comparing the effectiveness of the inputted frame and the effectiveness of the frames which are selected by the selection control means in the past.

* * * * *